(12) United States Patent
Kilfoyle et al.

(10) Patent No.: US 7,209,515 B2
(45) Date of Patent: Apr. 24, 2007

(54) MULTISTAGE RECEPTION OF CODE DIVISION MULTIPLE ACCESS TRANSMISSIONS

(75) Inventors: Daniel B. Kilfoyle, Falmouth, MA (US); Travis H. Slocumb, Washington, DC (US); Michael Potter, Annapolis, MD (US); Steve Carson, Washington, DC (US)

(73) Assignee: Science Applications International Corporation, San Diego, CA (US)

( * ) Notice: Subject to any disclaimer, the term of this patent is extended or adjusted under 35 U.S.C. 154(b) by 1166 days.

(21) Appl. No.: 10/108,569

(22) Filed: Mar. 29, 2002

(65) Prior Publication Data

US 2003/0048800 A1 Mar. 13, 2003

Related U.S. Application Data

(60) Provisional application No. 60/279,673, filed on Mar. 30, 2001.

(51) Int. Cl.
*H04B 1/00* (2006.01)
*H04B 15/00* (2006.01)
*H04B 7/00* (2006.01)
*H04B 1/06* (2006.01)

(52) U.S. Cl. .................. 375/152; 455/63.1; 455/278.1; 455/296

(58) Field of Classification Search ........ 370/335–337, 370/342, 345, 347, 441, 442
See application file for complete search history.

(56) References Cited

U.S. PATENT DOCUMENTS

| | | | |
|---|---|---|---|
| 5,719,852 A | 2/1998 | Schilling et al. ............ | 370/201 |
| 5,828,658 A | 10/1998 | Ottersten et al. ........... | 370/310 |
| 5,898,740 A | 4/1999 | Laakso et al. .............. | 375/346 |
| 5,904,470 A | 5/1999 | Kerrebrock et al. ........ | 415/115 |
| 5,930,243 A | 7/1999 | Parish et al. ................ | 370/334 |
| 5,956,333 A | 9/1999 | Zhou et al. ................. | 370/342 |
| 6,002,727 A | 12/1999 | Uesugi ....................... | 375/346 |
| 6,014,373 A | 1/2000 | Schilling et al. ............ | 370/342 |
| 6,031,877 A | 2/2000 | Saunders .................... | 375/267 |
| 6,061,553 A | 5/2000 | Matsuoka et al. .......... | 455/273 |
| 6,081,516 A | 6/2000 | Yoshida et al. ............. | 370/342 |
| 6,088,335 A | 7/2000 | I et al. ....................... | 370/252 |
| 6,100,843 A | 8/2000 | Proctor, Jr. et al. ......... | 342/368 |

(Continued)

OTHER PUBLICATIONS

Verdu, S., "Minimum Probability of Error for Asynchronous Gaussian Multiple-Access Channels," IEEE Transactions on Information Theory, vol. IT-32, No. 1, Jan. 1986, pp. 85-96.

(Continued)

*Primary Examiner*—Wing Chan
*Assistant Examiner*—Warner Wong
(74) *Attorney, Agent, or Firm*—Kilpatrick Stockton LLP

(57) ABSTRACT

Reducing multiple access interference in the radio frequency communications path between the network base station and UE. The preferred methods include interleaving STAP and MUD in a plurality of stages in a base station receiver. Specific embodiments accomplish this by selecting certain UE connections for MUD processing by stage. Then, in two or more stages, demodulating the UE connections selected for MUD processing using STAP, and MUD canceling UE connections selected for MUD processing. Within the latency requirements of the network, preferred embodiments of the present invention also command a transmit power for each UE connections in order to exploit the effect of interleaved STAP and MUD processing.

20 Claims, 27 Drawing Sheets

WCDMA Multi-stage Receiver Functional Block Diagram

U.S. PATENT DOCUMENTS

| | | | | |
|---|---|---|---|---|
| 6,104,933 | A | 8/2000 | Frodigh et al. | 455/522 |
| 6,108,564 | A | 8/2000 | Minkoff | 455/561 |
| 6,108,565 | A | 8/2000 | Scherzer | 455/562 |
| 6,115,409 | A | 9/2000 | Upadhyay et al. | 375/144 |
| 6,118,983 | A | 9/2000 | Egusa et al. | 455/69 |
| 6,119,010 | A | 9/2000 | Labedz | 455/446 |
| 6,131,049 | A | 10/2000 | Marsan et al. | 455/574 |
| 6,137,843 | A | 10/2000 | Chennakeshu et al. | 375/340 |
| 6,141,567 | A | 10/2000 | Youssefmir et al. | 455/562 |
| 6,154,485 | A | 11/2000 | Harrison | 375/130 |
| 6,157,619 | A | 12/2000 | Ozluturk et al. | 370/252 |
| 6,163,524 | A | 12/2000 | Magnusson et al. | 370/208 |
| 6,167,031 | A | 12/2000 | Olofsson et al. | 370/252 |
| 6,252,540 | B1 | 6/2001 | Hale et al. | 342/159 |
| 6,301,293 | B1 | 10/2001 | Huang et al. | 375/206 |
| 6,418,148 | B1 * | 7/2002 | Kumar et al. | 370/468 |
| 6,785,323 | B1 * | 8/2004 | Proctor, Jr. | 375/146 |
| 7,058,028 | B1 * | 6/2006 | Holma et al. | 370/318 |
| 2002/0001287 | A1 | 1/2002 | Bergenwall et al. | |
| 2002/0036997 | A1 | 3/2002 | Kim et al. | |
| 2002/0171580 | A1 * | 11/2002 | Gaus et al. | 342/357.06 |
| 2003/0206577 | A1 * | 11/2003 | Liberti et al. | 375/152 |

OTHER PUBLICATIONS

Verdu, S., "Adaptive Multiuser Detection," *Code Division Multiple Access Communications*, S.G. Glisic and P.A. Leppanen, Eds., pp. 97-116, The Netherlands, Kluwer, 1995.

"3G TS 25.211, V.3.4.0—Draft (Sep. 2000)—3$^{rd}$ Generation Partnership Project; Technical Specification Group Radio Access Network; Physical Channels and Mapping of Transport Channels onto Physical Channels (FDD) (Release 1999)," Copyright 2000, 46 pp.

International Search Report for Application No. PCT/US02/09566, dated Jul. 18, 2002 (mailing date).

Preliminary Examination Report for Application No. PCT/US02/09566, dated Feb. 13, 2003 (mailing date).

* cited by examiner

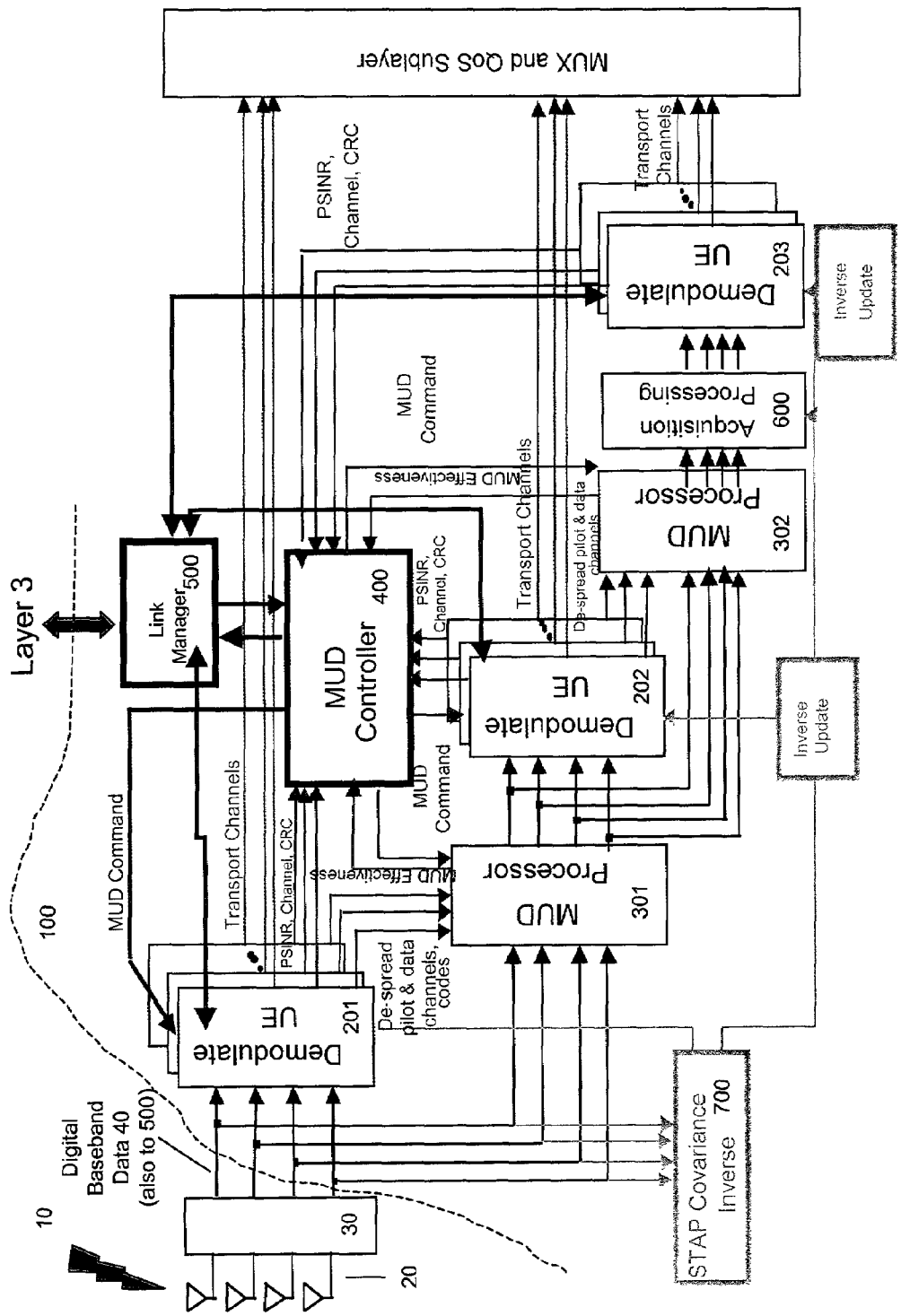
Figure 1. WCDMA Multi-stage Receiver Functional Block Diagram

Figure 2. Demodulate UE Function

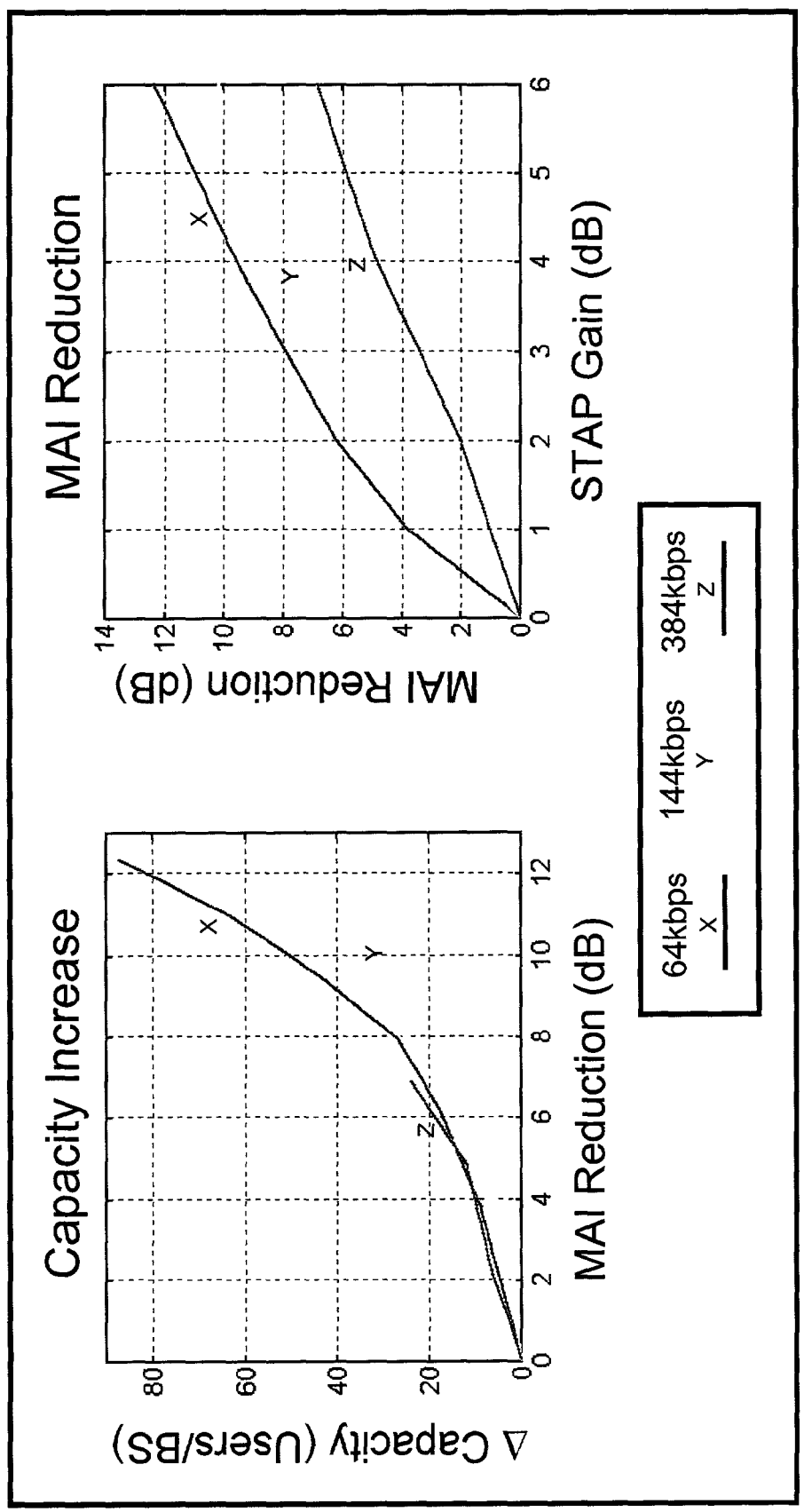
Figure 3. Capacity Increase Vs MAI Reduction - Single QoS 37, 2km Radius Cells in Network, No Blockage

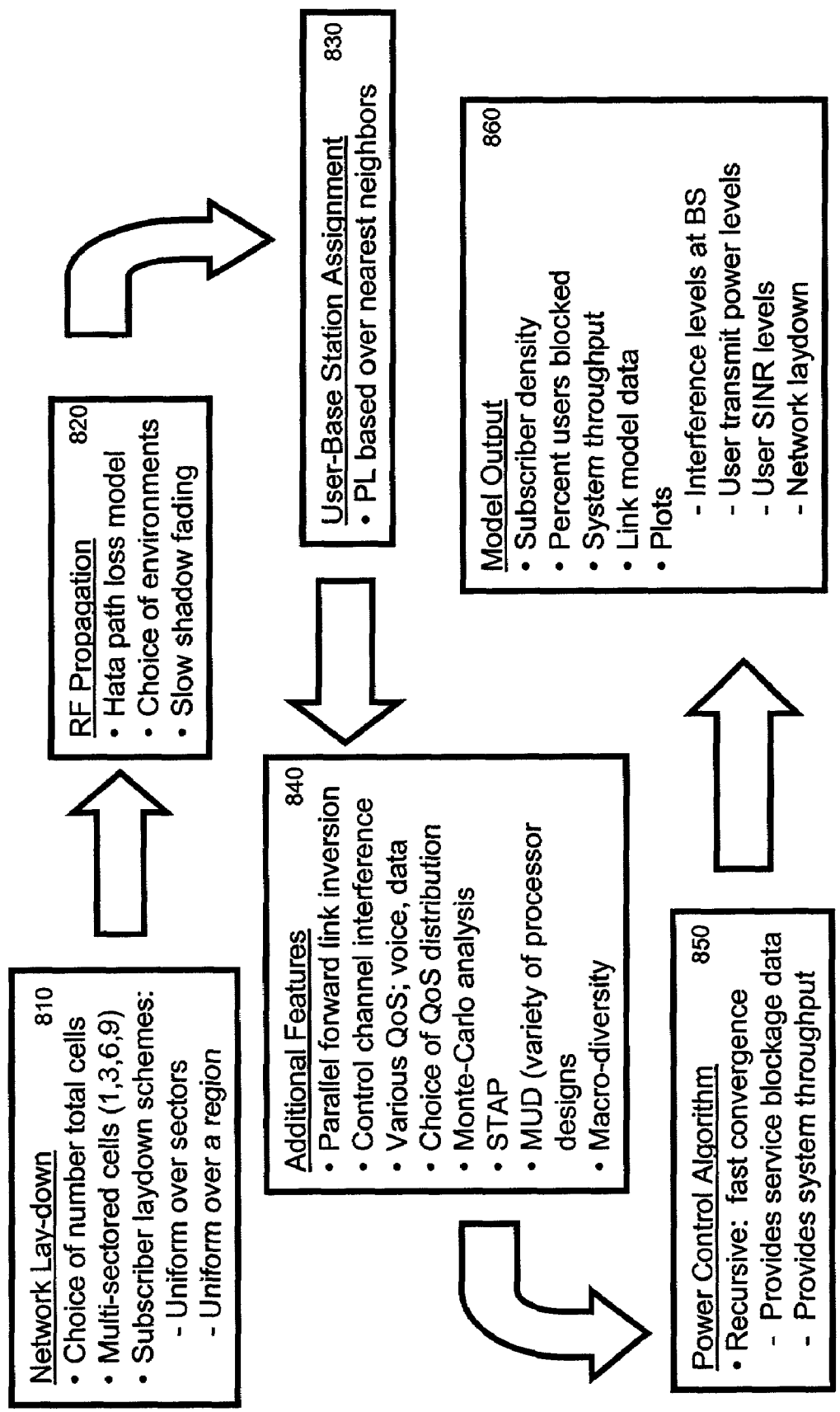
Figure 4. WCDMA RF Network Simulation

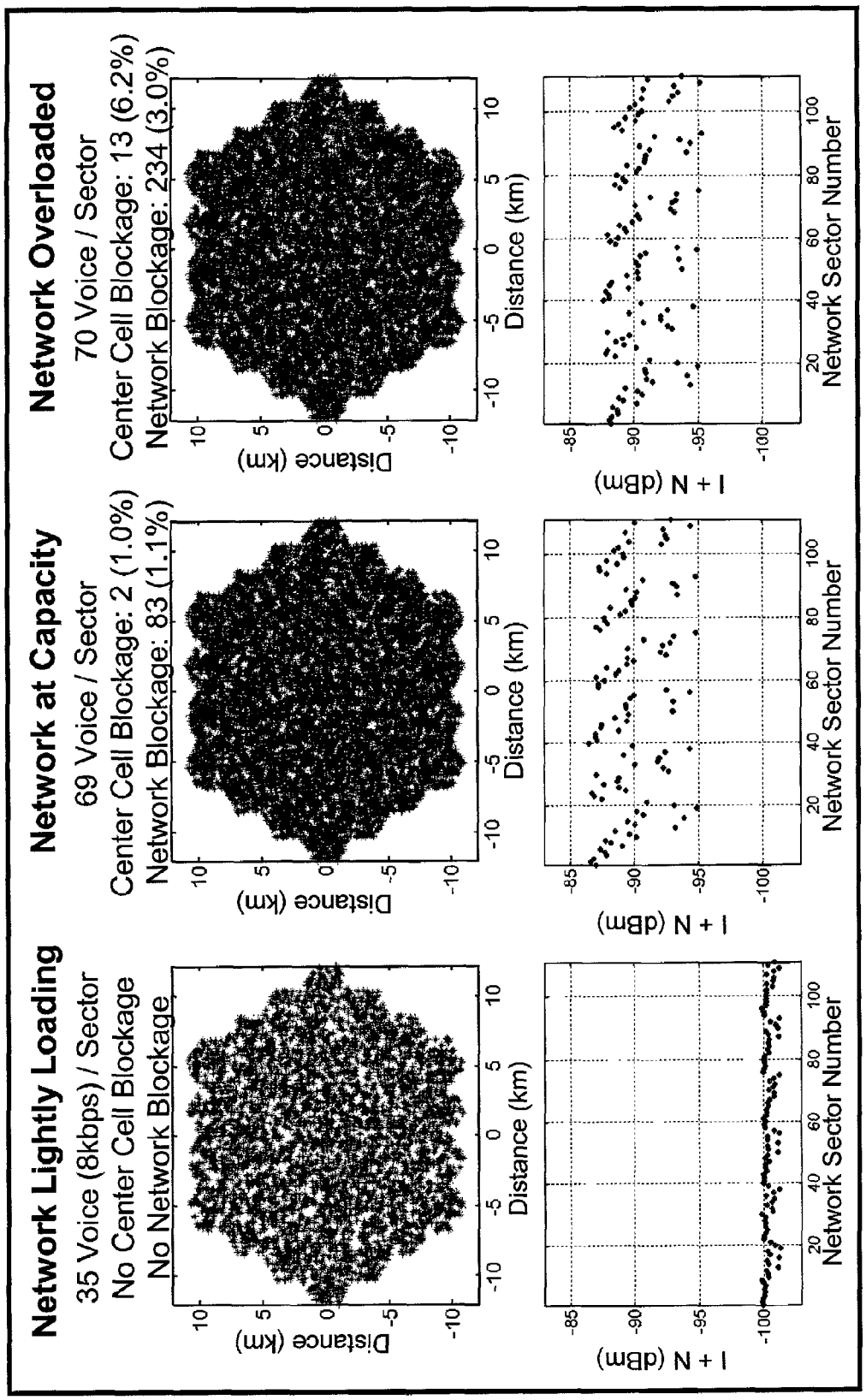
Figure 5. RF Network Simulation Example Results for Voice Service

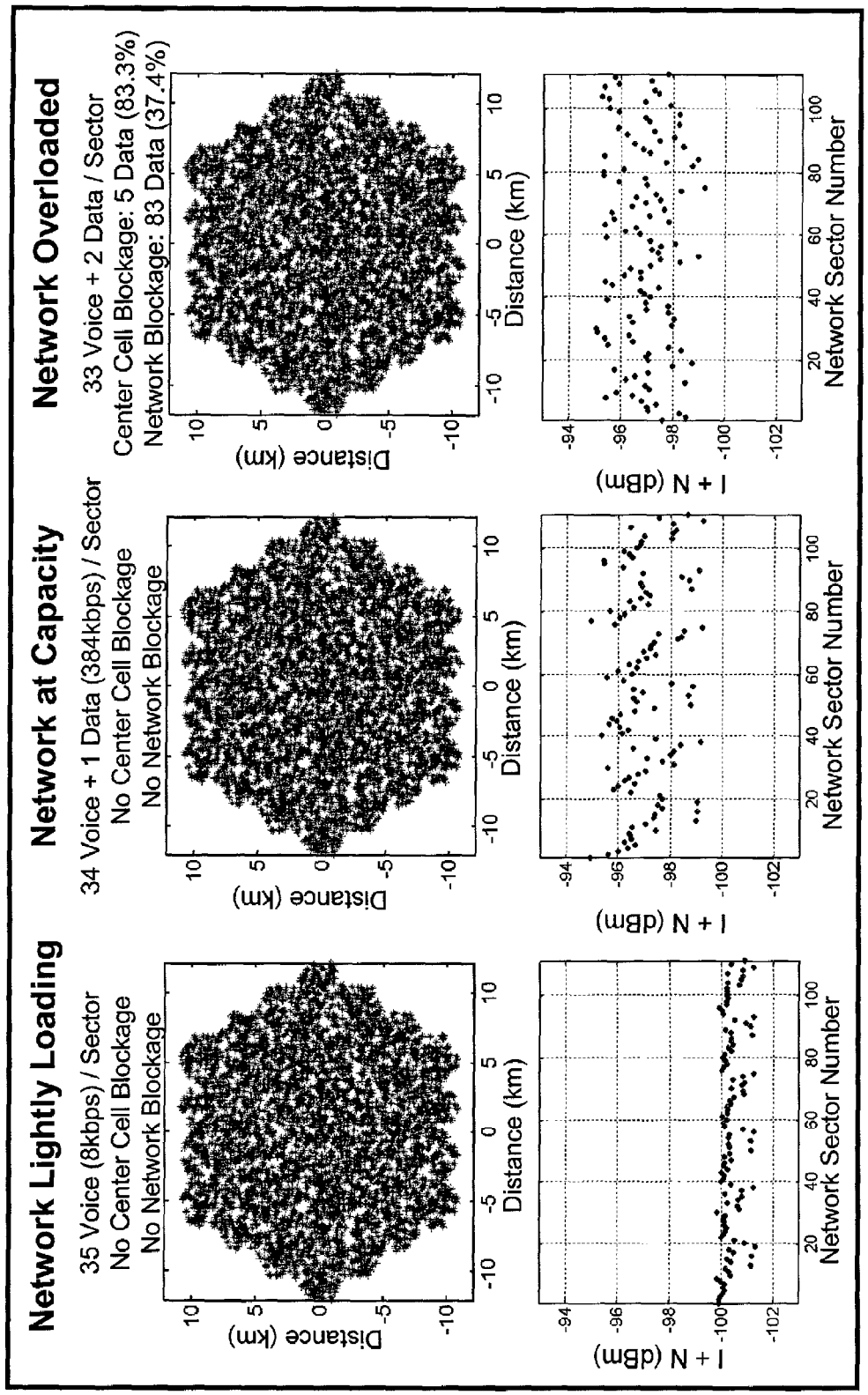
Figure 6. RF Network Simulation Example Results for Voice & Data Service

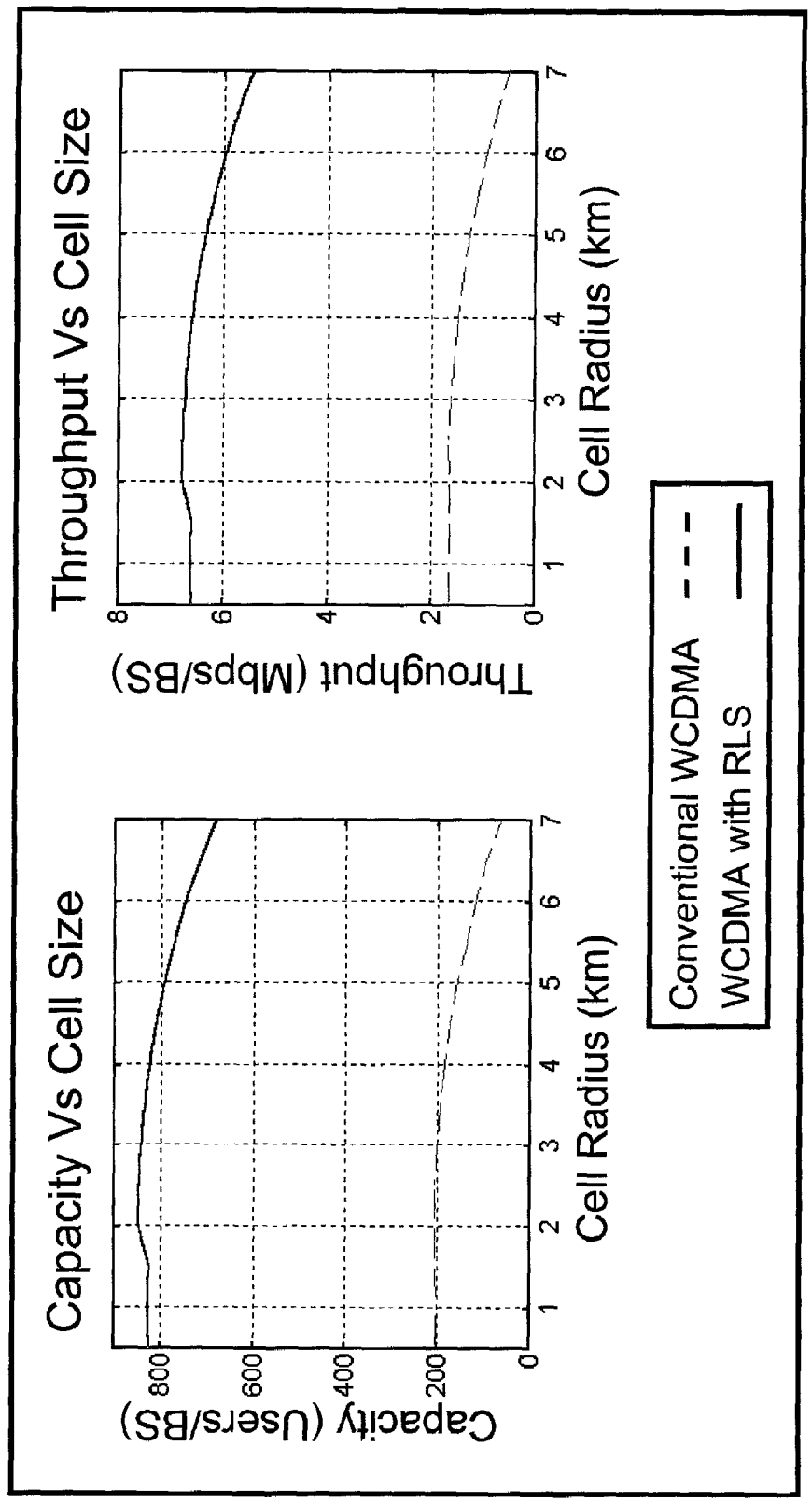
Figure 7. Capacity Vs Coverage - Voice Users (8kbps) 37 Cells in Network

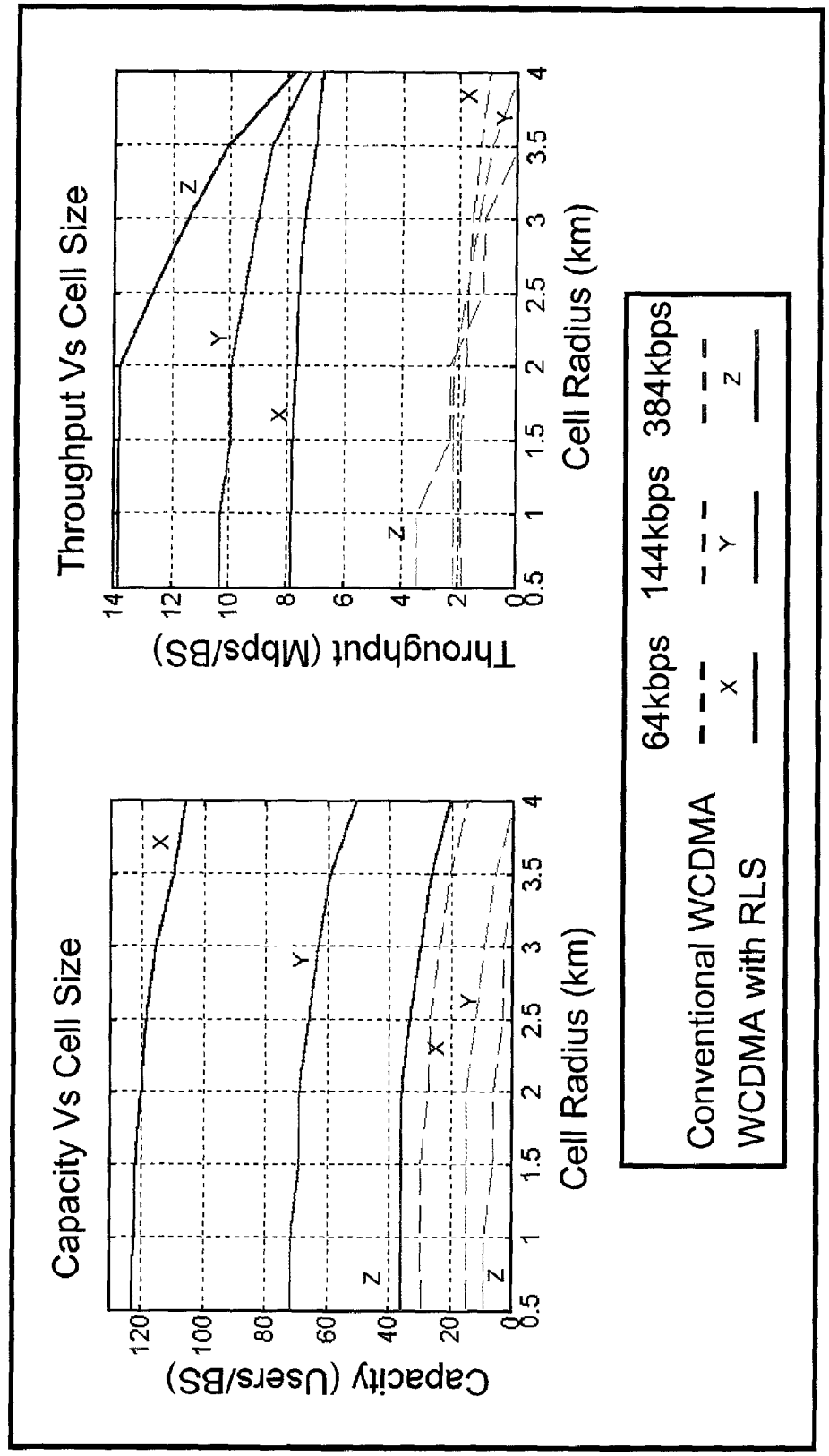
Figure 8. Capacity Vs Coverage - Data Users 37 Cells in Network

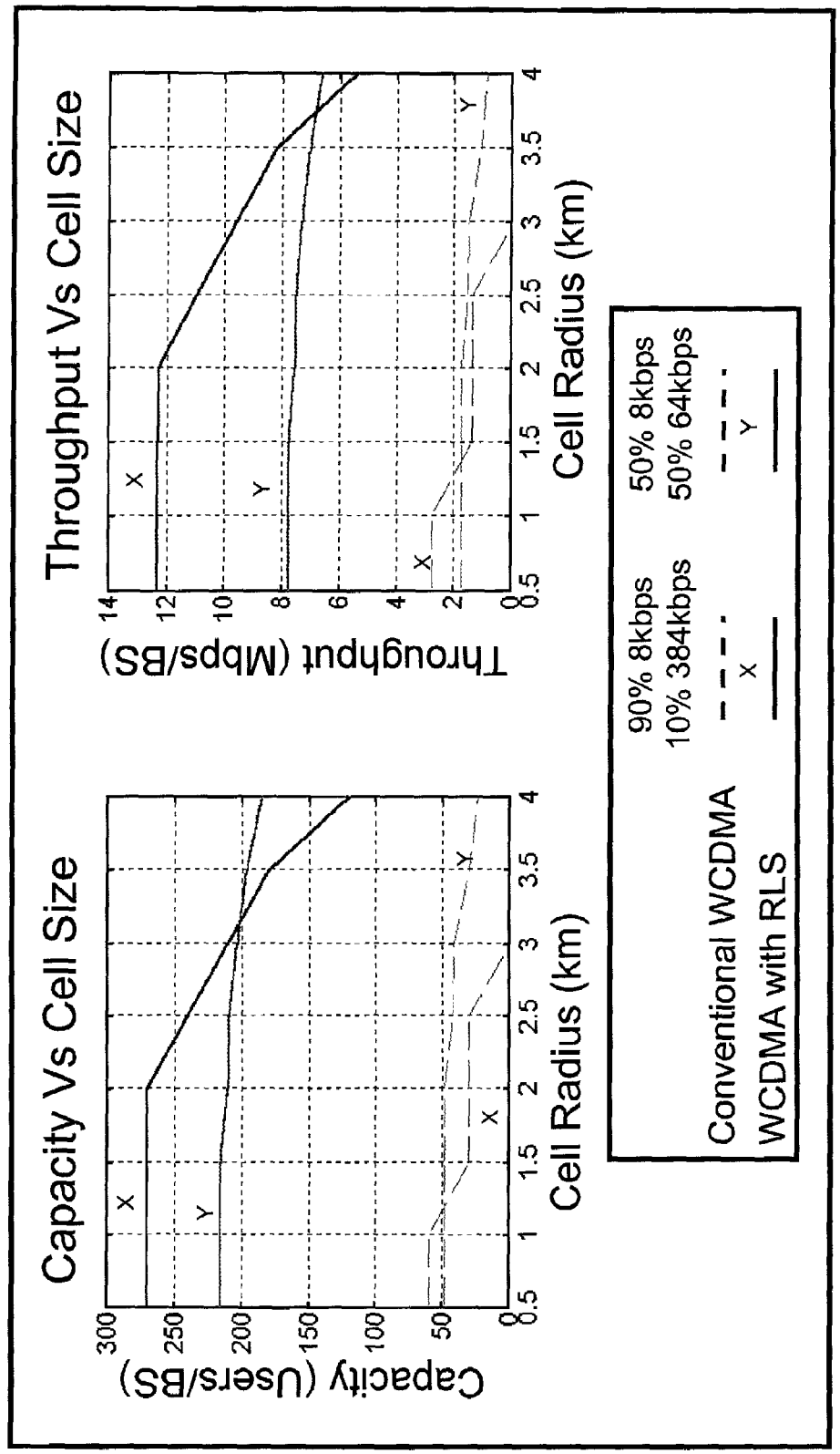
Figure 9. Capacity Vs Coverage - Mixed QoS
37 Cells in Network

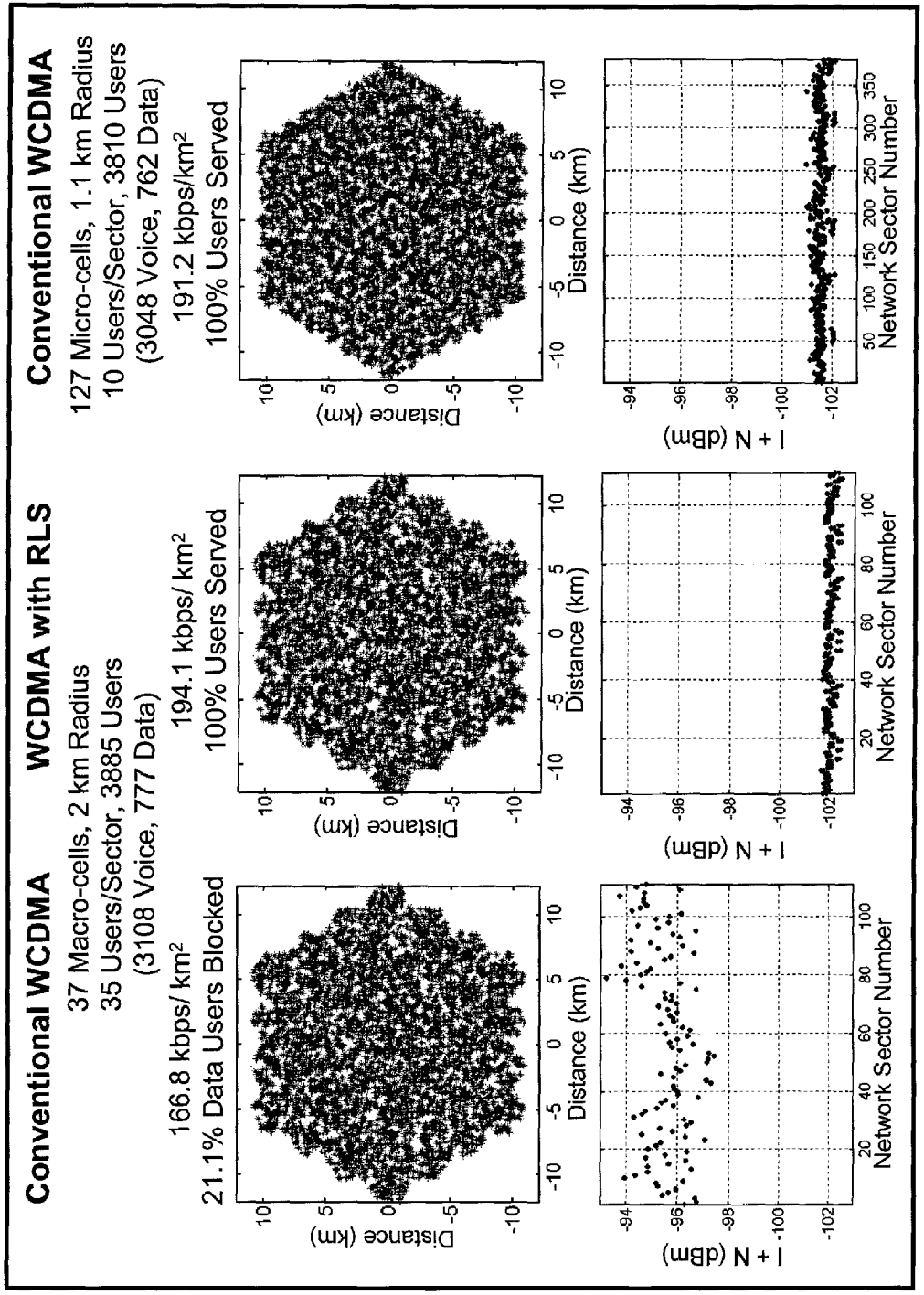
Figure 10. Macro-cell Vs Micro-cell Comparison
Quality of Service, 80% 8kbps Voice, 20% 64 kbps Data

Figure 11. Processing Complexity

| | | FLOPS | MFLOPS/sec | Total MFLOPS/sec | | | |
|---|---|---|---|---|---|---|---|
| STAP Covariance Inverse (stage 1) | | | | | | | |
| 1) Form A and $A^H$ | | 128 | 0.2 | | | | |
| 2) $R = AA^H$ | $\beta\lambda_c M^2$ conjugations | 2560 | 3.8 | | $\lambda_c$ | 4 | |
| | $(M^2+M)/2$ dot products, each $\beta\lambda_c M$ long | | 5.4 | | $\beta$ | 2 | |
| 3) $R^{-1}$ | $50M^3$ | 3584 | 9.4 | 9.4 | $\tau_c$ | 6.67E-04 | sec |
| | | | | | $L_p$ | 2048 | chips |
| STAP Covariance Inverse (stage 2) | | | | | M | 4 | |
| 1) Recompute $R^{-1}$ | see description | 576 | 0.9 | | N | 8 | |
| | | | 0.9 | 1.7 | S | 32 | |
| Demodulate User, STAP+MRC | | | | | $p_{sv}$ | 0.1 | |
| 1) Compute steering vector STAP, p | S dot products, each $N_{sv}$ long | 104704 | 157.0 | | $N_{sv}$ | 409 | samples |
| 2) Compute weights STAP | M dot products, each M long + 2M adds + M multiplies | 172 | 0.3 | | $p_{svr}$ | 0.1 | |
| 3) Apply weights STAP | $\beta N_{sd}$ dot products, each M long | 163840 | 245.6 | | $N_{svr}$ | 409 | samples |
| 4) Compute steering vector MRC | N dot products, each M long | 256 | 0.4 | | $N_{sd}$ | 2560 | chips |
| 5) Apply weights MRC | $\beta N_{sd}$ dot products, each N long | 327680 | 491.3 | | $\tau_c$ | 2.60E-07 | sec |
| | | | 894.5 | 67089.8 | CoMu | 6 | |
| | | | | | CoAd | 2 | |
| Demodulate User, Compute Codes | | | | | | | |
| 1) Generate long code | 10 adds (real) + 2 multiples (real) per chip | 30720 | 46.1 | | $N_{nr}$ | 21 | |
| | | | 46.1 | 3454.3 | $N_{muaed}$ | 5 | |
| | | | | | $N_{sd}$ | 168 | samples |
| Demodulate User, Despread | | | | | $\lambda_{mud}$ | 4 | |
| 1) Integrate 2 samps/chip | 1 add per chip | 5120 | 7.7 | | $p_{mud}$ | 0.01 | |
| 2) Long Code | 1 multiply per chip | 15360 | 23.0 | | $N_{sv2}$ | 40 | samples |
| 3) OSVF code | 1 multiplies (real) per chip per channel | 5120 | 7.7 | | $N_{gha}$ | 2 | |
| 4) Integrate symbols | 1 adds (real) per chip per channel | 5120 | 7.7 | | | | |
| | | | 46.1 | 3454.3 | $N_{sp}$ | 4096 | |
| Mud Processing - Toeplitz assumption | | | | | $T_{rach}$ | 40 | |
| 1) Remodulate signal | see description | 51200 | 76.8 | | $P_{ach}$ | 0.5 | |
| 2) Compute R | see description | 28224 | 42.3 | | $T_{DPCCH}$ | 40 | samples |
| 3) Invert R | $56N_{nr}^2$ | 24696 | 37.0 | | $P_{DPCCH}$ | 0.5 | |
| 4) Compute impulse response | $N_{nr}$ dot products of length $N_{sv2}$ | 6720 | 10.1 | | | | |
| 5) Weight computation | $N_{nr}$ dot products of length $N_{nr}$ | 3528 | 5.3 | | $N_{mud}$ | 2 | |
| 6) Weight application | $\beta N_{sd}$ dot products of length $N_{muaed}$ | 204800 | 307.0 | | $N_{mudcha}$ | 4 | |
| | | | 478.5 | 7656.2 | $N_{mudsb2}$ | 2 | |
| | | | | | $N_{Nsea}$ | 75 | |
| RACH Detection | | | | | $N_{pcb}$ | 8 | |
| Integrate various preambles | $N_{rach} T_{rach}$ dot products length $p_{ach} \beta N_{sp}$ | 1310720 | 982.5 | | $N_{DPCCH}$ | 1 | |
| | | | 982.5 | 7860.4 | $N_{sov}$ | 2 | |
| DPCCH Detection | | | | | | | |
| Integrate various pilot sequences | $N_{DPCCH} T_{DPCCH}$ dot products of length $p_{DPCCH} \mu L_e$ | 655360 | 491.3 | | | | |
| | | | 491.3 | 491.3 | | | |
| | | | Sector total | 90017.3 | | | |
| | | | Total | 270052.0 | | | |

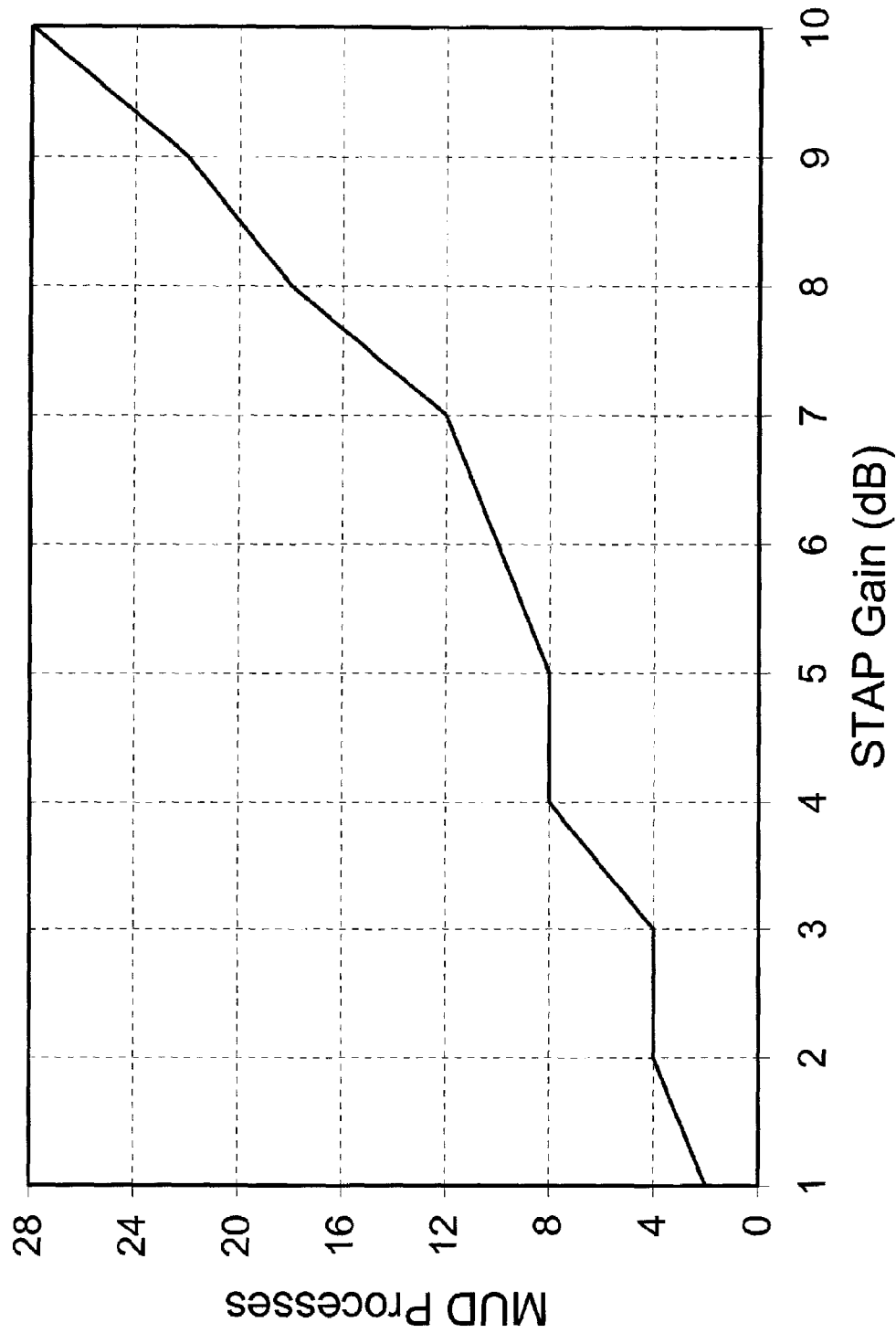
Figure 12. MUD Processes Vs STAP Gain
37 Cell Networks of 384 kbps Data Users

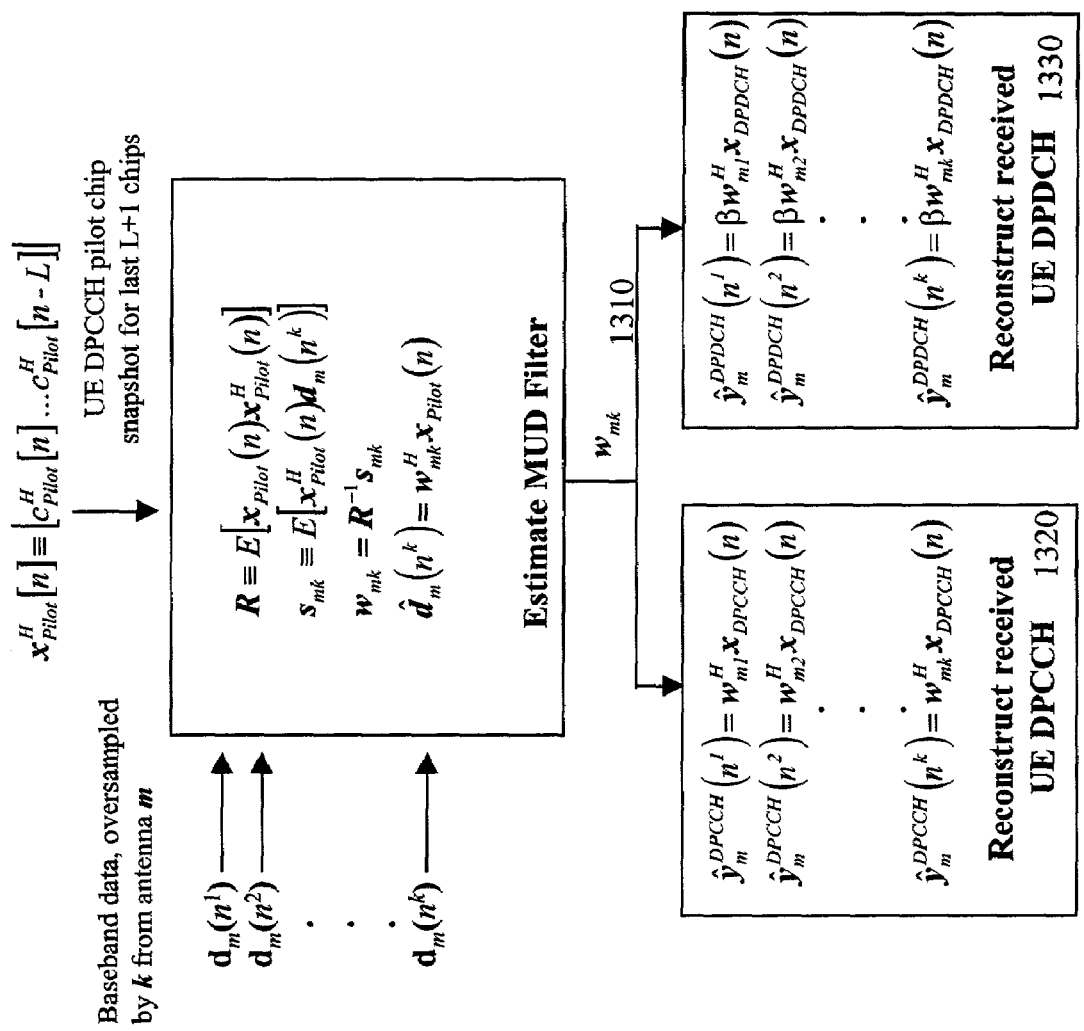
Figure 13. A MUD Processing Algorithm for One UE.

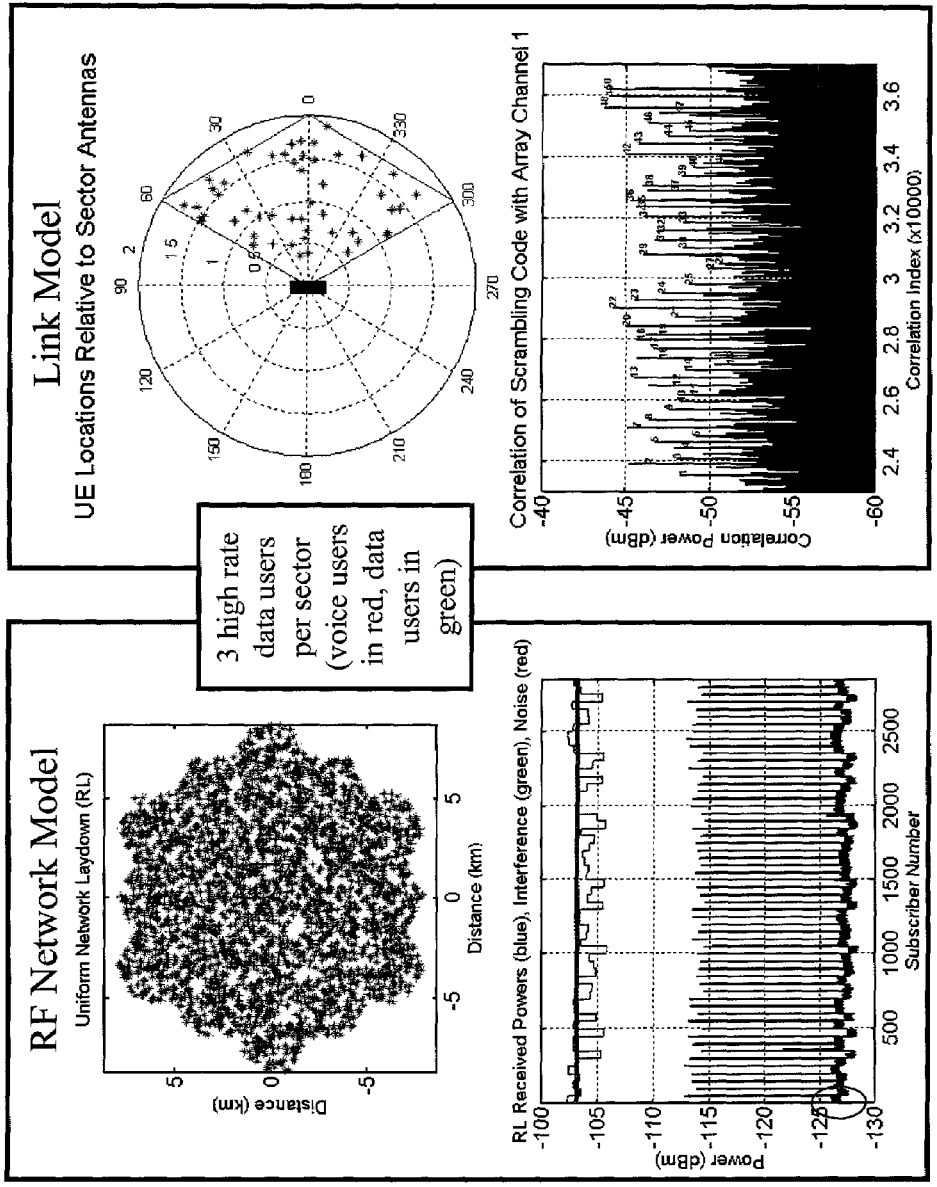
Figure 14. WCDMA Reverse Link Simulation
In this example, STAP gain in RF network model has not been applied to link data

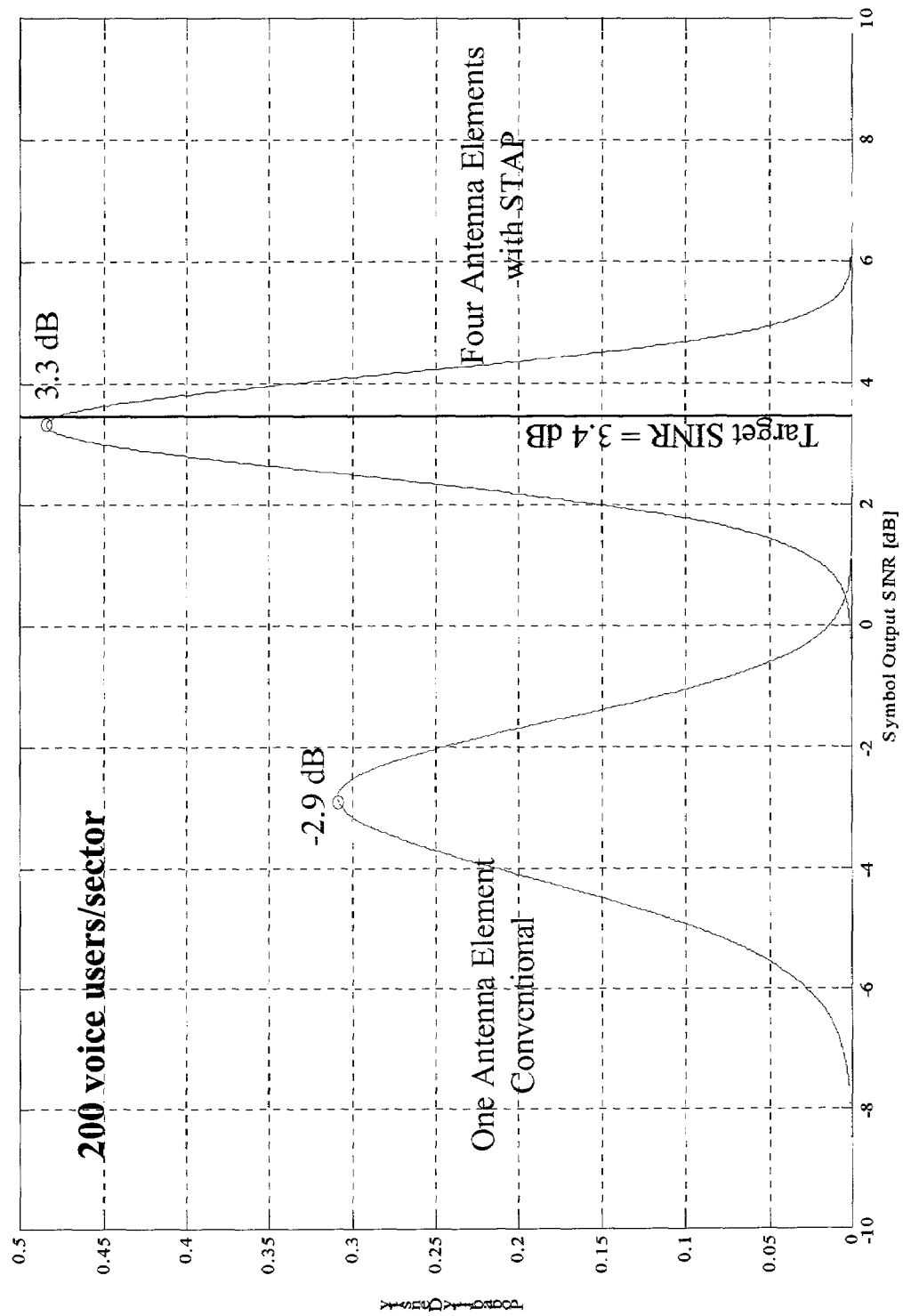
Figure 15. SINR Performance for WCDMA Voice Service

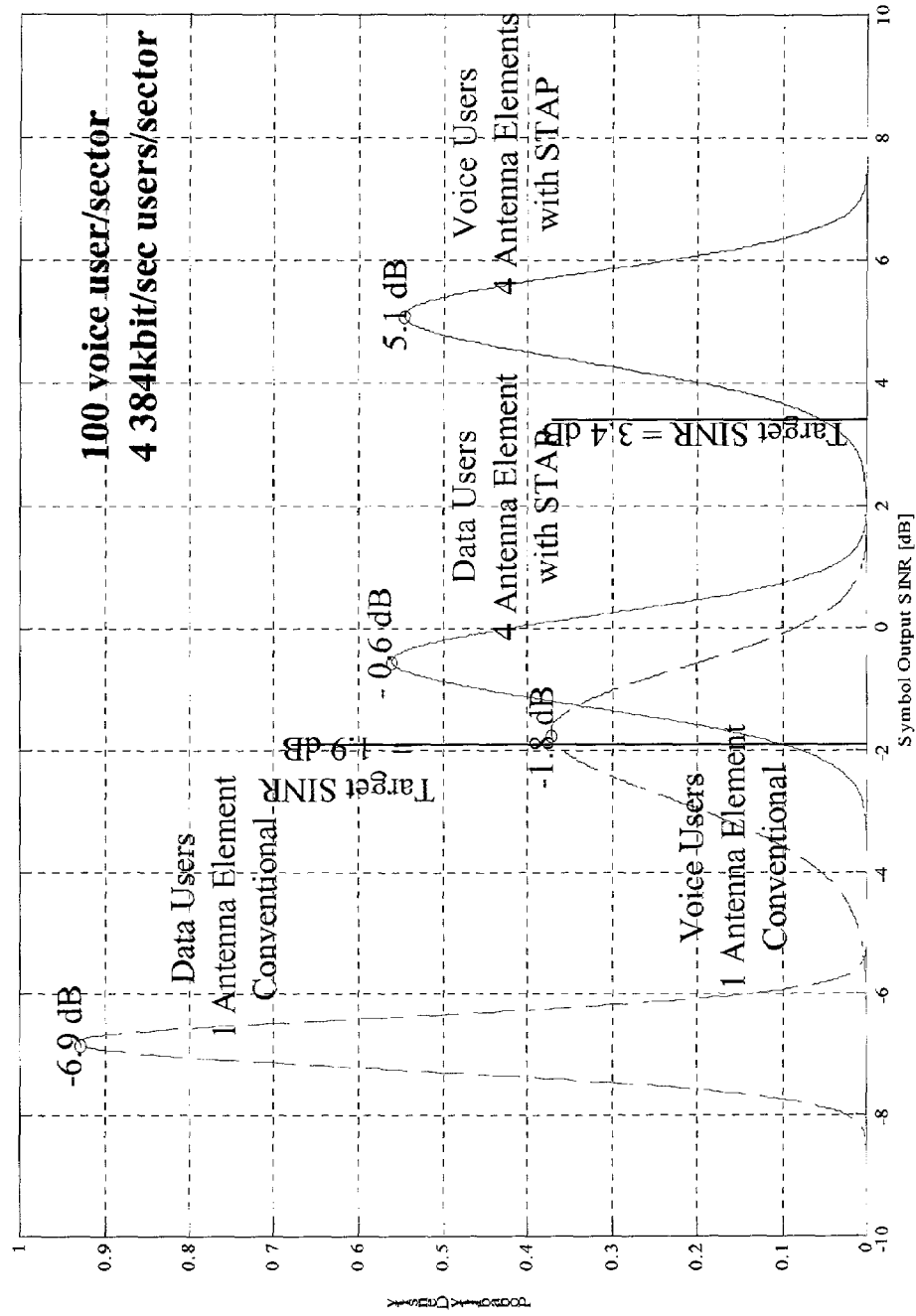
Figure 16. SINR Performance for WCDMA Voice and Data Service

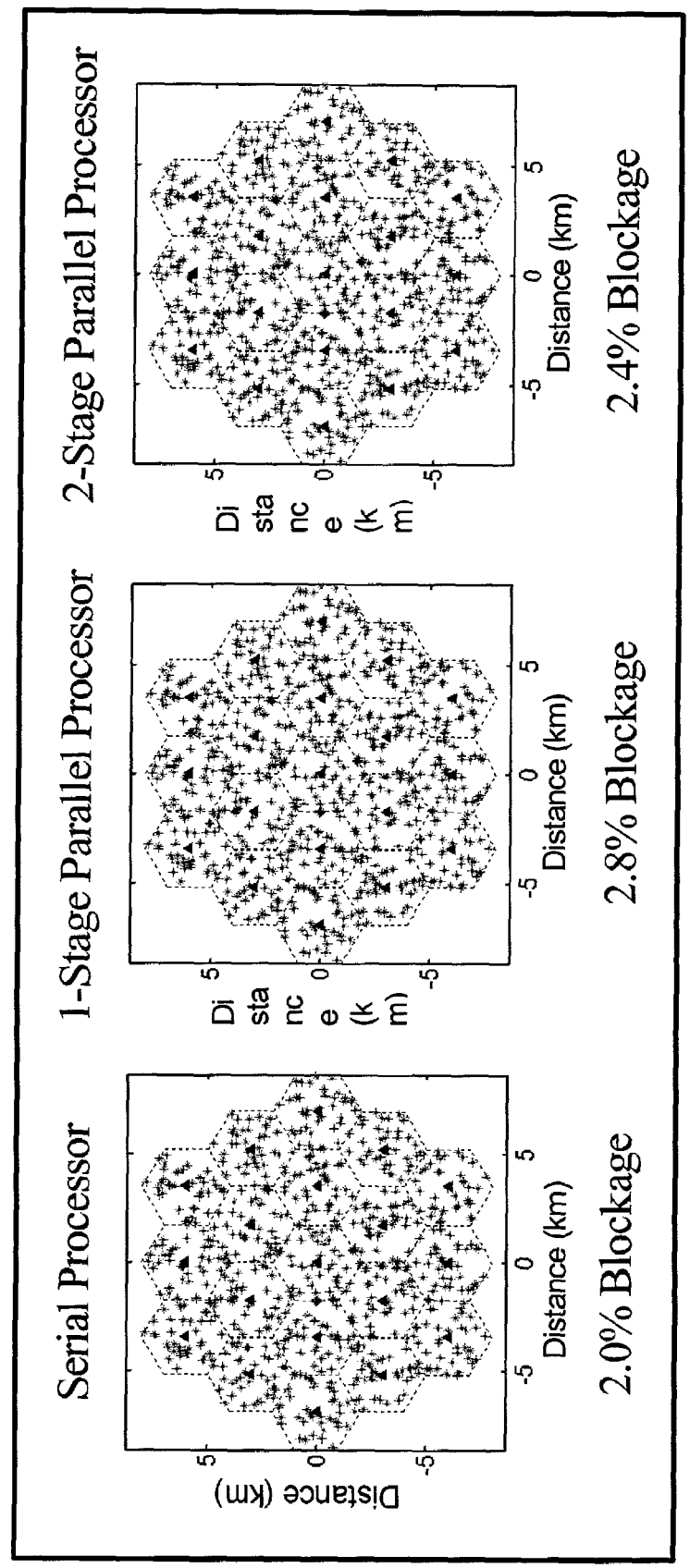
Figure 17. Benefit of the 2-Stage Parallel MUD Processor

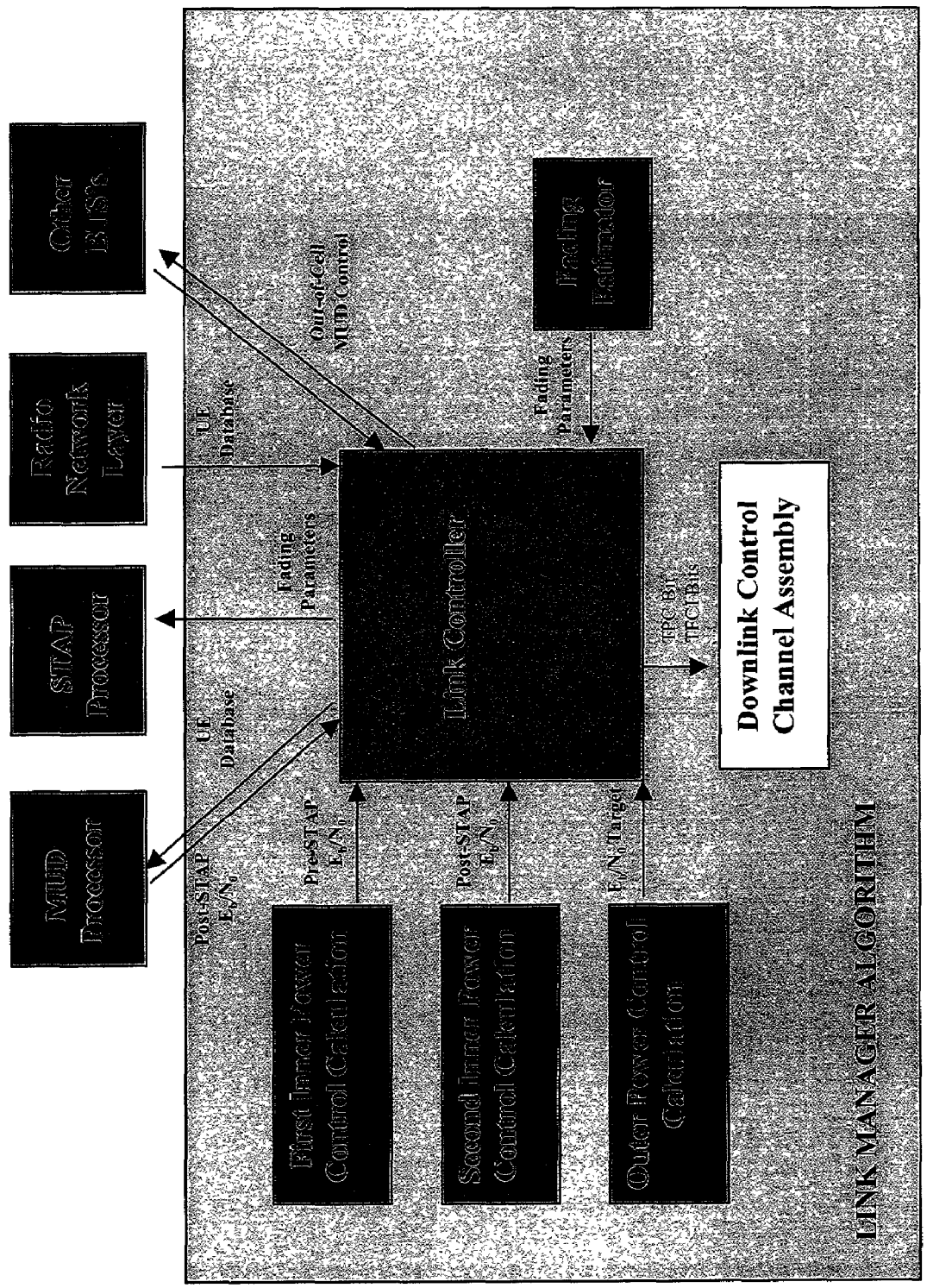
Figure 18. The Link Manager.

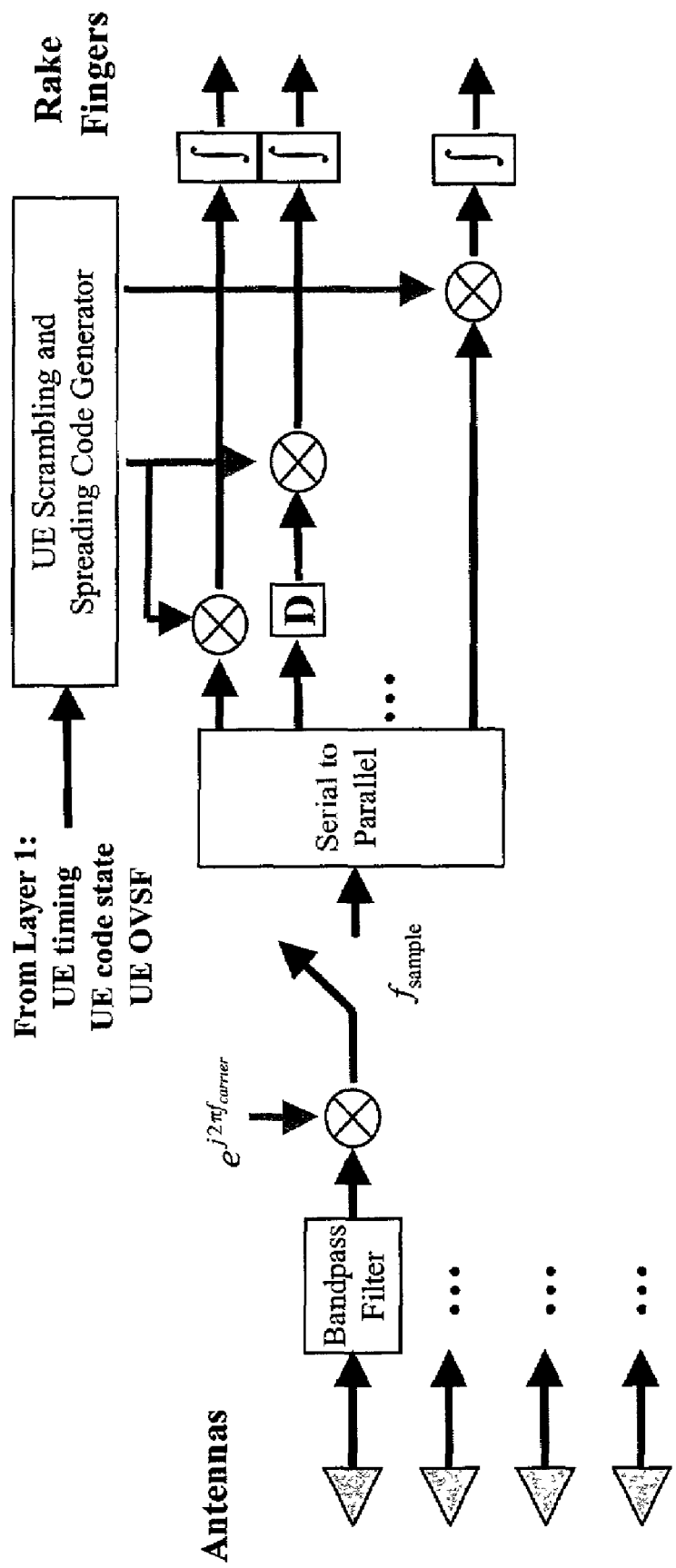
Figure 19. Generation of Metrics for the Inner Loop Power Control Algorithm.

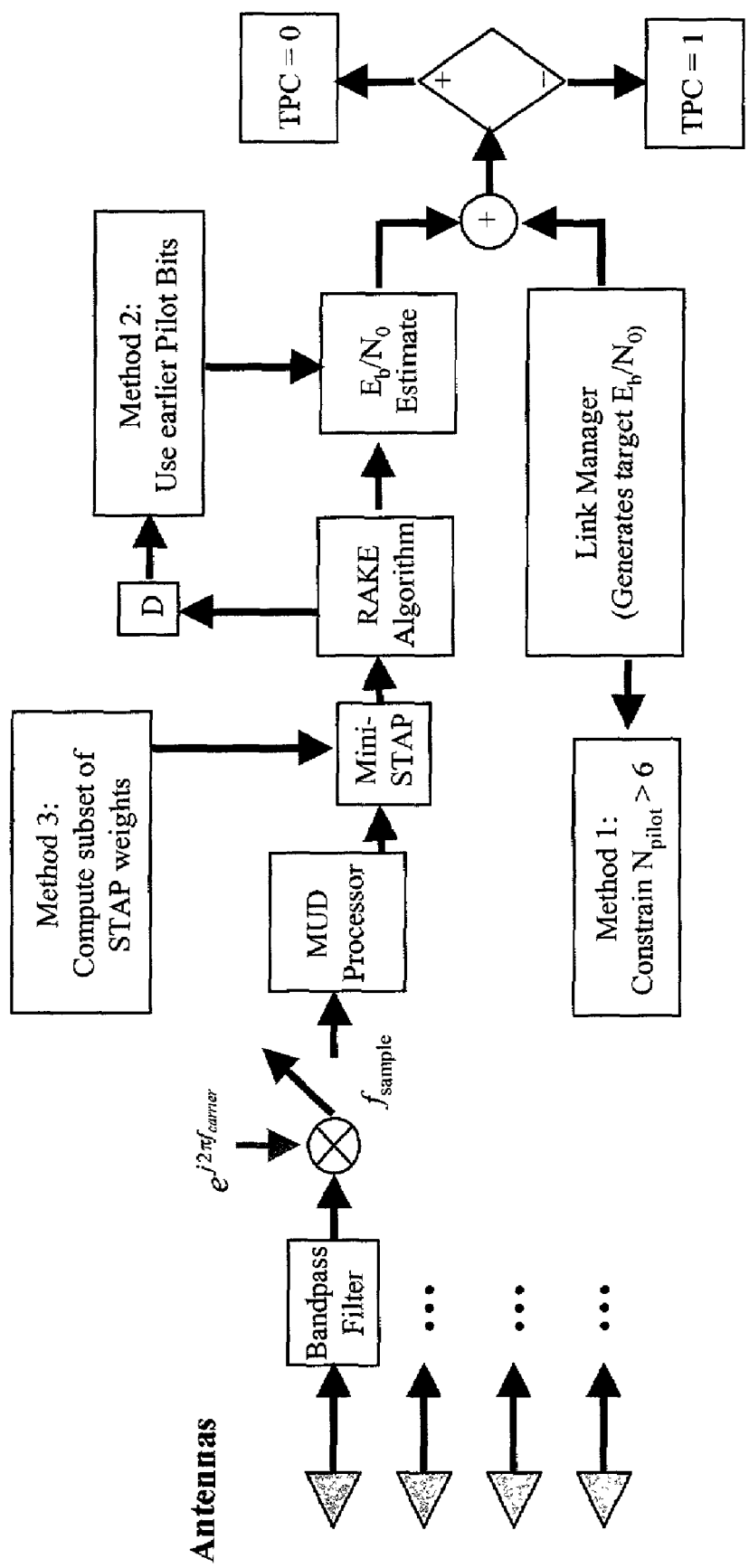
Figure 20. Compensating for the Lack of STAP Gain in the Inner Loop Power Control.

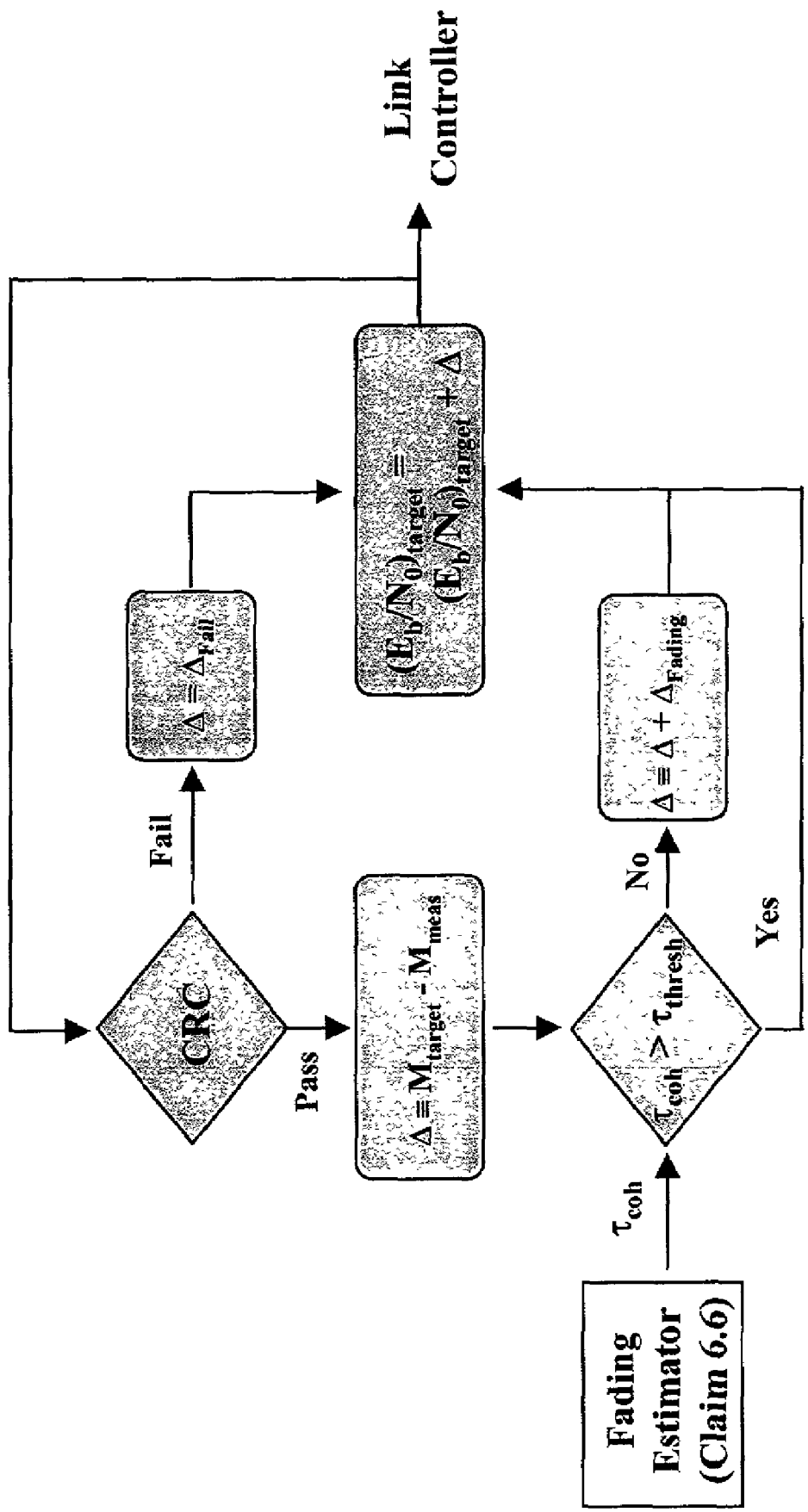
Figure 21. The Outer Control Loop Algorithm.

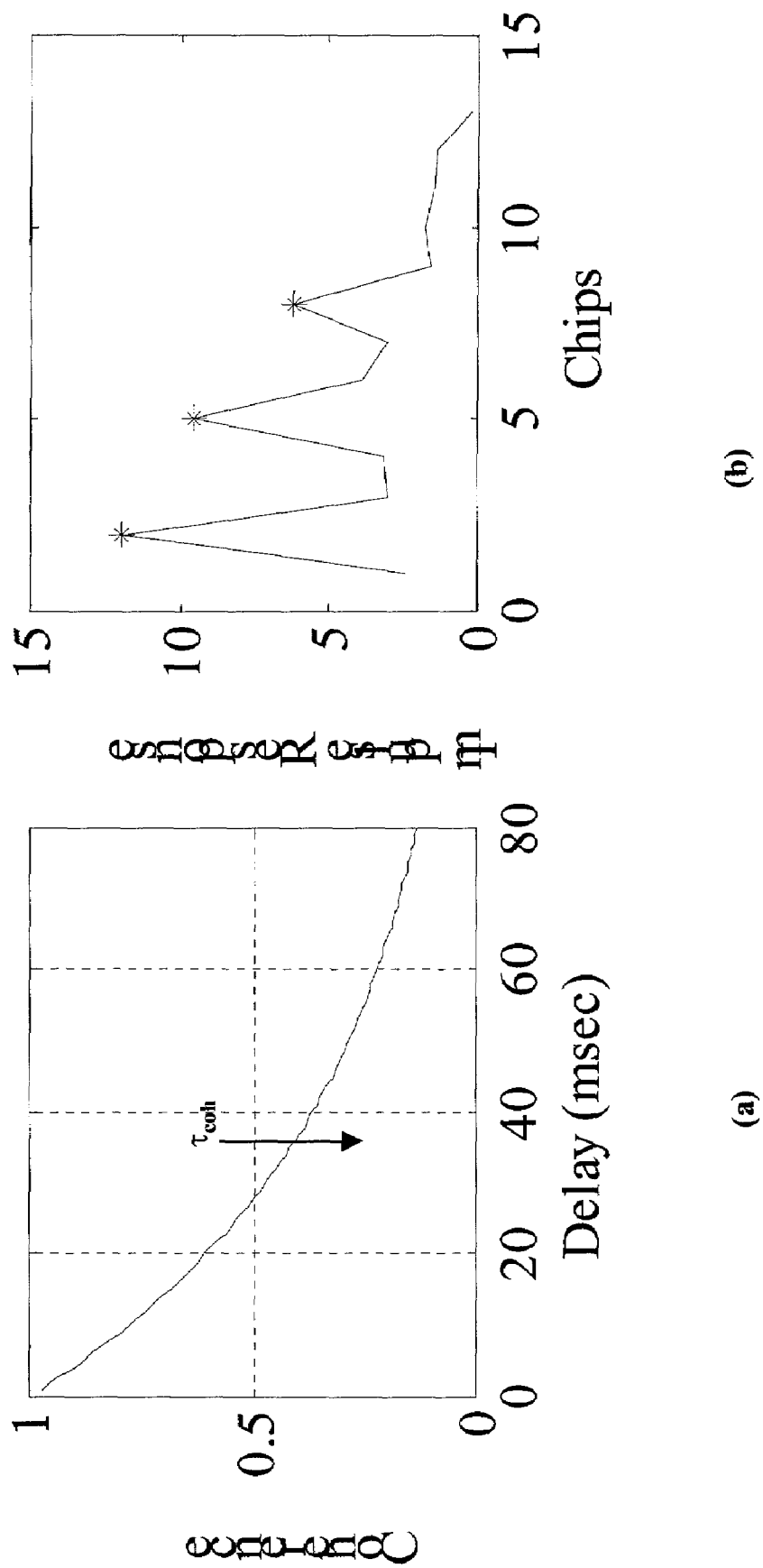
Figure 22a. The Channel Self-Coherence Function and Delay Spread Spectrum Function.

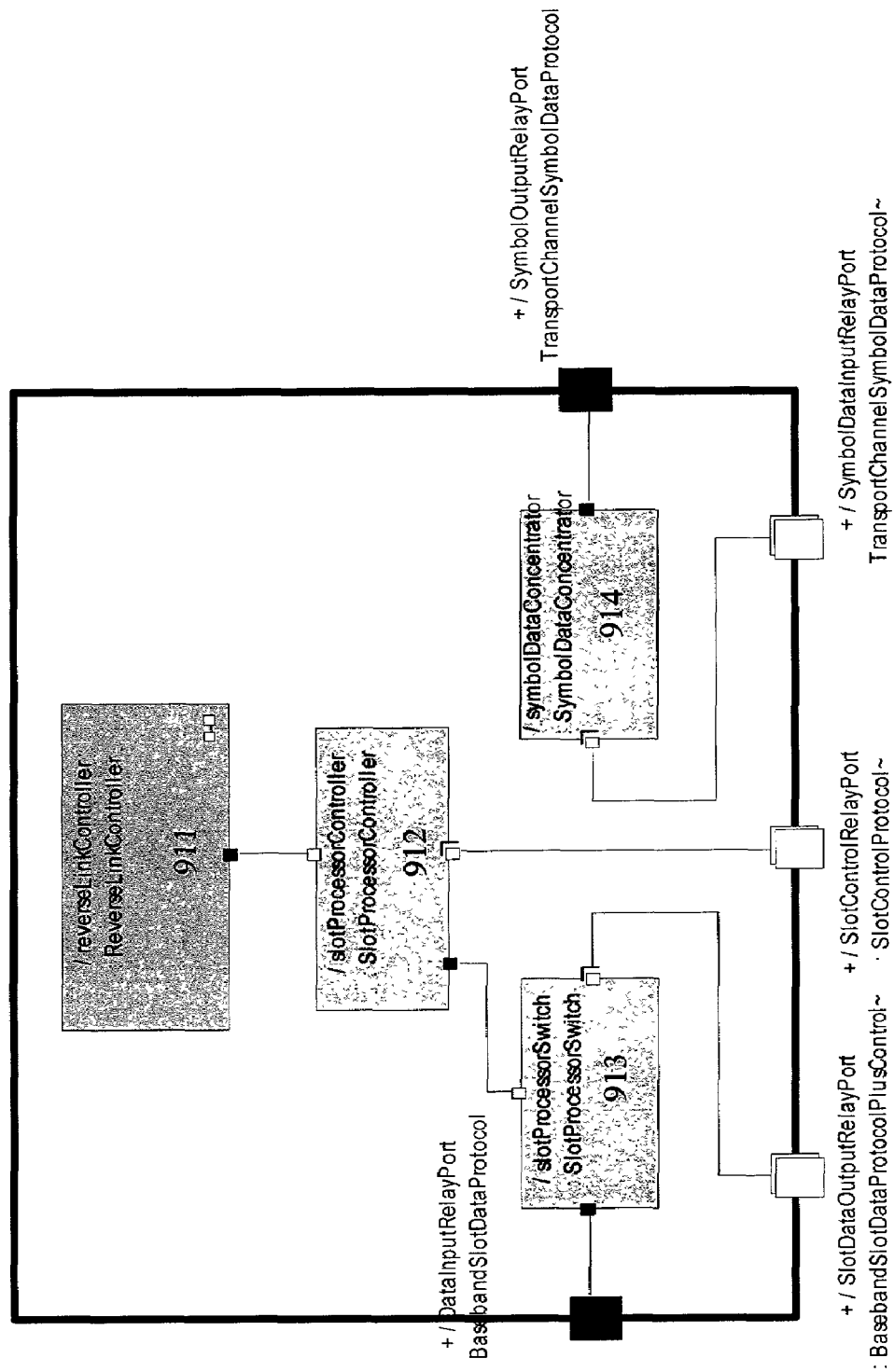
Figure 24 – Reverse Link Processor Structure Diagram

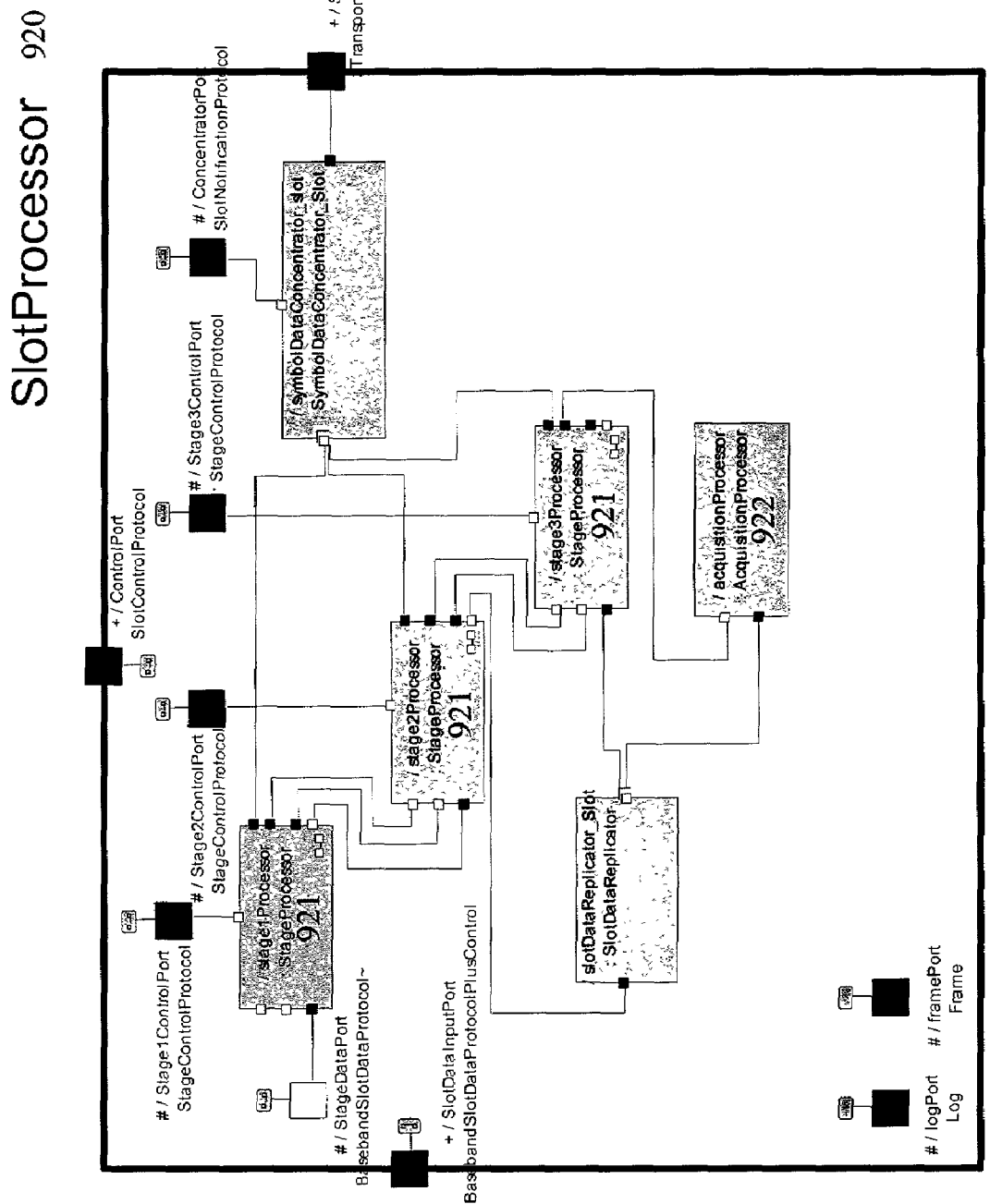
Figure 25 – Slot Processor Structure Diagram

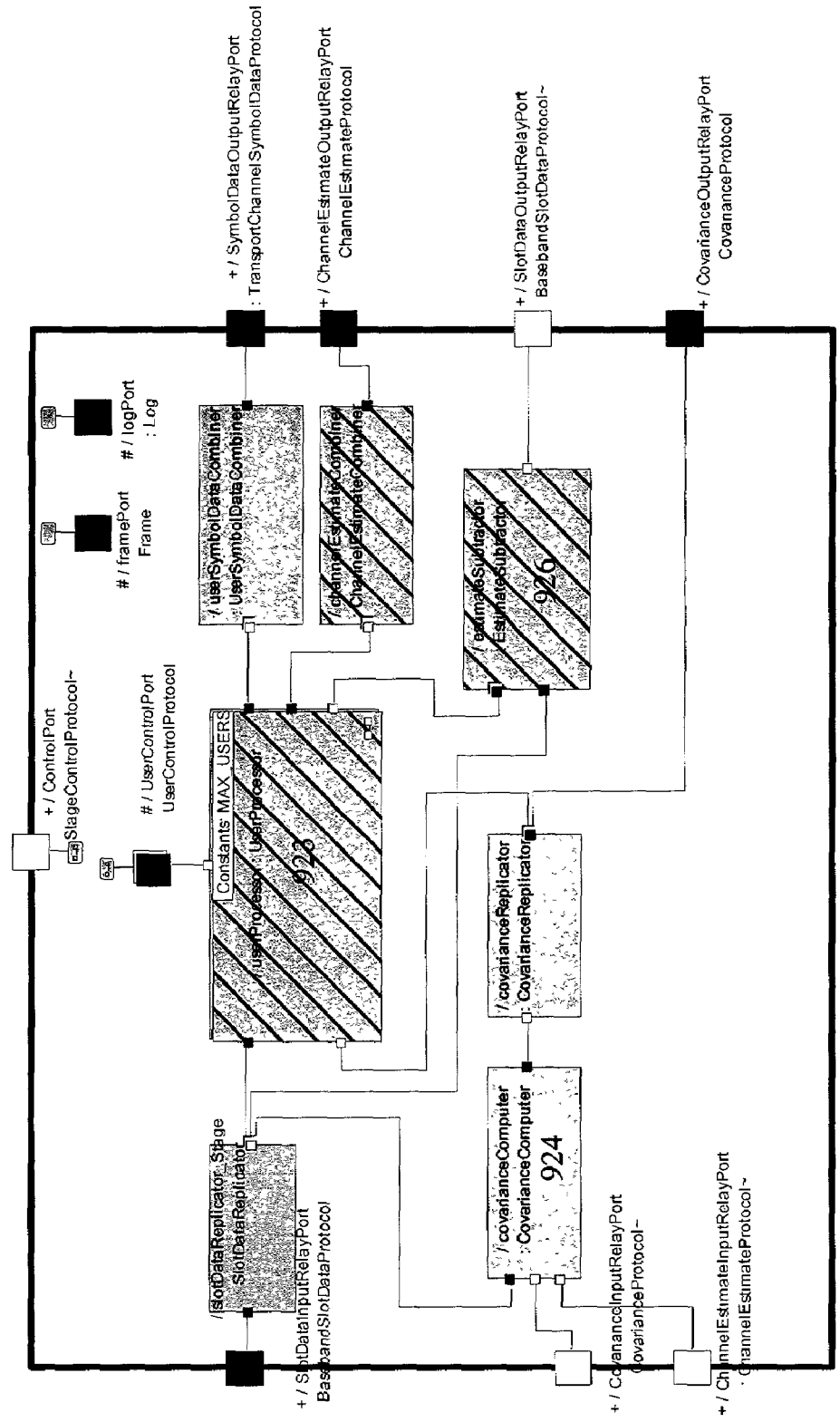
Figure 26 – Stage Processor Structure Diagram

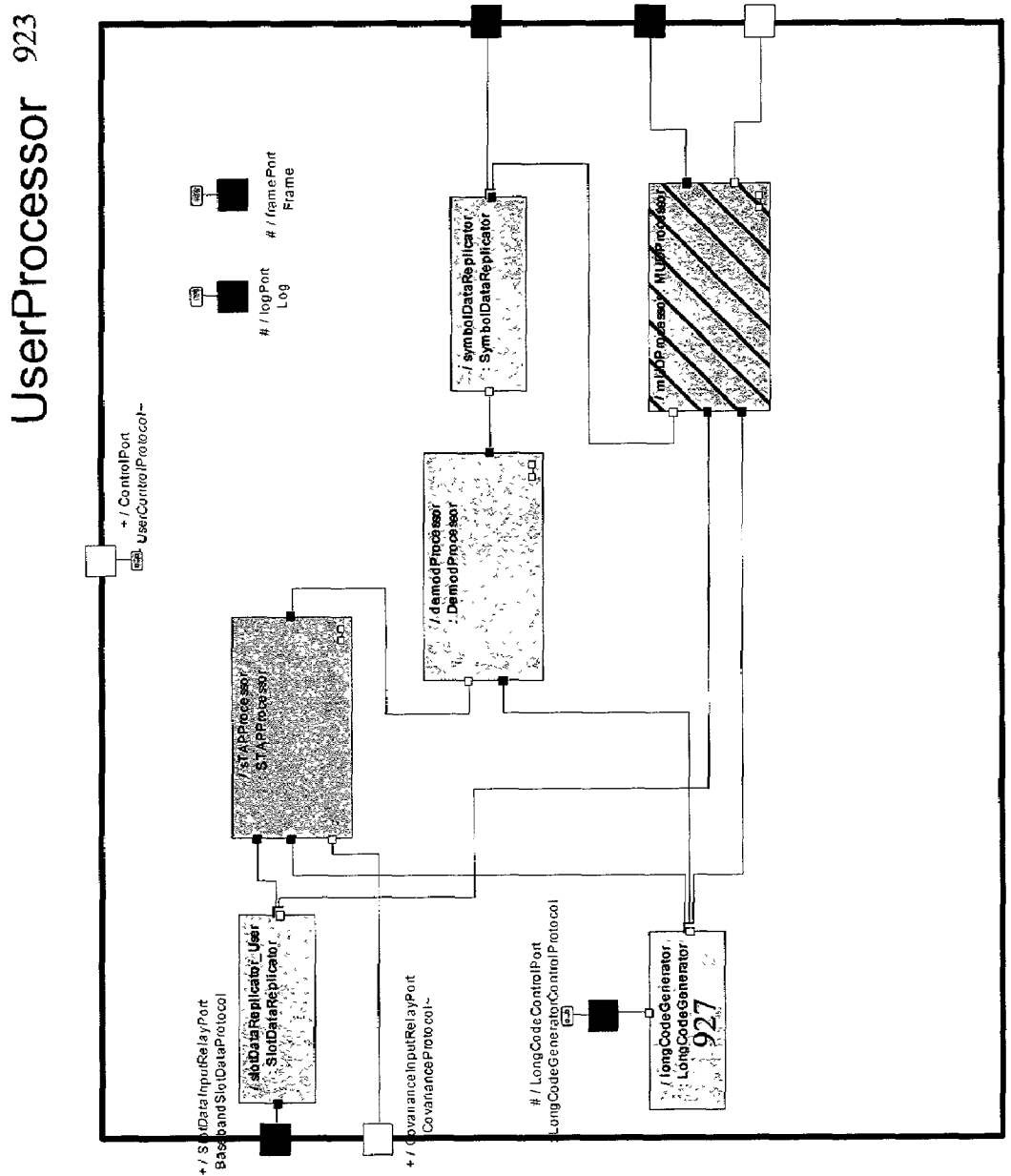
Figure 27 – User Processor Structure Diagram

MULTISTAGE RECEPTION OF CODE DIVISION MULTIPLE ACCESS TRANSMISSIONS

CROSS-REFERENCE TO RELATED APPLICATIONS

This non-provisional patent application claims the benefit of U.S. Provisional Patent Application No. 60/279,673, filed Mar. 30, 2001, and incorporates herein by reference in its entirety.

FIELD OF THE INVENTION

This invention relates generally to spread spectrum communication systems, and more particularly to the use of specialized interference cancellation techniques, including an novel combination of Space Time Adaptive Processing (STAP) and Multi-User Detection (MUD), to reduce MAI and improve the capacity of a spread spectrum-based cellular system.

BACKGROUND OF THE INVENTION

Multiple Access Interference (MAI) is a significant source of interference (noise) that limits the capacity and performance of Code Division Multiple Access (CDMA) wireless services. Higher data rate services like those provided by Wideband CDMA (WCDMA) systems exacerbate this situation as processing gain is reduced and must be compensated for by higher power (signal) levels, which in turn limits capacity for those applications.

A number of techniques have been conceived for mitigating MAI in spread spectrum wireless systems and thus improving overall network performance. The proposed solutions may be grouped into at least three classes: adaptive antenna array technology, multi-user receivers, and rapid power control. One class of these techniques employs adaptive array techniques along with specialized adaptive processing to improve network performance. U.S. Pat. Nos 6,154,485; 6,141,567; 6,115,409; 6,108,565; 6,100,843; 6,061,553; 6,031,877; 5,930,243; 5,904,470; and 5,828,658 are examples of these techniques.

Another class of techniques utilizes complex algorithms in the receiver to concurrently estimate the signals from multiple users utilizing a technique referred to as MUD or variants thereof. U.S. Pat. Nos 6,137,843; 6,108,564; 6,081,516; 6,014,373; 6,002,727; 5,956,333; and 5,719,852 are examples of these technological schemes.

A third class of techniques involves network link performance monitoring and control functions including monitoring and controlling transmitted powers from the base station and the mobile station and/or monitoring and controlling link signal quality metrics to mitigate MAI and improve overall network performance. Examples of this technology include U.S. Pat. Nos. 6,167,031; 6,131,049; 6,157,619; 6,119,010; 6,118,983; 6,104,933; and 6,088,335.

While the above-referenced patents disclose ways to improve WCDMA network performance within the specific technology (adaptive antennas and adaptive processing, MUD filtering techniques, or network quality performance monitoring and enhancement), they do not address those technological opportunities that collectively improve system performance across the entire receiver architecture.

Some aspects of this invention which separate it from other published and patented systems and methods are an integrated receiver architecture configured with a suite of signal processing algorithms incorporating the power of both STAP and MUD and the real-time control algorithms that assigns/allocates processing requirements. This architecture seeks, among other things, to optimize WCDMA network performance against practical real-time system constraints, notably computational complexity (cost) and network performance (throughput), and latency.

SUMMARY OF THE INVENTION

Preferred embodiments of the present invention are placed in the context of a communications network and include methods of reducing multiple access interference in the radio frequency communications path between the network base station and UE. The preferred methods include STAP and MUD in a plurality of stages in a base station receiver. Specific embodiments accomplish this by selecting certain UE connections for MUD processing by stage. Then, in two or more stages, demodulating the UE connections selected for MUD processing using STAP, and MUD canceling UE connections selected for MUD processing.

Within the latency requirements of the network, preferred embodiments of the present invention also command a transmit power for each UE connections in order to exploit the effect of interleaved STAP and MUD processing.

In further embodiments, the invention includes a method of reducing multiple access interference where in a first frame, UE requesting a connection having bandwidth greater than a voice-grade channel are provided an aggregate physical channel bandwidth less than that requested.

BRIEF DESCRIPTION OF THE DRAWINGS

FIG. 1 is a block diagram illustrating relationships between functional aspects of a preferred embodiment of the present invention.

FIG. 2 is a block diagram illustrating relationships between functional aspects of a DEMOD UE function block of a preferred embodiment of the present invention.

FIG. 3 illustrates results of a simulation of the present invention comparing capacity increase versus MAI reduction for various data rates using a preferred embodiment of the present invention.

FIG. 4 illustrates the conceptual flow of a simulation the performance of preferred embodiments of the present invention.

FIG. 5 illustrates results of a simulation comparing network loading for voice grade channels.

FIG. 6 illustrates results of a simulation comparing network loading for a varied QoS mix.

FIG. 7 illustrates results of a simulation of capacity versus coverage area for a cell populated by voice-grade users using conventional a conventional WCDMA receiver and a receiver implementing a preferred embodiment of the present invention.

FIG. 8 illustrates results of a simulation of capacity versus coverage area for a cell populated by data users (various rates) using conventional a conventional WCDMA receiver and a receiver implementing a preferred embodiment of the present invention.

FIG. 9 illustrates results of a simulation of capacity versus coverage area for a cell populated by a mix of voice and data users (various rates) using conventional a conventional WCDMA receiver and a receiver implementing a preferred embodiment of the present invention.

FIG. 10 illustrates results of a simulated comparison, for a mix of voice and date users, of the capacity and noise levels associated with: a macro-cell solution employing a conventional WCDMA receiver, a macro-cell solution employing a receiver implementing a preferred embodiment of the present invention, and a micro-cell solution employing conventional WCDMA receivers.

FIG. 11 illustrates processing complexity associated with preferred embodiments of the present invention.

FIG. 12 illustrates a relationship between number of MUD processes and STAP gain for 37 cell networks of 384 kbps data users for a preferred embodiment of the present invention.

FIG. 13 illustrates a MUD processing algorithm for one UE connection in accordance with a preferred embodiment of the present invention.

FIG. 14 illustrates the results of a simulation of a preferred embodiment of the present invention.

FIG. 15 illustrates a comparison of SINR performance for WCDMA voice service for a one antenna element conventional system and a four-element system employing STAP.

FIG. 16 illustrates a comparison of SINR performance for WCDMA voice and data service for various configurations of STAP and number of antenna elements.

FIG. 17 illustrates a benefit of two-stage parallel MUD processing.

FIG. 18 is a block diagram illustrating relationships between functional aspects of a preferred embodiment of a link manager of the present invention.

FIG. 19 is a functional block diagram illustrating generation of metrics for an inner power control loop in accordance with a preferred embodiment of the present invention.

FIG. 20 is a functional block diagram illustrating compensation for lack of STAP gain in a power control loop of preferred embodiments of the present invention.

FIG. 21 is a functional block diagram illustrating an outer power control loop of preferred embodiments of the present invention.

FIG. 22 illustrates a channel self-coherence function and delay spread spectrum function of preferred embodiments of the present invention.

FIG. 24 is a block diagram of a design architecture of a reverse link processor of the present invention.

FIG. 25 a block diagram of a design architecture of a slot processor of the present invention.

FIG. 26 is a block diagram of a design architecture of a stage processor of the present invention.

FIG. 27 is a block diagram of a design architecture of a user processor of the present invention.

DETAILED DESCRIPTION OF THE INVENTION

Figure 23:
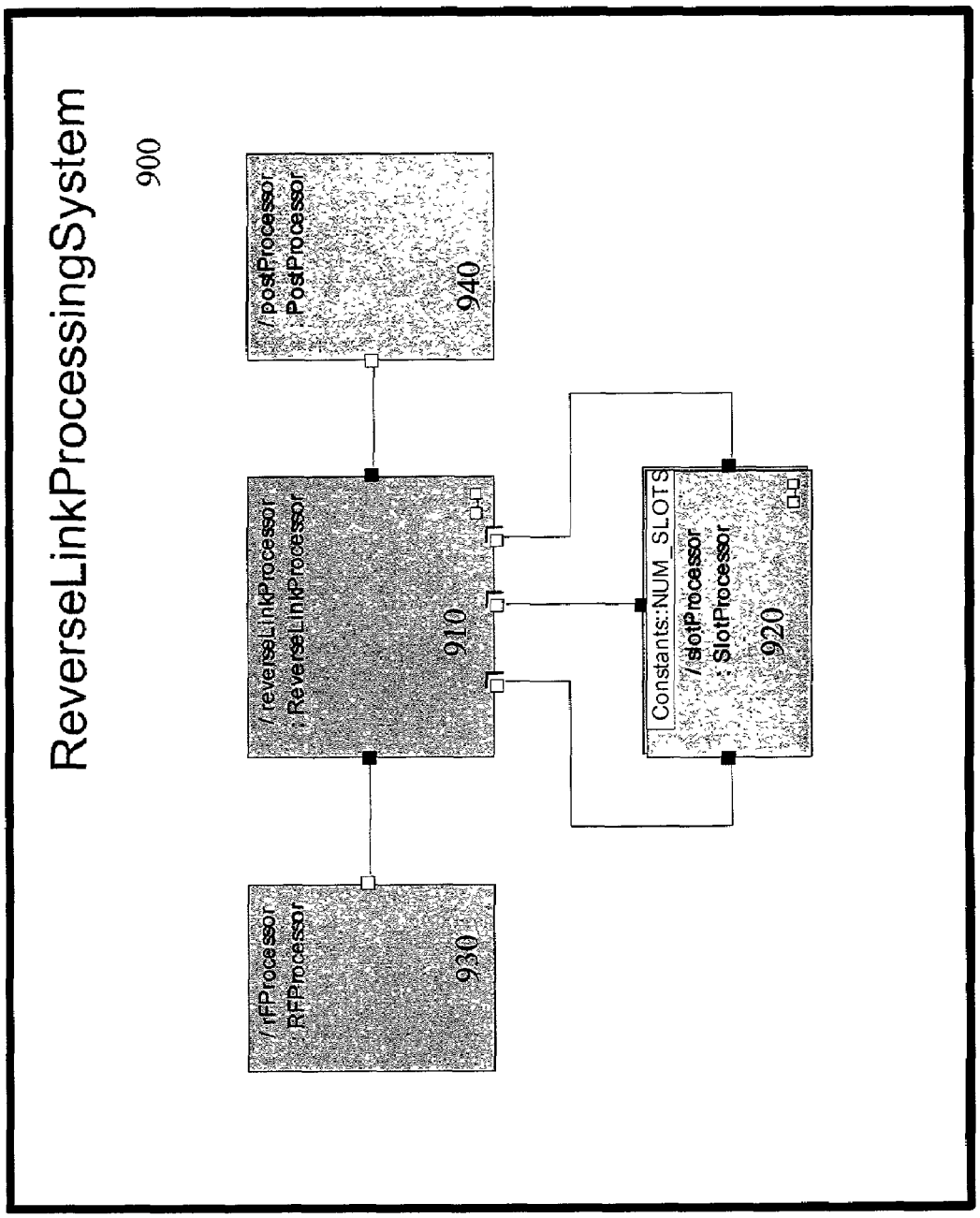
FIG. 23 is a block diagram of a design architecture of a reverse link processing system of the present invention.

Referring to FIG. 1, a WCDMA receiver architecture 100 is disclosed that includes a space-time adaptive processing (STAP) and multi-user detection (MUD) filter architecture, a MUD Controller 400 that allocates MUD processes to in-cell users and users in soft handoff, and a Link Manager 500 that levies real time requirements on radio resource and quality of service (QoS) management algorithms in a base station. The architecture enables elements of the receiver (filters, MUD Controller 400, and Link Manager 500) to operate in a manner that offers improvements in performance measures such as interference mitigation, signal equalization, and signal fading compensation in accordance with near-real-time assessments of network loading and quality of service mix, and physical channel conditions.

The WCDMA receiver architecture provides a nominal 5×base station capacity increase over the conventional WCDMA de-spreading and demodulation processing as specified by the Third Generation Partnership Project (3GPP). The architecture is fully compliant with the 3GPP specification. Besides supporting increased operating revenues per base station in the network, the receiver architecture also provides the coverage to implement higher capacity WCDMA networks over a macro-cellular footprint without requiring additional micro and pico cell sites.

An additional benefit of the integrated STAP/MUD architecture is the de-coupling of the network capacity for voice users from capacity for high speed data users. In a conventional WCDMA receiver, a 2 Mbps data user contributes about 250 times more MAI than a single voice user. Without the use of MUD techniques, the high speed data users dominate the MAI environment, and their impact directly limits the overall system capacity. This results in a system where the cost of the high speed data connection is 250 times that of a voice user. By selectively applying MUD to the high speed data users, the overall system capacity is improved, and the direct link between the number of data users and the number of voice users that can be supported is broken.

The integrated receiver architecture incorporates a combination of spatial, temporal, and user-selective filtering, network activity awareness, and link layer control to reduce reverse link Multiple Access Interference (MAI) in a wideband CDMA network that supports voice and multi-rate data connections, such as WCDMA and CDMA2000. FIG. 1 illustrates the functional receiver design. The following description of the invention provides a summary of each function in FIG. 1. After the functional design description, the network capacity and coverage improvements associated with the claimed invention are summarized.

Overview

Referring to FIG. 1, the Radio Frequency (RF) signals 10 arriving at each reverse link antenna element 20 in a given base station sector are conditioned 30 prior to being processed by preferred embodiments of the invention such that digitally over-sampled complex base-band data 40 is provided to the receiver described herein. A common technique for conditioning the received RF signal 10 is to RF filter, down-convert to intermediate frequency (IF), digitize, bandpass filter, and digitally down-convert to base-band. Digital base-band data 40 from each base transceiver station (BTS) sector antenna comprises the payload input for the preferred embodiments of the invention. Signaling and control data are also made available to the receiver, via the Link Manager 500 interface to Layer 3, and will be described later in this disclosure. The digital base-band signal over a specific time window can be represented by the matrix $X_{m,n}$ where m equals the number of antenna elements in the BTS sector of interest, and n equals the number of digital samples in the specified time window.

Figure 2:
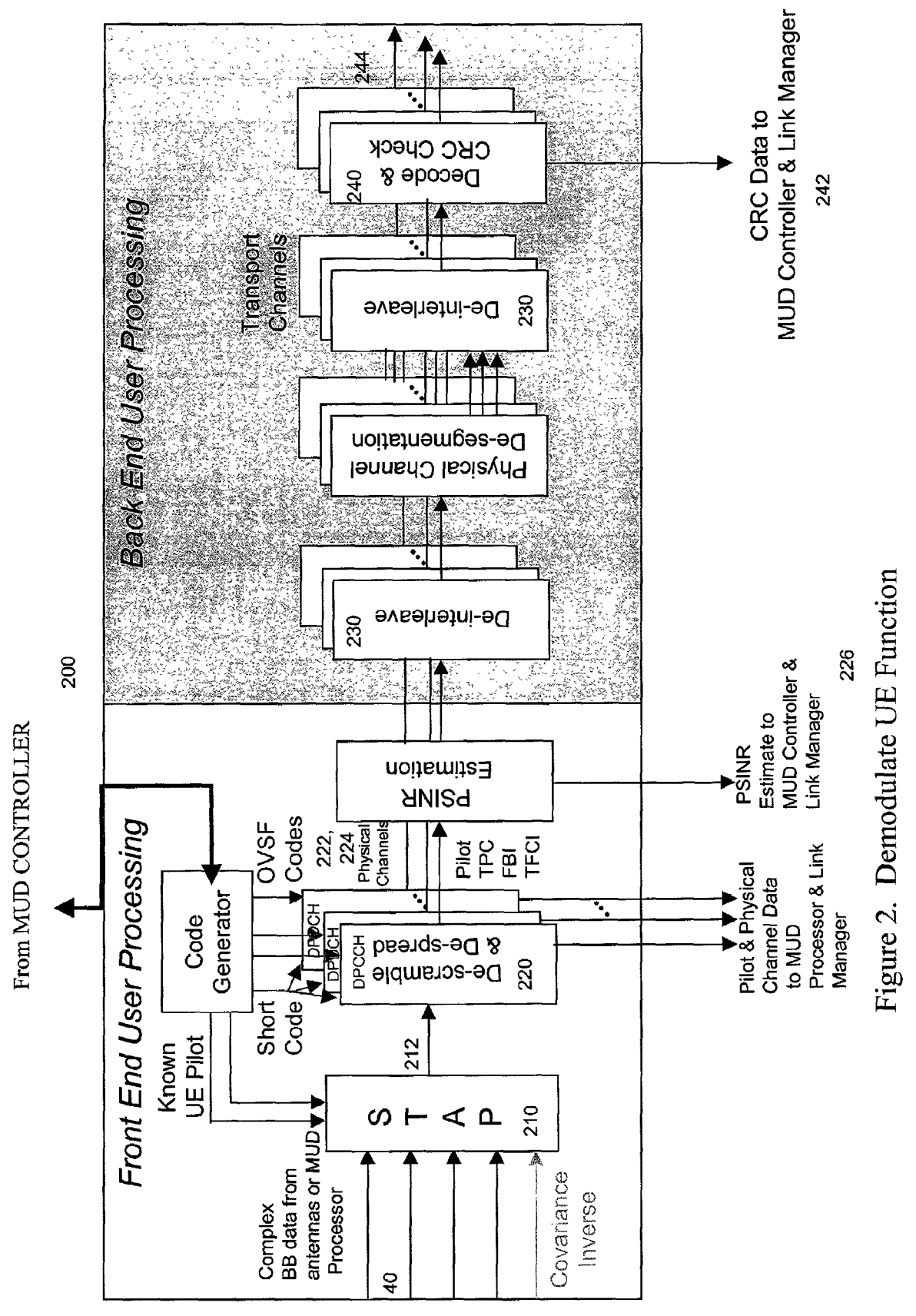

As illustrated in FIG. 1, modulated transmissions from user equipment (UE) are demodulated in time-sequenced stages in the digital receiver 100; the Demodulate UE 201, 202, 203 function is further illustrated in FIG. 2. Demodulate UE 201, 202, 203 converts select received base-band digital samples 40 to information symbols, Demodulate UE201, 202, 203 is applied to base-band data 40 (both before and after MUD filtering as indicated in the figures) for each UE in the BTS sector of interest, including users in neighboring cells that are in the state of soft hand-off. The Demodulate UE 201, 202, 203 function includes STAP beamforming 210, de-scrambling and de-spreading 220, de-interleaving 230, and decoding 240. Bundling of transport channels occurs at a higher Open Systems Interconnection (OSI) layer in the base station.

The Demodulate UE 201, 202, 203 function converts m antenna channels of digital base-band data 40 into several channels of information bits, including Dedicated Physical Control Channels (DPCCH) 222 and Dedicated Physical Data Channels (DPDCH) 224. According to the Third Generation Partnership (3GPP) WCDMA air interface specification, user applications such as voice and specific data applications are configured as DPDCH's. See 3GPP Technical Specification 25.211 V3.40. Multiple Dedicated Physical Channels can be associated with a single UE, and each channel is distinguished in the air interface by a different Orthogonal Variable Rate Spreading Factor code (OVSF code). Assignment of the UE long code (scrambling code) and OVSF codes is performed at a higher Open Systems Interconnection (OSI) layer in the BTS and conveyed to the Demodulate UE 201, 202, 203 function (as an initialization vector) by the Connection Management function (not described herein).

For those UE connections designated for MUD processing, the received forward error correction (FEC) symbols for each control and data channel are estimated immediately after de-spreading 220 in the Demodulate UE 201, 202, 203 function. The estimated symbols 226 are sent to a MUD Processor 301, 302 to support MUD parameter estimation. CRC data 242 and information symbols 244 for each channel estimated after decoding are sent to the Link Manager 500 to support calculation of MUD effectiveness metrics.

STAP beamforming 210 is the first operation in the Demodulate UE 201, 202, 203 function. The STAP beamformer 210 is a 2-dimensional filter for which the first dimension corresponds to antennas in an array on the cell tower, and the second dimension corresponds to time samples in the digital baseband data 40 per antenna element. A STAP beamformer with m antennas and n time taps requires computation of a length m* n complex weight vector that is multiplied by the digital baseband data and accumulated to produce one complex beamformed sample per digital data sample across antennas. A STAP beamformer weight vector is computed and applied for each user connected to the network. Because application of the STAP beamformer weights is performed digitally, embodiments of the invention include a type of digital beamforming, with no requirement for analog signal combining.

The MUD Controller 400 monitors network MAI contributions by sectors and users. Leveraging known quality-of-service (QoS) characteristics of each UE and other specified observable quantities, the MUD Controller 400 selects the UE transmissions to be processed by each MUD Processor 301, 302. The selection process is designed to reduce network MAI, provide enhanced network capacity, and seek effective usage of the processing resources required to implement MUD.

The MUD Controller 400 receives a table of UE parameters from the Link Manager 500, and estimates the MAI contribution of the UE connections in the cell and in soft handoff to the cell that the BTS controls. UE connections that have adequate signal to interference plus noise ratio (SINR) to achieve the desired cancellation are identified and sorted by MAI contribution. The rank-ordered (by MAI contribution) list of UE connections is used to select candidates for cancellation in each MUD Processor 301, 302. The number of MUD processes executed depends on how much computational resources are dedicated to MUD processing in a given BTS Sector. The MUD Controller 400 also determines which connections are processed in which stage of MUD.

The MUD Controller 400 takes the estimated symbols from the Demodulate UE 201, 202, 203 function associated with each MUD stage and passes them to the Link Manager 500. Additionally, the MUD Controller 400 estimates the SINR on the UE selected for cancellation in each MUD stage, and passes that information to the Link Manager 500 for inclusion into the power control loop processing. If no UE connections have an adequate SINR for the application of MUD, or if more UE connections can be processed than the number with adequate SINR, then the MUD Controller 400 requests that the Link Manager 500 raise the target $E_b/N_0$ for the UE next on the sorted MAI list.

Each MUD Processor 301, 302 operates on those LE connections chosen by the MUD Controller 400. Specifically, the MUD Processor 301, 302 estimates UE connection signal characteristics, re-constructs a digital baseband replica of the signal, and subtracts the replica signal out of each antenna digital baseband signal 40 thereby removing the UE connection's contribution to MAI. Because MUD Processor 301, 302 performance often improves when applied successively to a group of interference sources, a second stage of MUD Processing 302 is included in the receiver architecture. Additional successive stages are not included due to receiver latency constraints and current hardware performance abilities. Each successive MUD stage is followed by a Demodulate UE 202, 203 function, each of which require a discrete amount of time to provide the data required by the MUD Processor 301, 302.

Acquisition Processing 600 includes searching known UE acquisition request codes to acquire new UE requesting service. The location of Acquisition Processing 600 in the architecture reduces the MAI seen by the receiver when searching for network access requests, an important feature because UE in CDMA networks successively increase the radiated power of access requests when such requests are not acknowledged by the serving base station. By minimizing MAI during acquisition processing, the receiver reduces the overall network MAI levels due to service access requests.

The STAP Covariance Inverse function 700 estimates a single covariance function for all of the UE connections associated with each MUD stage. Because the interference environment as detected by the receiver changes after each stage of MUD, the STAP Covariance Inverse is updated after each stage to maximize STAP and MUD performance gain in light of latency and processing (among other) constraints.

The Link Manager 500:
  manages the inner and outer power control loops,
  adjusts user operating points to support the requirements of the MUD Controller 400, and
  helps provision high data rate requests in a manner that is consistent with the requirements of effective STAP and MUD MAI reduction.

The Link Manager 500 leverages signal processing SINR gains into increased capacity by adjusting the power control commands to the UE in the network. One effect of the advanced signal processing is to increase the received SINR of the UE signals. In the absence of appropriate power control, the result is simply decreased bit error rate and increased link reliability. However, by exploiting the improved interference suppression to reduce UE transmit power the interference posed by each reduced-power UE to other UE is reduced in preferred embodiments of the present invention. As capacity is practically defined in these networks when the interference environment reaches a particular level, increased capacity results when power is controlled to keep reliability at predetermined specified levels. For example, a 3 dB SINR gain on a given UE supports a 3 dB reduction in radiated power by the UE., which when applied to all of the UEs in the network can result in a 4–8 dB reduction in MAI (depending on the QoS). FIG. 3 illustrates the reduction in MAI provided by STAP gain, and the amount of additional network capacity gained when such reductions in MAI are realized by implementing STAP. For example, a 3 dB reduction in MAI results in an additional 3000 kbps of capacity in a cell serving 384 kbps users. Looking at the left hand portion of FIG. 3, and the 384 kbps curve, the system would support about 8 more users per BS if the MAI reduction is 3 dB. At 384 kbps/user, this amounts to about another 3000 kbps capacity per BS.

Capacity and Coverage Performance Summary

In order to illustrate the coverage and capacity benefits of a multi-stage STAP and MUD Receiver of the present invention, a WCDMA RF Network simulation is used. The simulation was originally developed to model Interim Standard (IS)-95 network performance, and has been benchmarked against existing IS-95 networks.

Overview of The Simulation. FIG. 4 illustrates the features and the flow of the RF network simulation. A network laydown 810 of users is generated which feeds several functions required to determine whether or not the chosen laydown of users is supportable by the air interface. Propagation loss is computed 820 using the Hata model and is used to determine UE-to-base-station assignments 830. In accordance with the 3GPP WCDMA specification, each UE is characterized by a control channel and a mix of voice and data channels as commanded by input to the simulation 840. Either a block inversion or an iterative technique is used to compute the network power control solution 850, which, in turn, is used to determine which connections in the network can and cannot be serviced 860. Network capacity for a laydown is computed by summing all serviced data channels across the network. In order to determine a maximum network capacity condition, users are continuously added to the network until a network breakage condition is reached. The network breakage condition used to support this disclosure is when five percent of connections are denied service in the center cell in the network. FIG. 5 illustrates such a condition for a network of voice users. The plot on the left illustrates a healthy operating network with an average of 35 voice users per sector. The plot on the right illustrates the breakage condition. When attempting to service an average of 70 users per sector, 6.2% of the connections are denied service in the center cell, resulting in the declaration that the network has been driven to maximum capacity. The I+N plots illustrate the level of MAI in dB milliwatts (dBm) in the network at each sector. FIG. 6 illustrates three network loading conditions for a mix of voice and data connections in the network.

The WCDMA RF Network Simulation is used to compare network capacity for preferred embodiments of the disclosed invention and a conventional WCDMA receiver. For reference, a conventional WCDMA receiver is defined as a selection diversity based antenna followed by a rake filter and the de-spread, demodulate, and decode functions as described in the air interface specifications of the 3GPP.

Simulated Performance of Preferred Embodiments of the Disclosed Invention. Table 1 summarizes the capacity advantage of embodiments of the invention over conventional WCDMA reverse link processing, as determined using the simulation, for the following baseline conditions:

3 sectors per cell;
4 antenna elements per sector; and
4 MUD processes per sector.

As will be illustrated later in this document, embodiments of the invention are scalable. The 5× improvement operating point is chosen as an example. Note that the performance gain illustrated in Table 1 varies over QoS mix. The network laydown that has a significant number of high data rate connections (384 kbps) shows the greatest benefit for embodiments of the invention due to multi-stage MUD processing.

One aspect of embodiments of the invention is the opportunity to provide increased high capacity voice and data services over a macro-cellular network footprint without resorting to microcell or picocell solutions. Because conventional WCDMA reverse link air interface processing typically saturates at about 2 Mbps, equipment vendors offer microcell and picocell solutions to augment the macrocell sites when additional network capacity is required. This competing solution has clear disadvantages to the network operator in network cost and complexity. FIGS. 7–9 illustrate that embodiments of the invention support high capacity service over macrocell footprints. The radius of a typical macrocell is between one and three kilometers. FIGS. 7–9 illustrate that capacity deteriorates only a minor amount as the cell radius grows to three kilometers.

The principal output of the WCDMA RF Network Simulation is a link by link determination of whether the UE call is adequately serviced. By defining maximum capacity as the point at which no more than 5% of the users in any one class of service are not adequately serviced, one may explore the network capacity, in terms of users (capacity) or throughput (aggregate data rate), for various quality of service mixes. This has been done for both a conventional W-CDMA receiver and the one described herein and compared in FIGS. 7–9.

FIG. 10 illustrates the number of additional micro sites required to deliver the same capacity over the network as preferred embodiments of the present invention. An increase of approximately 3.5 in the number of sites is required to deliver the same capacity as preferred embodiments of the invention. The results in FIG. 10 allow macrocell base station capacity at the microcell, which is unlikely to be available on the commercial market. Manufacturers of microcell and picocell solutions typically provide less than half of the throughput in these solutions relative to their macrocell solutions due to form factor constraints. Hence, the 3.5 multiplier is a conservative estimate and is likely to grow as networks are deployed.

FIG. 10 also illustrates the significant reduction in MAI provided by preferred embodiments of the invention. The I+N plot on the left illustrates that the MAI level at each sector in the network varies between approximately −94 and −96 dBm for the conventional WCDMA solution. The middle plot illustrates excellent control of interference for embodiments of the invention.

TABLE 1

Reverse Link Solution Capacity and Throughput - 37 Cells in Network, 2 km Radius.

| Quality of Service (Type:kbps) | Conventional WCDMA Receiver Capacity:Throughput (UE/BS:kbps/BS) | WCDMA Receiver with RLS Capacity:Throughput (UE/BS:kbps/BS) | Increase Over Conventional WCDMA |
|---|---|---|---|
| Voice:8 | 204.8:1638.4 | 847.1:6776.8 | 4.1× |
| Data:64 | 27:1728 | 119.9:7673.6 | 4.4× |
| Data:144 | 15:2160 | 68.9:9921.6 | 4.6× |
| Data:384 | 6:2304 | 35.9:13785.6 | 6.0× |
| Data:2048 | 1:2048 | 6:12288 | 6× |
| 90% Voice:8 10% Data:384 | 30:1368 | 269.9:12273.6 | 9.0× |
| 97.1% Voice:8 2.9% Data:384 | 105:1968 | 525:9840 | 5× |
| 90% Voice:8 10% Data:64 | 120:1632 | 480:6528 | 4× |
| 66.7% Voice:8 33.3% Data:64 | 63:1680 | 252:6720 | 4× |
| 50% Voice:8 50% Data:64 | 48.0:1728.0 | 210:7560 | 4.4× |

Scaling Capacity

Receiver architectures of the present invention offer the means to scale capacity as a function of equipment cost. Although it provides a nominal of 5× of Base Station capacity improvement, the architecture can scale in the number of sector antennas supported at the BTS, and in the number of MUD processes executed at the BTS, and can provide up to at least 20× capacity improvement over conventional WCDMA depending on the quality of service mix supported in the network.

The architecture facilitates a graduated cost (as measured in computational complexity) versus benefit (as measured in additional capacity and/or coverage) tradeoff. The architecture is structured such that the mapping of performance to complexity is modular in the number of parallel programmable processors. Data flow and latency requirements are accommodated at each scaling level of the receiver.

The WCDMA receiver architecture combines the control logic and signal processing thereby enabling a network operator to selectively control radio resources such that various mixes of capacity and coverage enhancements may be obtained.

Embodiments of the disclosed invention offer at least two scaling mechanisms. First, the number of antennas employed at the base station location may be varied to influence STAP. As the number of antennas per base station sector increases, SINR gain is realized due to array gain, which scales linearly with the number of antennas, and increased interference rejection is obtained due to the increased number of STAP Degrees of Freedom (DOFs). SINR gain supports lower power operating points for UE which reduces the MAI for a given network loading condition.

A second scaling mechanism is the number of MUD processes performed. Additional medium (64 kbps) and high (384 kbps) rate UE connections can be added to a sector if each new UE connection is supported by a MUD process. The air interface will saturate quickly if the addition of such connections is not supported by the addition of a MUD process per additional UE connection. Referring to Table 1, a conventional WCDMA receiver can support a maximum of two (2) 384 kbps UE connections per BTS sector. Because the addition of a third high rate UE connection in a given sector is effectively denied by the BTS power control solution, the conventional receiver does not scale up in capacity. BTS equipment vendors advertise product scalability, but typically such products scale down, not up.

When employing preferred embodiments of the claimed invention, a network operator can tailor the number of antennas and MUD processes to each sector. An additional degree of flexibility is the ability to re-allocate MUD processes sector to sector.

Table 2 illustrates the impact of each scaling mechanism, and the scalability of the integrated solution. Note that preferred embodiments of the invention are alternately identified as WCDMA with RLS; where "RLS" corresponds to Reverse Link Solution. It should be noted that the results in Table 2 represent the specific variant of MUD that preferred embodiments of the disclosed invention employ, and is not representative of all MUD variants. The first two columns address the scalability of MUD processing without STAP. Column 1 represents the baseline solution, four MUD processes per sector, and column 2 represents twice the baseline, or eight MUD processes per sector. Note that, without STAP, there is little gain achieved by simply increasing the number of MUD processes. The following observations explain the lack of scalability without STAP:

MUD processing provides significant interference rejection when used to cancel medium and high data rate connections (the MAI contribution of a single voice user is minimal).

Without STAP, medium and high data rate connections interfere with each other and do not support adequate SINR performance to facilitate MUD. This may be avoided by employing joint decoding, but the complexity of such a receiver grows exponentially in the number of users.

The following design features of the disclosed embodiments of the invention support the performance disclosed:

Apply STAP beamforming prior to the first stage of MUD processing.

Re-compute new STAP beamforming weights prior to the second stage of MUD Processing.

Referring again to Table 2, column 3 represents a baseline embodiment of the present invention, with approximately 5× improvement over conventional WCDMA processing. Column 4 illustrates the effect of canceling four (4) additional users per sector over the baseline, with most of the capacity gain accruing in scenarios that include 384 kbps connections. Columns 5 and 6 illustrate the effect of doubling the number of antenna elements, which theoretically increases per user SINR by 3 dB.

As columns 1 and 2 in Table 2 illustrate, simply increasing the number of MUD processes does not support additional data connections without STAP gain. FIG. 13 illustrates the STAP SINR gain sufficient to support a given number of MUD Processes. As illustrated, implementing ten MUD processes without a solution that provides at least 6 dB of STAP gain will not provide increased network capacity. The figure was derived by, at each STAP gain level, increasing the number of MUD processes until network capacity no longer increases. For this figure, MUD is a two-stage process.

invention, subject to the digital receive chain requirements described earlier. There are STAP performance gain limitations described earlier that relate to the number of antenna elements, but the solution can be implemented for any number of antenna elements.

Because they are digital signal processing solutions, preferred embodiments of the invention can be implemented in software on general-purpose computing hardware or digital signal processing (DSP) hardware solutions. It is possible that a manufactured product based upon the claimed invention would include special purpose computing hardware to reduce manufacturing costs, but the solution does not require such hardware.

One advantage of preferred embodiments of the disclosed invention is the lack of a requirement for antenna array calibration. Because those embodiments do not require

TABLE 2

Reverse Link Solution Scalability - 37 Cells in Network, 2 km Radius

| Quality of Service (Type:kbps) | 1 Antenna Element, 4 MUD Processes Capacity: Throughput (UE/BS:kbps/BS) | 1 Antenna Element, 8 MUD Processes Capacity: Throughput (UE/BS:kbps/BS) | 4 Antenna Elements, 4 MUD Processes Baseline Capacity: Throughput (UE/BS:kbps/BS) | 4 Antenna Elements, 8 MUD Processes Capacity: Throughput (UE/BS:kbps/BS) | 8 Antenna Elements, 4 MUD Processes Capacity: Throughput (UE/BS:kbps/BS) | 8 Antenna Elements, 8 MUD Processes Capacity: Throughput (UE/BS:kbps/BS) |
|---|---|---|---|---|---|---|
| Voice:8 | 215.2:1721.6 | 221.4:1771.2 | 847.1:6776.8 | 859.2:6873.6 | 1658.5:13268.0 | 1674.4:13395.2 |
| Data:64 | 33:2112 | 36:2304 | 119.9:7673.6 | 125.8:8051.2 | 235.9:15097.6 | 241.8:15475.2 |
| Data:144 | 20.9:3009.6 | 21:3024 | 68.9:9921.6 | 74.9:10785.6 | 131.9:18993.6 | 138.0:19872.0 |
| Data:384 | 9:3456 | 9:3456 | 35.9:13785.6 | 39:14976 | 68.3:26227.2 | 72:27648 |
| 90% Voice:8 10% Data:384 | 30:1368 | 30:1368 | 269.9:12273.6 | 300.0:13680.0 | 480:21888 | 540:24624 |
| 50% Voice:8 50% Data:64 | 59.9:2153.6 | 66:2376 | 210:7560 | 221.9:7985.6 | 413.3:14859.2 | 425.2:15284.8 |
| Average Increase Over WCDMA | 1.2× | 1.3× | 5.4× | 5.8× | 10.3× | 10.9× |

The addition of antenna elements and/or MUD processes at the base station impacts processing hardware complexity. To provide insight into the processing complexity impact of STAP and MUD, FIG. 12 summarizes the processing complexity of the baseline of the claimed invention. Equipment cost has been found to be directly proportional to processing complexity.

Antenna System Diversity

The receiver architecture may be implemented in software and may be used with various types of base station antennas, and does not require antenna calibration or special antenna maintenance. The solution supports various types of antenna mounting configurations, remote antennas, as well as moving or swinging antennas with no appreciable performance degradation.

The WCDMA receiver architecture employs a STAP algorithm that optimally combines the signals from arbitrary antennas at arbitrary locations, is adaptive, and is trained on UE transmissions and thereby providing a system that is self-calibrating.

Preferred embodiments of the invention, because they are digital signal processing solutions, do not levy special antenna requirements on the overall base station solution. The number of and placement of antennas is not critical to implementing the solution, although they influence the obtainable interference mitigation. For example, an antenna configuration optimized for a selection-diversity-based receiver is easily supported by preferred embodiments of the estimation of the angle of arrival of the RF energy from UE, computation and maintenance of complex calibration tables is not required. A steering vector is estimated for each UE by correlating received baseband quadrature data with the known scrambling code for each UE. If angle of arrival information were required, a calibration vector would likely be needed to convert the estimated steering vector into a spatial angle relative to the antenna array. Generation of calibration vectors periodically requires an extensive set of field measurements, and is difficult in an urban environment. The fact that preferred embodiments of the present invention do not require generation of calibration vectors significantly reduces the amount of engineering touch labor required to operate base station equipment in an urban environment.

Interleaved STAP and MUD

This integrated WCDMA receiver architecture offers a multi-stage filter architecture that interleaves layers of MUD and STAP. Preferred embodiments of the invention tailor the available STAP gain to each link depending on whether it will be specifically used by the MUD processor. Prior to a link's cancellation by the MUD processor, STAP gain is used to improve the accuracy of channel estimation for links to be handled by the MUD processor. Subsequently, STAP gain is reallocated to maximizing SINR of the remaining links in the absence of the cancelled link's interference. It is advantageous that a WCDMA receiver designed to increase air interface capacity employ a combination of STAP and MUD for the following reasons:

STAP solutions work best when applied to RF environments in which the number of interference sources is less than the number of array elements employed. Typical WCDMA networks are likely to have 10–200 sources active per sector. The benefit of employing more than eight antenna array elements in a given base station sector is unlikely to justify the associated equipment and processing costs in WCDMA networks. STAP is an optimal beamforming solution in a time-invariant channel. It is generally much preferred to alternatives such as the Maximum Ratio Combiner (MRC). However, in a loaded WCDMA network it will be employed under sub-optimal interference conditions in which the STAP solution is under-determined. Under those conditions a STAP solution will not deliver the 20–30 dB SINR improvement possible when the interference subspace is properly matched to the array rank. In anticipated WCDMA interference environments, STAP will deliver SINR gain on the order of 10*Log10 (n), where n is the number of antenna elements.

Each stage of MUD reduces the rank of the STAP interference sub-space observed at the antenna array, and increases the effectiveness of each subsequent stage of STAP. Of the 10–200 sources active per sector, MAI is dominated by the data connections that require higher transmit power levels to compensate for less spreading gain at the receiver. Each successful stage of MUD eliminates some number of data connections from the interference sub-space, supporting a re-calculation of the now lower rank STAP covariance matrix. The re-calculation has two benefits. First, it will provide increased STAP gain on the remaining data connections that must be processed in the subsequent stage of MUD. Second, it may provide increased STAP gain on the voice connections.

A maximum of a single MUD process per sector is supported at a base station that does not employ STAP. Therefore, an exclusively MUD-based solution is not scalable, in the manner disclosed herein, without STAP beamforming. A joint MUD is scalable but, because it scales exponentially in computational complexity it is not feasible for cost effective implementation. It is also possible to use power control to stagger the operating points of the data connections which supports many stages of successive interference cancellation. However, the preferred embodiments described herein recommend only two (2) MUD stages, due to receiver latency requirements and current commercially available hardware platforms.

Referring to FIGS. 1 and 2, the STAP and MUD filter architecture 100 illustrated in FIG. 1 employs two stages of MUD Processing 301, 302, and three STAP beamforming solutions 210, each associated with a Demodulate UE 201, 202, 203 function. The first two STAP beamforming solutions 210 are only applied to the connections assigned to MUD processing by the MUD Controller 400. The third STAP solution 210 is applied to all of the remaining connections in the sector. If MAI is reduced by 1 dB for all users in a sector, all the users may reduce their radiated power by 1 dB and still maintain an adequate SINR margin in the receiver for reliable demodulation. This would save UE battery life. Alternatively, the network could support additional users if UE maintained emitted power levels. This effect is demonstrated in the left hand panel of FIG. 3.

STAP Filter Design

Realizable STAP filters typically use computational complexity reduction techniques, such as Least Mean Square (LMS) or Root Least Square (RLS) estimation techniques, to solve for filter weights. These estimation techniques, although prominent in current fielded STAP applications, have at least two disadvantages relative to the disclosed invention. First, in order to support the MUD processing approach advocated herein, the Link Manager 400 introduces UE connection power variations and radio channel occupancy variations that have a deleterious effect on weights estimation techniques that have convergence lag times (such as LMS and RLS). Second, a separate LMS estimation is required per user, which, when applied to a scenario with large numbers of users (>50), does not provide computational savings over the technique advocated herein.

The STAP Filter design for preferred embodiments of the present invention leverages a block adaptive, global calculation and inversion of the interference covariance matrix, with a per-UE-connection estimation of a steering vector. For the purpose of this disclosure, the steering vector is also block adaptive. One advantage of the block adaptive approach is that it utilizes a discrete number of data samples, i.e., a block, to produce a single statistical estimate of the covariance which automatically captures all sub-space activity in the given block. When contiguous blocks of data are used to estimate the covariance—for instance, consider a block a single slot of WCDMA data—all signal environment phenomena are captured. In the context of the disclosed invention, such a computationally complex option is afforded because a single global covariance estimate and inverse suffices for all UE connections.

Block adaptive calculation of the STAP interference is represented by the following equation, $$\hat{R} = \frac{1}{K} X^H X \quad \text{where} \tag{1}$$

$$X^H = \begin{bmatrix} x_1(n_1), x_1(n_2), \ldots, x_1(n_K) \\ x_2(n_1), x_2(n_2), \ldots, x_2(n_K) \\ \vdots \\ x_M(n_1), x_M(n_2), \ldots, x_M(n_K) \end{bmatrix}, \tag{2}$$

and where K is the number of samples in the block estimate.

Computation of the steering vector v for a given UE connection requires correlating the digital baseband data with the known scrambling code on the UE pilot channel and is accomplished by implementation of the following equation, $$v = \langle X | d^* \rangle \tag{3}$$

The global interference covariance and the UE-specific steering vector are used to calculate the STAP beamformer weight vector for a given UE connection using the following equation, $$w = R^{-1} v \tag{4}$$

As explained above, application of the STAP beamformer weights converts an m-channel data stream 40 into a single data stream of digital baseband data 212 that is de-scrambled and de-spread 220, de-interleaved 230, and finally decoded 240 using the scrambling code, spreading and channelization codes, interleaving technique, and error correction coding specified by wide-band standard committees such as the 3GPP.

Because the interference subspace in the covariance matrix is altered after each stage of MUD Processing 301, 302, a new global interference covariance is calculated to support STAP beamformer weights calculation after each stage of MUD Processing 301, 302.

MUD Filter Design

There are a wide variety of MUD techniques that have been disclosed in the prior art. Optimal detectors have been developed using both maximum a posteriori detection (MAP), and maximum likelihood sequence detection (MLSD). S. Verdu, "Minimum Probablily of Error for Asynchronous Gaussian Multiple-Access Channels", IEEE Transactions on Information Theory, vol. IT-32, no. 1, Jan. 1986, pp 85–96]. Both of these detectors, while achieving optimal performance, are far too complex to be efficiently implemented in a practical CDMA system. These techniques have been shown to have a computational complexity that is exponential in the number of users, and they require accurate phase and amplitude estimates. S. Verdu, "Adaptive Multi-User Detection", *Code Division Multiple Access Communications*, S. G. Glisic and P. A. Leppanen, Eds., pp. 97–116, The Netherlands, Kluwer, 1995.

One thrust of recent research in this area has been the development of sub-optimal MUD techniques with lower complexity. These techniques may be broadly divided into linear detectors and subtractive interference cancellation detectors.

Linear Detectors. The linear detectors generally require an inversion of a correlation matrix that is on the order of the product of the number of UE connections and the message length, and are still quite computationally complex for a large number of UE connections and reasonable message lengths.

Subtractive Interference Cancellers. Subtractive interference cancellation techniques involve the demodulation, symbol estimation, re-modulation and subtraction of each UE signals. These techniques can be further divided into serial and parallel implementations, parallel and serial.

Parallel Subtractive Interference Canceller Implementations. The parallel implementations typically require a minimum of 2 stages, where the tentative data decisions for each of the N users are re-modulated and subtracted from N−1 data streams for a second estimation.

Serial SIC. Serial SIC (also referred to as Successive Interference Cancellation), where UE connections from the largest MAI contribution to the smallest, are sequentially estimated and subtracted, performs nearly as well in many circumstances, but results in a long latency for a large number of UE connections if it is applied to every UE. The UE connections processed in the first stage of SIC get no benefit from the MUD processing, but the system capacity improves, and the MAI environment, as seen by subsequent stages, from all of the other UE connections is reduced. Serial SIC is roughly half as computationally complex for a given number of UE connections as parallel interference cancellation, where two stages are employed.

For a multi-rate CDMA system like WCDMA, group-wise serial interference cancellation is an efficient technique, providing a compromise between performance and computational complexity. In this technique, all UE connections with similar MAI contributions are processed in a single stage, and the stages start with the largest MAI contributors. Each bit decision is made independently, but the processing at each stage has the benefit of the MAI reduction of the previous. Thus, preferred embodiments of the current invention start with the greatest MAI contributors to provide greater benefit to the subsequent processing.

The strategy utilized in preferred embodiments of the disclosed MUD Processor 301, 302 is somewhat different than approaches employed in other approaches. In a multi-rate service, such as WCDMA, there are classes of UE connections that disproportionately contribute MAI, specifically those with a low spreading factor. Recognizing the computational complexity of MUD, preferred embodiments of the disclosed invention processes those UE connections first. Additionally, in a network where the majority of UE connections are still voice, the UEs in a sector will vastly outnumber the number of available MUD processes. In this case, little additional benefit is derived by canceling the high speed data user to MAI level below that contributed by a voice user. Hence the strategy utilized in the MUD Processor 301, 302 is to apply MUD to as many data connections as possible, and cancel these connections down to the ambient MAI level of the voice users in the network.

The MUD Processor 301, 302 operates on entire UE connections, instead of operating on single UE connection channels. The MUD Controller 400 selects and assigns UE connections as MUD cancellation candidates, and the MUD Processor 301, 302 estimates, re-constructs, and subtracts the control and data channels associated with the cancellation candidate. The MUD Processor algorithm is illustrated in FIG. 13. For a given cancellation candidate, a minimum mean square error estimate is made for a linear filter that best reproduces the received signal at each antenna from the UE. The filter estimate w is obtained by correlating the received signal to the UE control channel pilot bits. Each active UE DPCH is then re-constructed by applying w and a power scaling factor to the estimated bits for the DPCCH and each DPDCH 1320, 1330. The re-constructed channels are summed and subtracted from the associated antenna digital signal stream to effectively eliminate signal energy from the candidate UE from the signal stream. As stated above, the MUD Processor 301, 302 is designed to cancel UE data channels down to the ambient MAI level of the UE voice channels in the network, typically 15 dB of cancellation is desired. The number of time taps in the MUD filter is adjusted to this requirement.

Stated in another fashion, FIG. 13 illustrates a preferred embodiment of the MUD processing algorithm for one UE. Using the received baseband, oversampled data, d, and the known chip sequence for the pilot bits, c, on the DPCCH, a minimum mean square estimate is made of a set of weights, $^w$mk 1310. These weights, when applied to a sliding window (length L+1) of chips transmitted from the UE, x, reconstruct the portion of the received signal, y, due to that UE DPCH for each antenna element and sub-sample. The factor b is the known power ratio between the DPDCH and the DPCCH.

Multi-Stage Filter Architecture Performance

To illustrate the SINR improvement of the disclosed embodiments of the present invention over conventional WCDMA processing a WDCMA air interface link simulation was developed. The simulation uses the network connection laydowns and associated power control solutions generated in the WCDMA RF Network Simulation presented earlier. The WCDMA link simulation produces digital complex baseband data for each BTS antenna over an input number of data frames, and includes real world effects such as the transmit filter shape, multipath, and Doppler. It is fully compliant with the 3GPP WCDMA specification. FIG. 14 illustrates the relationship between the WCDMA RF Network Simulation and the WCDMA Link Simulation.

A Matlab® implementation of the claimed invention is used to process the simulation data and compute performance metrics. A similar Matlab® implementation of a conventional WCDMA processor is used to provide a basis for improvement claims. The following steps are employed to substantiate link level performance of the claimed invention. Run the WCDMA RF Network Simulation to a maximum capacity that includes the modeled STAP and MUD gains for a given network QoS mix. Use the UE connection laydown and associated power control solution in a selected BTS sector in the RF Network Simulation to generate WCDMA Link Simulation data. Process the WCDMA Link Simulation data with the Matlab ® implementation of a conventional WCDMA processor and the Matlab ® implementation of the claimed invention. For the conventional and the claimed invention solutions, compute the SINR for each UE connection channel and form a histogram of the SINR set. Compare the histograms to the required SINR operating points of each channel type.

The histogram of UE connection channel SINRs aligns with the 3GPP specified channel operating point. The histogram of SINRs for the conventional processor falls short of the specified channel operating point by the number of dBs of SINR improvement that the claimed invention realizes. Furthermore, the difference between the means of the two histograms represents the actual SINR improvement of the claimed invention.

FIG. 15 illustrates the approach described above for a network comprising only UE voice and control channels. Note that the histogram for preferred embodiments of the invention aligns with the operating point for WCDMA voice channels, and provides 6.2 dB of gain over the conventional processor.

FIG. 16 illustrates the results for a network comprising a mix of voice and high rate (384 kbps) UE channels. Note that the histograms for preferred embodiments of the invention align with the operating point of voice and high rate data connections, and that 6.9 dB of gain for voice users and 6.3 dB of gain for data users is realized over the conventional processor in both cases.

MUD Processing on Pre-decoded FEC Symbols

A WCDMA receiver architecture of the present invention offers a filter architecture that performs MUD processing on the received forward error correction symbols, prior to the de-interleaving and decoding of these symbols to data bits to support no greater than 30 msec of latency through the receiver The architecture of the claimed invention is structured to introduce no more than 30 msec of receiver processing latency, from receipt of digital data from the antennas, to multiplexing and shipping out transport channels of information bits. Because forward error correction decoding adds between 20 and 80 msec of latency to receiver processing, and because the multi-stage receiver also introduces processing latency, it is advantageous to estimate symbols for the MUD Processor before decoding the forward error correction code.

Symbol errors have a deleterious effect on the performance of the MUD Processor 301, 302. In the absence of coding gain, to insure sufficient symbol error rates on the UE connections undergoing MUD processing, the Link Manager 500 must command increased operating power for these connections.

Performing MUD processing on pre-decoded FEC symbols has two favorable design effects. First, the UE connections undergoing MUD processing will have very low symbol error rates after error correction decoding. Second, very computationally complex coding schemes, such as Turbo Coding, are not required by the disclosed invention.

Reducing Power Required to Establish a Network Connection

The disclosed integrated WCDMA receiver architecture offers a multi-stage filter architecture that minimizes the power required to establish a network connection on the random access channel by a given user, thus minimizing the network interference associated with network access requests.

UE acquisition channel requests have the potential to contribute MAI in a loaded WCDMA network. Because the claimed invention does not apply MUD processing to network UE acquisition channels, and because the UE acquisition process repeatedly increases UE acquisition channel power until a serving BTS responds, it is important to minimize the MM background when performing acquisition processing. Preferred embodiments of the present invention employ an approach to acquisition processing that allows UE acquisition channel radiated power to not exceed that of a typical UE voice channel.

Specifically, Acquisition Processing 600 is placed after the last stage of MUD Processing 302. Performing acquisition processing at this location in the receiver reduces the MAI background in which acquisition correlations are performed. Because MAI is reduced at this point, relative to a conventional receiver for a given acquisition correlation window length, UE access requests will require significantly less radiated power when processed by preferred embodiments of the present invention implementing this approach, thereby reducing the MAI contribution of the access request.

Applying a Single MUD Process to Several User Equipment Transmissions

Another method of the present invention involves applying a single MUD process simultaneously to several UEs, thereby providing reduced network interference for reduced computational complexity.

Due to the computational complexity of a MUD process, a significant increase in performance is achieved with no additional complexity if a single MUD process is applied to several users. The 3GPP WDCMA air interface specification does not preclude such an approach.

Preferred embodiments of the present invention provide four (4) MUD processes per BTS sector, with the MUD processes allocated over both stages of MUD by the MUD Controller 400. For a QoS mix in the sector of interest that comprises four (4) 384 kbps UE connections with the remaining UE connections providing voice service, the claimed architecture works very well. The four (4) high data rate UE connections are cancelled by the MUD Processor 301, 302, and voice capacity is unaffected by the high data rate connections and enhanced by STAP gain.

Consider a QoS mix in a sector with thirty (30) 64 kbps UE connections and the remainder of the UE connections servicing voice channels. Although preferred embodiments of the present invention are scalable in MUD processes, each MUD process impacts the hardware cost of the overall solution. Rather than scaling to thirty (30) MUD processes for the subject QoS mix, an innovative scheme that is consistent with the 3GPP WCDMA specifications is offered. An example of the innovation is to make the thirty (30) 64 kbps UE connections look like five (5) 384 kbps connections. This is accomplished by time multiplexing 384 kbps channels among the thirty (30) UE connections. Specifically, in a given frame, five (5) 384 kbps connections are established among the thirty (30) UE connections. On a subsequent frame, the previous five (5) 384 kbps UE connections are torn down and five (5) new 384 kbps UE connections are established. In effect, the UE requesting 64 kbps is receiving 384 kbps every sixth frame, providing an effective bandwidth of 64 kpbs.

The MUD Controller 400 and Link Manager 500 logic support such a scheme, and the MUD Processor 301, 302 only requires five (5), rather than thirty (30), MUD processes to cancel the MI from the thirty (30) intermittent connections down to the ambient voice MAI level. Table 4 illustrates the capacity increase associated with this innovation. Note that the performance cited in Table 1 did not include this innovation.

TABLE 4

Reverse Link Solution Using Time Multiplexing - 37 Cells in Network, 2 km Radius

| Quality of Service (Type:kbps) | WCDMA Receiver with RLS Capacity:Throughput (UE/BS:kbps/BS) | RLS Using Time-Multiplex Technique Capacity:Throughput (UE/BS:kbps/BS) | Increase Over RLS (Type:UE/BS) |
|---|---|---|---|
| Data:64 | 119.9:7673.6 | 153.0:9790.1 | Data:33 |
| 50% Voice:8 50% Data:64 | 210:7560 | 270.0:9719.0 | Voice:30 Data:30 |
| 66.7% Voice:8 33.3% Data:64 | 252:6720 | 360.0:9599.3 | Voice:72 Data:36 |

It should also be noted that the STAP and MUD filters specified herein, because they are slot block adaptive, suffer no performance degradation due to the increased time variability of the RF environment associated with this invention.

Single STAP Covariance Per Stage of MUD

Preferred embodiments of the invention include a technique for computing a single STAP interference covariance for all users per stage of MUD.

Reduced complexity implementations of STAP, such as LMS and RLS estimation, compute a new STAP weight vector once per signal sample for each UE connection. These techniques effectively include the STAP interference covariance calculation in the weights estimate, and do not require an explicit covariance estimate. Because LMS and RLS techniques are iterative approaches, they require a discrete amount of weight settling time, and suffer performance degradation in complex, highly variable RF signal environments.

Due the to anticipated degree of time variability in the WCDMA RF signal environment, and due to an economy of scale realized by having to support large numbers of UE connections, preferred embodiments of the present invention employ a global block adaptive approach to STAP weight estimation. The estimation is global because one estimate applies to all users serviced in the BTS sector. Referring to FIG. 1, the global covariance estimate is inverted and sent to Demodulate UE 201, 202, 203 to facilitate STAP weight calculation and application.

One benefit of the global block adaptive approach is that the STAP weights estimated over a data block automatically reflect any new RF environment conditions that occur within the time interval represented by the block.

Selecting Connections for MUD Processing

A novel technique is disclosed for selecting the network connections to dedicate to MUD processing that reduces MAI at the receiver. This method measures, tracks, and considers in-cell connections and users in soft handoff with the cell in the MUD processing selection process.

Significant increases in WCDMA receiver performance vs. complexity are realizable by intelligent, real-time, allocation of MUD processes to UE connections in the network. Selection of the most promising UE connections increases the effectiveness of MAI reduction. Allocation of MUD processes to poorly chosen UE connections will have a deleterious effects on network performance. Preferred embodiments of the present invention utilize a MUD Controller 400 to monitor performance, and to seek effective allocation of MUD processes to UE connections.

The MUD Controller 400 identifies UE connections to apply MUD processing to based on the MAI contribution of that UE, and whether the SINR on the UE connection is adequate to achieve the desired cancellation. It is desirable in the context of preferred embodiments of the present invention to assure that a MUD candidate has adequate SINR to support MUD Processing. The consequences of attempting to cancel a UE channel with inadequate SINR is an increase in the MAI contribution of the user, and a decrease in overall network capacity. The dependence on SINR of MUD processing is further complicated by the long latency associated with decoding of the forward error correction codes and interleaving specified in WCDMA. These latencies range from 10 to 80 ms, and are far too long to tolerate prior to the MUD processing. Therefore, MUD processing is performed on the FEC symbols rather than the transport channel information bits, and the benefits of forward error correction processing will be transparent to the MUD Processor 301, 302 and MUD Controller 400.

UE MAI Calculation

One observable that is utilized in the MUD Controller 400 is the MAI contribution of each individual UE. This is calculated from network commanded quantities to the extent possible for latency and computational complexity advantages. The MAI contribution of each UE is calculated using equation 5.

$$MAI = 10\text{Log}_{10}\left(\frac{E_b}{N_0}\right)_{Target} - 10\text{Log}_{10}(SF) + \Delta \quad (5)$$

In Equation 5, $(E_b/N_0)$Target is the target energy per bit (FEC symbol in this case) commanded by the Outer Loop Power Control Algorithm, SF is the spreading factor, and Δ is the difference between the $(E_b/N_0)_{Target}$ and the measured $(E_b/N_0)_D$ for the last slot. Alternatively, the $(E_b/N_0)_D$ for each UE connection could be measured as in the First Inner Power Control Loop, if the processing resources are available. The difference is less than the power control loop step size specified as 0.5 or 1.0 dB by the 3GPP.

The MUD Controller 400 receives a UE table from the Link Manager 500 that provides the data required to calculate the MAI contribution per UE. The UE table includes: UE identification number, scrambling code, channel configurations (number of channels, relative gain), OVSF codes in operation, commanded transmit power, and $(E_b/N_0)_{Target}$ for each UE in the sector.

UE SINR Requirement Calculation

The effectiveness of MUD processing is a function of the SINR of the signal to be cancelled. MUD processing on UE whose $E_b/N_0$ is too low can potentially increase the MAI contribution of that user 6 dB, and reduce network capacity. Quantifying the limits on MUD candidacy is therefore important.

Processes that influence the performance of subtractive MUD cancellation include: the accuracy of the symbol estimates, and the accuracy of the channel estimates. Table 5 shows simulated results of the minimum mean square channel estimation performance as a function of chip Eb/No (the ratio of the symbol Eb/No to the spreading factor). This cancellation performance is substantially linear over the range of interest.

TABLE 5

MMSE cancellation performance as a function of Chip $E_b/N_0$, assuming no symbol errors.

| Chip $E_b/N_0$ | Cancellation |
|---|---|
| −5 dB | −22 dB |
| −10 dB | −17 dB |
| −15 dB | −12 dB |
| −20 dB | −8 dB |
| −25 dB | −3 dB |

A simple linear fit to this data yields the following.

$$MMSE = -0.92\left(10\text{Log}_{10}\left(\frac{E_b}{N_o}\right) - 10\text{Log}_{10}(SF)\right) - 26.3 \quad (6)$$

where MMSE is the cancellation performance assuming perfect symbols in dB, Eb/No is the energy per symbol in dB, and SF is the spreading factor.

The error rate for the symbols is also a function of the signal to noise. The impact of a symbol error on the cancellation performance is that every chip associated with that bit will be of the wrong sign, so that instead of canceling the signal, the signal amplitude is doubled. Doubling the signal amplitude quadruples the power of the UE's MAI contribution. The impact of a symbol error is also a function of the spreading factor.

The probability of symbol error for a QPSK signal in additive white Gaussian noise (AWGN) is given by, $$SER = 0.5 erfc\left(\sqrt{\frac{E_b}{N_o}}\right) \quad (7)$$

Each symbol error will result in SF chip errors, and the doubling of the signal for the duration of those chips. The expected impact on cancellation is given by, $$\text{Symbol\_cancel} = 2 \cdot SF \cdot SER = SF \cdot erfc\left(\sqrt{\frac{E_b}{N_o}}\right) \quad (8)$$

Assuming that it is impractical to apply MUD to every user in the sector, and that the network has more voice users than data users, little network performance was gained for cancellation greater than about 15 dB. This results in the MAI contribution of a high rate data user (a single channel with a spreading factor of 4) being roughly that of a voice user. For a cancellation ratio of 15 dB, the required $E_b/N_0$ was calculated, considering both components. The results are given in Table 6.

TABLE 6

$E_b/N_0$ requirements to achieve 15 dB average cancellation

| SF | Required $E_b/N_0$ dB | SER Contribution | MMSE Contribution | Pre-Cancellation MAI Contribution (dB relative to noise) | Post-Cancellation MAI Contribution (dB relative to noise) |
|---|---|---|---|---|---|
| 4 | 3.20 | −15.7 | −23.7 | −2.8 | −17.8 |
| 8 | 4.35 | −16.1 | −22.0 | −4.7 | −19.7 |
| 16 | 5.30 | −16.6 | −20.1 | −6.7 | −21.7 |
| 32 | 6.17 | −17.8 | −18.1 | −8.9 | −23.9 |
| 64 | 7.10 | −21.2 | −16.2 | −11 | −26.0 |
| 128 | 8.90 | −39.6 | −15.1 | −12.2 | −27.2 |
| 256 | 11.80 | −100.0 | −15.0 | −12.3 | −27.3 |

For spreading factors between 4 and 32, the contribution of the SER component is dominant. For spreading factors between 64 and 256, the MMSE channel estimate errors are dominant. The MAI contribution of a voice user at 8 kbps with a spreading factor of 256, a target $E_b/N_0$ of 7 dB and no cancellation is −17.1 dB relative to thermal noise.

The MAI contribution of a symbol error is quantized, and the signal to be cancelled is instead doubled, causing a 6 dB rise in its MAI contribution for the duration of the symbol. Assuming perfect power control, the MAI contribution caused by a bit error can be calculated as follows $$\text{MAI\_Symbol\_error} = 10\text{Log}_{10}\left(\frac{E_b}{N_o}\right) - 10 \cdot \text{Log}_{10}(SF) + 6 \text{ dB} \quad (9)$$

Table 7 shows the MAI contributions as a function of spreading factor, and their duration and noise floor impact on a network whose interference level is 5 dB about the thermal noise. (Typically about 75% capacity for conventional CDMA networks).

TABLE 7

Bit Error Impact for the $E_b/N_0$ level from Table 2

| SF | MAI Contribution, dB relative to N | Duration, per event, μs | Average Number of Events per Slot | Instantaneous Network Noise Floor Impact, dB |
|---|---|---|---|---|
| 4 | 3.2 | 1.0 | 13.1 | 1.8 |
| 8 | 1.3 | 2.1 | 3.1 | 1.2 |
| 16 | −0.7 | 4.2 | 0.74 | 0.8 |
| 32 | −2.9 | 8.3 | 0.16 | 0.5 |
| 64 | −5.0 | 16.7 | 0.03 | 0.3 |
| 128 | −6.2 | 33.3 | 0.008 | 0.3 |
| 256 | −6.2 | 66.7 | 1e−7 | 0.3 |

The network noise floor impact of a single bit error for a UE with a spreading factor of 4 is 1.8 dB, will have a significant impact on capacity. However, the duration of this interference total about 13.6 μs out of a 667 μs slot so on the average the contribution per slot is −14 dB relative to The interleaver will effectively scramble the burst errors caused by the pulsating noise floor, but the impact at this level is still significant. Table 8 shows the impact on a second UE with a spreading factor of 4 operating in the sector with an SINR of 3.2 dB, assuming the R=½, K=9 convolutional encoder, and one of each class of user. The burst noise caused by the errors in the symbol estimation procress dominates the BER performance for spreading factors less than 16.

TABLE 8

Bit Error Impact for the $E_b/N_0$ level from table 2 on UE with SF = 4

| SF | Average Number of bits effected per Slot | Instantaneous Network Noise Floor Impact, dB | $E_b/N_0$ during event | Aggregate BER |
|---|---|---|---|---|
| 4 | 13.1 | 1.8 | 1.37 | 34.1e−5 |
| 8 | 6.3 | 1.2 | 1.93 | 6.5e−5 |
| 16 | 3.0 | 0.8 | 2.37 | 3.9e−5 |
| 32 | 1.3 | 0.5 | 2.67 | 3.6e−5 |
| 64 | 0.44 | 0.3 | 2.87 | 3.5e−5 |
| 128 | 0.026 | 0.3 | 2.94 | 3.5e−5 |
| 256 | 8e−6 | 0.3 | 2.94 | 3.5e−5 |

Additional margin needs to be added to accommodate multiple users of each class. However, the contribution of the users decreases with increasing spreading factor. The resulting target symbol $E_b/N_0$ levels are given in table 9.

TABLE 9

Target $E_b/N_0$ for MUD Processing

| SF | Required $E_b/N_0$ Targets for MUD |
|---|---|
| 4 | 4.7 |
| 8 | 5.4 |
| 16 | 5.8 |
| 32 | 6.2 |
| 64 | 7.1 |
| 128 | 8.9 |
| 256 | 11.8 |

MUD Controller Algorithm

Upon the initialization of a MUD Processor 301, 302 for a slot of data, it gets a UE table from the Link Manager 500 that includes the following data for each active UE in the cell and in soft the cell: UE ID code, scrambling code, channel configurations (number of channels, relative gain), OVSF codes in operation, commanded transmit power, $E_b/N_0$ target, UE distance from base-station (or path loss estimate).

If a UE has a target $E_b/N_0$ that exceeds the thresholds given in table 9, then the MAI contribution of each such UE is calculated using Equation 5. A candidate UE table will be generated, and sorted by MAI. The number of candidate UE will be compared to the MUD processing resources for the sector. The candidates will be sorted into two groups. The group with the largest MAI contribution will be processed in the first stage of MUD processing and the remained will be processed in the second stage. The goal will be to have less than 3 dB spread in the MAI contributions of the candidates processed in the first stage.

If none of the UE exceeds the threshold in Table 9, then MUD processing is not performed on this slot of data in preferred embodiments of the present invention. In this case, if any high or medium data rate users are active (e.g. spreading factor <=16), then a request is made to the Link Manager 500 to increase the target of $E_b/N_0$ the UE with the lowest spreading factor. If more than one UE is utilizing this spreading factor, a preference is given to the UE closest to the BTS. This may be measured from E-911 location data if it is available, or approximated using a path loss estimate. This path loss estimate can be the ratio of the commanded transmit power level of the UE to the measured receive power level of the UE. Since out-of-cell users who are not in soft hand-off have an arbitrary time offset relative to the base station (and given that WCDMA is an asynchronous specification) finding these users may require a very large search of code space. Therefore, increasing the transmit power of UE closest to the base station will help to mitigate out of cell interference. If no high data rate users are available, then the MUD Controller 400 requests that the Link Manager 500 set up a number of lower data rate users to be multiplexed onto a single MUD process.

The first group of candidate channel entries is sent to the first MUD Processor 301. The second group of candidate channel entries is sent to the second MUD Processor 302. The received $E_b/N_0$ for the cancelled users is estimated and passed to the Link Manager 500, and the estimated symbols are retrieved from the MUD Processor 302 and passed to the Link Manager 500.

Multiple Stages of MUD Processing

In another aspect, embodiments of the present invention optimally distribute parallel MUD processing over two stages of MUD to provide improved cancellation of selected MUD candidates.

A preferred implementation utilizes two stages of groupwise serial SIC to reduce the MAI contributions of high data rate UE connections. Other MUD techniques may be utilized (i.e., PIC or linear techniques), depending upon the available computational resources. However, greater system capacity gains are realized by applying many mediocre MUD processes than a few very good ones. Results of a nineteen-cell network simulation are shown in FIG. 17 for a fully serial processor, a single-stage parallel processor (where data decisions are made independently on each user in a single stage) and the two-stage parallel processor. There are approximately 13 UE per sector, each at 384 kbps, and the cell radius is 2 km. This simulation assumes 6 dB of STAP processing gain, and that there are processing resources to apply MUD to four UE in each sector. The two-stage processor buys back much of the performance of the fully serial processor.

If the overall spread in these UE's MAI contributions is greater than 3 dB, then the UE whose MAI contributions range from the maximum to 3 dB less than the maximum will be processed in the first stage, and the remainder of the candidates will be processed in the second stage. If the spread in the MAI contributions of the users is less than 3 dB, they will be split evenly between the two stages. If the MAI spread among the UE to be processed is greater than 3 dB, the first round is selected to limit that spread to 2–3 dB. The effectiveness of the channel estimation process is reduced for the higher spreading gains, since the channel is estimated on per chip basis, and the higher spreading factors result in less energy per chip. These channels would benefit from having at least one stage of MUD before them, and the 3 dB bound was chosen because the spreading factors are incremented in powers of two. In this way, the highest power UE connections are cancelled first, causing the greatest benefit to the remaining users. For a system with limited processing resources (i.e., all practicable systems) this will efficiently apply the available resources.

Estimating the Amount of Desired MUD Cancellation

In further preferred embodiments, the invention estimates an amount of cancellation on each MUD candidate to support efficient link management, and to ensure adequate cancellation of each candidate.

Preferred embodiments of the MUD Processor 301, 302 use UE transmission symbols before removal of forward error correction encoding instead of decoded symbols to save 10–80 msec of processing latency. A very accurate measure of MUD Processor 301, 302 performance is required to ensure that the Link Manager 500 has properly conditioned MUD candidates. The technique described below provides an accurate, real time measure of MUD Processor 301, 302 performance.

The target $E_b/N_0$ for data UE connections in WCDMA is typically around 3 dB. Therefore estimating the cancellation by measuring the data channel before and after MUD processing is of limited utility, having a dynamic range of only 3 dB. The pilot can be integrated across the slot yielding a signal to noise that is between 2 dB and 17 dB higher, depending upon spreading factor and DPCCH overhead. This provides a useful observable that is available on a slot by slot basis for some channels.

An observable that is reliable for all channels can be computed from the difference in the symbol estimates used at the MUD Processor 301, 302 and those estimated post forward error correction. The estimated FEC symbols from the MUD Processor 301, 302 are sent to the Link Manager 500, where they are compared to the FEC symbols from the convolutional decoder. There are three convolutional codes specified by the 3GPP document 3G TS 25.212. The code with the minimum gain is a ½ rate constraint, length 9 convolutional code. At a $E_b/N_0$ of 3 dB, this code approximately 5.8 dB of coding gain, ensuring that the symbol error rate from the convolutional decoder will be much lower than that from the MUD Processor 301, 302, and can be used as the "true" symbols to detect errors in the MUD Processor's 301, 302 symbol estimates.

This observable will have considerable latency however, ranging from 10 to 80 msec, depending upon the depth of the FEC interleaving. A detection of an error will result in an adjustment in the target $E_b/N_0$ for the UE by the Link Manager 500.

Power Control

Also as part of preferred embodiments, the present invention includes methods for tracking receiver performance and formulating power control commands based upon the performance estimates. While the introduction of advanced filtering techniques such as MUD and STAP offer the potential for increased network capacity and coverage, the realization of that potential is facilitated by innovative application of monitoring and control functions to manage UE link parameters (e.g., commanded transmit power, frame format) and receiver parameters (e.g., averaging window lengths, filter tap support lengths). A preferred embodiment of the present invention, coordinated by the Link Manager 500, that seeks to realize this potential is described herein. Functional entities that comprise the Link Manager 500 are depicted in FIG. 18. Exploiting the use of MUD and STAP incentivizes creative application of power control methods. Network capacity is dominated by the overall interference environment albeit with higher tolerance to interference with the application of advanced receiver techniques described herein.

Among the UE link parameter monitor and control functions coordinated by the Link Manager 500 are three power control loops (in order of latency): an outer power control loop, a second inner power control loop and a first inner power control loop. In preferred embodiments of the present invention, each loop is tightly integrated with the overall receiver architecture.

The outer power control loop uses Data Quality Metrics (DQMs) derived after de-interleaving and decoding to set a base target $E_b/N_0$. The latency for the outer loop is driven by the de-interleaving process which requires up to eight frames (approximately 80 ms) of data.

The second inner power control loop estimates the gain afforded by the use of STAP. This estimate is used to adjust the base target $E_b/N_0$ for each UE connection. The latency of the second inner power control loop is one frame (approximately 10 ms).

The first inner power control loop estimates each UE connection's received $E_b/N_0$. The received $E_b/N_0$ is compared to the adjusted $E_b/N_0$ (or to the base $E_b/N_0$ when an adjusted $E_b/N_0$ is not available). If the received $E_b/N_0$ is less than the adjusted $E_b/N_0$ (or base $E_b/N_0$, as appropriate), then the Transmit Power Control (TPC) bit is set to command an increase in the UE connection transmit power.

The Outer Power Control Loop

In typical systems, a target $E_b/N_0$ is derived from the noise statistics at the input to the decoder in conjunction with a desired bit error rate. For the same value of average SINR per bit, different noise statistics will lead to differing variability in the instantaneous noise per bit, and thus, bit error rate. Metrics available in the first inner power control loop are not well suited for determining an appropriate base target $E_b/N_0$; if for no other reason than that those metrics do not reflect the effect of coding. In addition, these metrics do not consider a statistically large enough sample to reflect the noise statistics. Fortunately, the noise statistics generally evolve more slowly than the time scales of fast fading, whose consequences are a focus of the inner power control loops.

In preferred embodiments of the present invention, DQMs are determined subsequent to the decoding of data and are used to set a base target $E_b/N_0$. One DQM to be determined is the Cyclic Redundancy Check (CRC). If an error is detected, the current base target $E_b/N_0$ is incremented a substantial amount, e.g., 2 dB. Another DQM is the Cumulative Viterbi Metric (CVM) at the conclusion of the decoding block. Assuming Gaussian error statistics, the CVM when suitably scaled represents an average SNR per bit over a block. That value is compared with the $E_b/N_0$ required to reach an acceptable bit error rate considering the convolutional code in use. The current base target $E_b/N_0$ is adjusted by any difference. Another DQM is the coherence time of the channel for each UE connection. Using the output of the STAP processor and the pilot bits in the DPCCH, the total impulse response of the system and channel for each UE connection may be estimated at the symbol rate. The coherence of the channel estimate over a set integration time, e.g., eight frames, is computed. This calculation is referred to as fading estimation and is performed by the fading estimator module shown in FIG. 18. If the value falls below a set threshold, the channel is assumed to be a fading channel. The current base target $E_b/N_0$ is adjusted upward by an amount determined by the estimated coherence to account for differing $E_b/N_0$ requirements between Gaussian and fading channels.

The succession of DQM checks described here is illustrated in FIG. 21.

The First Inner Power Control Loop

This power control loop has the shortest latency. There are three components of the first inner power control algorithm. First, useful measures of received UE power are generated. Second, the UE SINR are estimated from these metrics. Finally, if UE connection SINR is less that the applicable target $E_b/N_0$, then a TPC (Transmit Power Control) bit is set in the next downlink dedicated physical control channel (DPCCH) slot. The measure of received power will be discussed first. See FIG. 19.

The measurement process relies on correlation of a known bit sequence with the received data. Specifically, the 3–8 pilot bits ($N_{pilot}$) embedded in the beginning of each uplink DPCCH slot may be used. While the DPDCH and DPCCH are separately mapped to the In-phase (I) and Quadrature (Q) channels at the UE, the use of a complex scrambling code mixes them. Thus, before any portion of the uplink DPCCH can be processed, the received data is de-scrambled for each UE. In order for the correlation peak to have a measurable gain over noise, the DPCCH is also despread by the factor of 256.

Oversampling the received data yields robustness to fine synchronization concerns. As such, the sample rate of the correlation code is increased to match that of the data using a band-limited interpolation filter. The received data stream is then correlated with the known, spread, scrambled pilot chip sequence (the correlation code) over an interval of data centered on the known pilot sequence location and of length $\delta_t$. Correlation over a range of delays resolves multi-path delays at the chip rate and the real part gives the outputs of temporal Rake fingers. The correlation may be repeated for each available antenna, $\delta_m$, to yield additional Rake fingers. For each antenna, $\delta_m$, and delay, $\delta_t$, the $N_{pilot}$ Rake fingers are then modulated by the known Pilot bits and summed. The $\delta_m * \delta_m$ quantities are then processed to estimate the SINR for that user.

These steps are depicted in FIG. 19. Depending on the available processing resources, the Rake algorithm may be a selection process wherein the finger with the largest power is used or a maximal-ratio combining algorithm to coherently add the temporal and spatial diversity components.

A preferred embodiment of the method illustrated in FIG. 19 may also be described as generation of metrics for the inner loop power control algorithm. The signal from each antenna element is filtered, basebanded, sampled, and split into $N_{users}*d_t$ parallel signals where $N_{users}$ is the number of DPCCH channels to estimate and $d_t$ is the number of delay taps per user. Using information from Layer 1, a code generator provides the appropriate OVSF scrambled with the complex conjugate scrambling code for each tap. The result of each path is integrated for one spreading code length duration. The resulting sum is the value at the Rake finger which is sampled every symbol. One embodiment of the Link Manager would select the largest valued Rake finger for use in SINR estimation While there are many known methods for converting the Rake finger outputs into a useful SINR estimate, a exemplary embodiment will be described.

The Rake finger with the largest amplitude will be selected (i.e. antenna selection diversity). The ratio of that Rake finger power to the average power in the received data is related to the SINR per chip in the selection Rake. If $P_{uecon}$ is the UE DPCCH received power in that finger, the expected value of the ratio is, $$R = \frac{(N_{Pilot}S_{fcon})^2 P_{uecon} + 0.5 N_{Pilot} S_{fcon}(I + N_f)}{P_{uecon} + I + N_f}. \qquad (10)$$

In Equation (10) $S_{fcom}$ is the DPCCH spreading factor, I is the received interference power, and $N_f$ is the thermal noise power in the chip sequence. The use of oversampling would affect the accuracy of Equation (10) somewhat. The factor of 0.5 reflects the assumed even distribution of energy between I and Q channels.

The quantity of interest is the signal to noise ratio per bit $(E_b/N_0)_D$ in the DPDCH where $N_0$ represents the total non-signal power in the received signal. $(E_b/N_0)_C$ for the DPCCH can be written as, $$\left(\frac{E_b}{N_0}\right)_{con} = \frac{k_{con} S_{fcon} P_{uecon}}{(I + N_f)}. \quad (11)$$

In Equation (11), $k_{con}$ is the inverse of the effective coding rate (accounting for puncturing) of the control channel.

The two preceding equations can be modified to relate the measured quantity, R, to the desired quantity, $(E_b/N_0)_D$ for the DPDCH.

$$\left(\frac{E_b}{N_0}\right)_D = k_{data} S_{fdata} \left(\frac{P_{uedata}}{P_{uecon}}\right) \frac{(R - 0.5 N_{Pilot} S_{fcon})}{((N_{Pilot} S_f)^2 - R)}. \quad (12)$$

The ratio of transmitted powers between the control and data channels are used to yield a value appropriate for the DPDCH rather than for the DPCCH, which the measurement is based upon. The Network Layer sets that ratio. One could derive an uncertainty in the SNR/bit estimate from an uncertainty in R by modifying Equation (10) appropriately. If $R \ll N_{pilot} S_{fcoc}$, the uncertainty in SNR per bit is linearly related to the uncertainty in R.

Finally, Equation (12) is compared to a base target $E_b/N_0$ provided by the outer power control loop (or an adjusted base target $E_b/N_0$ to be described later in the disclosure). If the estimated $E_b/N_0$ is below the target, the TPC bit is set to command an increase in UE transmit power in the next downlink slot. Otherwise, the TPC bit is set to zero. In the absence of MUD and STAP, Equation (13) is considered for each UE.

$$\delta \equiv \left(\frac{E_b}{N_0}\right)_{target} - \left(\frac{E_b}{N_0}\right)_D \quad (13)$$

$\delta > 0$, TPC bit = 1

$\delta \le 0$, TPC bit = 0

Both MUD and STAP allow the network to operate with higher uplink interference levels than a conventional WCDMA network. To ensure that the quantity, R, in Equation (10) is accurately measured, it is useful for the power control algorithms to include processing to mitigate the increased interference. As the anticipated processing load associated with MUD is substantially less than that of STAP, all MUD processing steps (as described elsewhere in the disclosure) will be conducted apart from execution of the first inner power control loop. The MUD processor will supply an estimate of the $E_b/N_0$ for cancelled UE connections and provide that estimate to the Link Manager 500. The remaining UE connections will have $E_b/N_0$ estimates per FIG. 18 and Equation (12).

For a four-element receive array, the STAP benefit is expected to be approximately 4 dB of increased interference tolerance. The delay between receipt of the signal and completion of STAP processing, however, is expected to be approximately 10 ms. For UE connections with insufficient diversity at the base station, such a delay would substantially limit the ability of the inner power control loop to compensate for fast fading phenomena. In the absence of such compensation, these UE connections will require a higher target $E_b/N_0$ than similar UE connections afforded some level of spatial and/or temporal diversity thereby increasing the interference environment and decreasing capacity. The Link Manager 500 provides three mechanisms for increasing the accuracy of Equation (12) without the benefit of STAP gain. Depending on the level of STAP gain, one or more of these may be implemented in a specific receiver design.

Restrict frame formats to those incorporating an increased number of pilot bits (6–8) rather than the minimum (3).

Use the pilot bits of previous slots to increase the processing gain of the Rake fingers.

Define a small subset of STAP weights that may provide sufficient (but not optimal) gain for all UE connections and apply these weights prior to the inner power control loop metric computation.

Restricting frame formats to those incorporating more than the minimum number of pilot bits will essentially remove the option of having UE connections change data rates from frame to frame. That flexibility requires the use of Transport Format Combination Indicator bits which takes away from the number of bits allocated for the dedicated pilot.

Using pilot bits of previous slots to increase the processing gain of Rake fingers reduces the adaptation rate of the inner power control loop thereby somewhat degrading the ability to track fast fading.

Using a small subset of STAP weights requires an algorithm for determining a suitable subset of STAP weights along with the associated computation penalty.

Different combinations of these methods may, in fact, be used for different UE connections and the Link Manager 500 algorithm will direct the receiver to employ an appropriate set of methods for each UE connection.

The aggregation of these processing steps comprises the first inner power control loop and is schematically depicted in FIG. 20. In FIG. 20, the three methods of compensating for the lack of STAP gain in the inner loop power control algorithm are shown in terms of how the affect the power control algorithm. Different users may use different combinations of these methods. The LinkManager, using the fading rate estimator, will determine the optimal mix.

The Second Inner Power Control Loop

While the impact on SINR measurement accuracy of STAP is readily noted, a more subtle relationship between fast fading and STAP must also be addressed. The effectiveness of STAP is attributable to its ability to coherently combine spatial and temporal signals. As the propagation paths of each UE connection fade, the effectiveness of STAP may vary accordingly. If that variability is not tracked, the target $E_b/N_0$ of each UE connection must be set high enough to endure the minimum STAP effectiveness. The argument is entirely parallel to why power control is effect for reducing interference levels in the presence of fast fading.

To address this issue the SINR calculation performed on the Rake fingers for the inner power control loop is duplicated on the output of the STAP processor for each UE connection.

The STAP processing gain ($G_{STAP}$), defined as the ratio of UE $E_b/N_0$ at the output of the STAP processor to the UE $E_b/N_0$ in the selected Rake finger prior to STAP processing, is used to adjust the target $E_b/N_0$ provided by the outer power control loop per Equation (14).

$$\delta \equiv \left(\frac{E_b}{N_0}\right)_{target} - \left(\frac{E_b}{N_0}\right)_D G_{STAP} \quad (14)$$

$\delta > 0$, TPC bit = 1

$\delta \le 0$, TPC bit = 0

The goal of the first inner power control loop (post-MUD but pre-STAP) is to reach the target $E_b/N_0$ set after decoding less an estimated value for STAP gain.

Initially, this estimated value will be equal to the number of channel elements. If the estimated SINR at the output of the STAP processor is not equal to the outer loop target $E_b/N_0$, the estimated STAP gain used in the first loop is adjusted accordingly.

As an example, consider a pedestrian voice UE connection with an outer loop target $E_b/N_0$ of 6.7 dB. If the receive array consists of four antennas, the initial STAP gain is assumed to be 6 dB and the modified target $E_b/N_0$ for the first inner power control loop is set at 0.7 dB. At the conclusion of STAP processing, if the estimated $E_b/N_0$ is 5.7 dB, the STAP offset is reduced to 5 dB and the target $E_b/N_0$ for the first inner power control loop is increased to 1.7 dB.

The necessity of the first inner power control loop is dictated by the fading rate and the amount of spatial diversity available across the receiver array. If the fading rate is slow enough, the additional latency of basing power control decisions on post-STAP data is acceptable. Also, if the array aperture spans several spatial coherence lengths, the output of the STAP combiner will exhibit substantially reduced fast fading behavior. In either of these cases, the second inner-loop power control algorithm will be able to compensate for any remaining signal variability and the first inner power control loop may be de-activated for a particular UE. That determination is made by the Link Manager 500 using the UE channel fading estimation algorithm.

As examples, the fading time scales of a slowly walking pedestrian can easily exceed 10 ms (one frame). In that case, the low latency of the first inner power control loop calculation is not required and the TPC bit for that UE connection may be set based on the second inner power control loop calculation with a latency typically less than 10 ms. This reduces computational complexity thereby freeing processing resources for other activities.

Alternatively, the fading time scales of a moderate speed vehicle (e.g. 60 km/h) can be on the order of several ms. In that case, the low latency of the first inner power control loop calculation is necessary if there is inadequate spatial diversity across the receiver array to mitigate the fast fading effects. The ability of embodiments of this invention to adapt the power control strategy for each UE connection while remaining integrated with the advanced filtering strategies is novel accomplishment in the field of wireless spread spectrum communications.

Power Control for MUD Processor-controlled Channels

The power control structure described thus far is applied to UE channels not handled by a MUD Processor 301, 302. Power control for the MUD channels is also important. Thus, each MUD Processor 301, 302 incorporates the functionality of the second inner power control algorithm directly into the channel estimation process. The processor 301, 302 generates and passes $E_b/N_0$ estimates directly to the Link Manager 500 on a slot-to-slot basis where the estimates are compared to targets in the manner described earlier. As the latency associated with the MUD Processor 301, 302 is not anticipated to exceed a one to two slot duration, the first inner power control algorithm is not required and an explicit STAP gain estimate is not needed.

UE symbol estimates for UE connections are passed to a module that implements de-interleaving and decoding. The outer power control algorithm thus makes no distinction between MUD channels and non-MUD channels.

Power Control for High and Medium Data Rate Connections

Preferred embodiments of the invention include a method for improving MUD Processor 301, 302 performance by providing conditioned power control inputs on the high and medium data rate connections.

The MUD Processor 301, 302 cancels UE channels designated by the MUD Controller 400. Network performance is degraded if the transmit power of these connections is either too low or too high. Latency concerns discourage the use of error correction coding algorithms in the MUD process. Nevertheless, the impact of incorrect symbol decisions is significant and may, in fact, increase rather than decrease the interference environment for other UE channels. If the transmit power of these UE connections is inadequate, incorrect symbol decisions will be made and network performance will suffer. Note that cancellation performance increases nearly linearly with UE transmit power. Thus, an excessive transmit power will not have a deleterious effect on cancellation efficiency; however the excess will lead to unnecessarily high interference levels in adjacent cells that are not using MUD processing on the particular UE channel. To improve network performance, UE channels designated for cancellation by the MUD Processor 301, 302 are directed to specific higher transmit powers than would otherwise be the case. The Link Manager 500 has access to a list of UE allocated to each MUD Processor 301, 302. The target $E_b/N_0$ for these UE connections is initially increased by a pre-determined amount; Table 9 is an example of target $E_b/N_0$ that have been adjusted for the MUD power premium for UE connections designated for MUD cancellation. This increase is in addition to all power control processes described earlier.

The MUD power premium is intended, among other purposes, to promote reliable symbol decoding. If symbol errors are being made the power premium must be incremented. As a continual check on the reliability level, the symbol estimates and the convolutional decoder symbol estimates for the MUD channels are compared at the conclusion of each interleaving period. For this purpose, MUD channel symbol estimates are directed to the Link Manager 500 where they are compared to post-error correction coding symbol estimates received from the convolutional decoder. If any discrepancies are found, the MU)D power premium for that UE connection is increased by an amount related to the number of errors discovered. As was noted earlier, the MUD Processor 301, 302 performs cancellation efficiency checks on a slot-to-slot basis and may also request an alteration in the MUD power premium.

The Link Manager 500 is also responsible for providing a UE database to the MUD Processor 301, 302. Specifically, this database includes, but is not limited to, the estimated received power, the data rate, and information required to generate scrambling and spreading codes for each UE active in the sector.

The preceding paragraphs describe a variety of inputs that are used by the Link Manager 500 in determining whether to set each UE Transmission Power Control (TPC) bit to one or zero. The general approach for determining the appropriate value for the TPC bit of each UE is captured in Equation (15).

$$\delta = \left(\frac{E_b}{N_0}\right)_{target} + \Delta_{\substack{MUD\\Premium}} - \left(\frac{E_b}{N_0}\right)_D G_{STAP} \quad (15)$$

$\delta > 0$; TPC bit = 1

$\delta \leq 0$; TPC bit = 0

Multiplexing UE Connections

Several embodiments of the invention include a technique for time multiplexing a single high data rate connection over several connections that require lower data rates, making the collection of connections look like a single high data rate connection to the MUD Processor 301, 302.

While one role of the Link Manager 500 is to control UE transmit power to optimize the combined MUD/STAP performance of the receiver, preferred embodiments of the invention also exert control over UE frame format in two manners to improve receiver performance.

The first technique arises from the observation that while much of the processing required for a given MUD channel is independent of the channel data rate, the MAI contribution is almost entirely dependent on the data rate. This asymmetry may be exploited by directing several low data rate UE connections to sequentially burst at higher data rates in a controlled, time-multiplexed manner thereby allowing the MUD Processor 301, 302 to suppress more interference under a given computational constraint.

This technique enables the efficient allocation of MUD processing resources for various distributions of UE quality of service mixes. In cases where the medium or low data rate UE connections dominate the MAI environment, for example where there are no high data rate UE connections, or the population of the low rate UE connections is large enough to overcome the differences in spreading gain, this technique will improve the overall receiver performance. There are four characteristics of selected UE that allow this approach to be effective. The UE to be multiplexed must have coherent, non-fading channels. The channel coherence is estimated in the outer power control loop across eight frames. The UE to be multiplexed must have stable STAP weights across the multiplexing time if a fully block-adaptive approach for STAP is not implemented. The UE to be multiplexed must have QoS requirements that are tolerant of data bursts, and hardware with the ability to buffer data. The latency associated with multiplexing grows linearly with the number of UE sharing the channel because the data rates of each UE can only be changed on a frame by frame basis. The UE to be multiplexed must have implemented the WCDMA standards for the required burst rate, and for frame by frame data rate adjustment.

Once the quantity of available MID processing resources has been determined by the MUD Controller 400 and communicated to the Link Manager 500, and a subset of the UE meeting these requirements has been determined, the UE are sorted by their current MAI contribution. The MAI data are also supplied by the MUD Controller 400.

The Link Manager 500 begins the time multiplexing by having the UE with the greatest MAI contribution burst data on the first frame using a single DPDCH channel and a spreading factor of four (4). If the Link Manager 500 verifies effective cancellation for this single DPDCH channel, two options are then considered. First, if the UE currently being cancelled has additional active DPDCH channels, these are redirected to the single time multiplexed channel being cancelled. Second, other active UE data channels on the MUD candidate list are redirected to a time-multiplexed channel. The first option is preferred as the incremental processing required is less than that for the second option.

The list of candidate UE for time multiplexing is updated on a frame by frame basis. UE are removed from the candidate list for ending a call, channel fading, unstable STAP weights (i.e., excessive motion), or changing latency requirements.

Data Rate Ramp Up

Further embodiments of the invention include a technique that forces a high data rate connection request to initiate with a lower data rate and ramp up to the requested rates as the STAP and MUD filters settle.

Depending on the estimated fading rate of a UE channel, the STAP and MUD filters may be estimated based on several slots of data. This departure from strictly block-based filtering introduces the potential for transient periods of poor filtering performance immediately proceeding call initiation. The consequences of the start-up transient are greater for high data rate UE connections than low data rate UE connections owing to their increased transmit power. In order to mitigate the deleterious effect on mutual access interference, the Link Manager 500 denies high data rate service to a UE until it ascertains a sufficient period has passed to ensure filter stability, e.g., one frame or 10 ms.

In one embodiment of this "Quiet Start" method, the Link Manager 500 buffers the first frame of transport channel data for a high data rate UE connection. The mapping of the transport channel to the physical channel for the first channel is restricted to orthogonal variable spreading factor (OVSF) codes of length 128 or greater for the first uplink frame. Subsequent frames use an OVSF code appropriate to the requested data rate. As such, the Link Manager 500 buffers approximately one frame worth of data for that UE connection in a first-in first-out (FIFO) buffer which is emptied when the demanded data rate decreases sufficiently as with a Discontinuous Transmission (DTX) or call termination.

Out-Of-Cell Connections

A technique for requesting increased radiated power on out-of-cell data connections to support MUD processing on these connections is also included in preferred embodiments of the invention.

As discussed earlier, UE channels to be demodulated using the MUD Processor 301, 302 must be directed to higher transmit powers (the MUD power premium) to support reliable symbol decoding without recourse to the convolutional decoder. If the prospective UE MUD candidate is controlled by another base station, i.e., an out-of-cell UE connection as is the case in soft-handoff, the power control command issued by the local base station may not induce the UE to increase transmit power. There are two scenarios to be examined. First, both base stations may employ the receiver disclosed in this patent. Second, the other base station may not employ the receiver.

In the first case, the Link Manager 500 algorithms in both base stations exchange lists of UE channels that are candidates for MUD processing. If a candidate UE appears in both lists, the Link Manager 500 accepts the UE for MUD Processor 301, 302 and each Link Manager 500 commands a power premium. The UE interference is then cancelled in both receivers using a MUD Processor 301, 302. If a candidate UE is absent from either list, the UE is determined to be ineligible for MUD processing and removed from the list.

In the second case, where the other receiver employs a foreign architecture, out-of-cell UE connections are considered ineligible for local MUD processing. The underlying criterion is that a UE will not increase power unless its local cell is capable of canceling the increased interference.

Estimating Channel Fading Rate

In another aspect, the invention includes systems and methods for estimating channel fading rate which are used in turn to set rate parameters and averaging intervals for the adaptive STAP, MUD, and power control algorithms.

Adaptive signal processing algorithm performance is closely tied to the complexity and fading characteristics of the signal to be estimated. Knowledge of key channel parameters such as coherence time and total delay spread facilitate optimal selection of adaptive algorithm parameters such as tap delay support, adaptation rate factors, and weight update algorithm.

In addition to the $E_b/N_0$ estimates from the power control loops, in preferred embodiments of the present invention, the Link Manager 500 receives the Rake finger outputs for each UE channel for each slot. These quantities are buffered for a predetermined amount of time, T (e.g. 80 ms). Two primary quantities are computed.

The channel coherence as a function of delay is computed as in Equation (16) where F is the complex valued Rake finger with the largest amplitude in the current slot. While the quantity is defined using continuous-time notation, the implementation could readily be in discrete-time form. The channel delay spread structure, $S_m[n]$ is estimated by identifying all Rake finger outputs for antennas m and delays n in the current slot with amplitudes greater than, for example, ¼ of the peak Rake finger amplitude. This is a binary vector.

$$C(\tau) = \left| \frac{\int_{-T}^{0} F(t) F*(t-\tau) dt}{\int_{-T}^{0} F(t) F*(t) dt} \right| \quad (16)$$

The channel fading rate is defined as the inverse of the delay, $\tau_{fade}$, at which the channel coherence falls below a defined threshold, e.g. 0.5. This value is used to support four Link Manager 500 decisions. First, for block adaptive filtering strategies, the block length for a UE channel is restricted to less than $\tau_{fade}$. For recursive filtering strategies, the adaptation rate for a UE channel is restricted to greater than $1/\tau_{fade}$. FIG. 22a graphically illustrates this process. This allows the maximum coherent processing gain for weight calculation. Second, the fading rate estimate is used to determine UE eligibility for the data UE connection time multiplexing option described earlier. Third, the fading rate is used in setting the target $E_b/N_0$ for a UE connection. UE channels with substantial fading on a slot-to-slot basis are assigned an additional margin to their $E_b/N_0$ target value. Conversely, stable UE channels require less transmit power. Finally, if the value of $\tau_{fade}$ is greater than a determined threshold for a given UE channel, that UE may be excluded from the first inner power control loop calculation thereby saving processing cost.

The channel delay spread is defined as the maximum duration between non-zero entries in the channel delay spread structure vector, $S_m[n]$. For non-sparse filters, the maximum tap delay is set to this value. For sparse filters, taps are placed at delays with non-zero entries $S_m[n]$. FIG. 22b graphically illustrates this process.

In preferred embodiments, the processes illustrated in FIG. 22 show the channel self-coherence function and delay spread spectrum function. The channel self-coherence function, C, is computed as a function of delay, $\tau$, for each UE physical channel. The coherence time, $\tau_{coh}$, is defined to be the delay at which C falls below a pre-determined threshold, e.g. 0.5. The fading rate is the inverse of the coherence time. The channel delay spread structure function, $S_m[n]$, for each antenna, m, and chip delay, n, is computed by thresholding the impulse response estimate. In this case, all tap delays with an amplitude within 0.5 of the maximum are tagged. For those n, $S_m[n]=1$. For all others, $S_m[n]=0$.

Description of a System of the Invention Implementation

FIG. 23 depicts the high-level design for a Reverse Link Processing System 900 of the present invention. Figures of the type of FIG. 23 are known as structure diagrams. The figure includes connected components with well-defined interfaces (or "ports") and associated protocols, e.g., signal sets. Preferred embodiments of the invention disclosed above are contained within the Reverse Link Processor 910 and Slot Processor 920 components. In general, data flows through these structure diagrams from left to right, control flows down, and effectiveness measures flow up; this convention is maintained throughout this section (although it is not a standard for all structure diagrams).

The RF Processor 930 performs analog-to-digital (A/D) conversion, down-conversion to baseband, oversampling, the combination of the signals from each antenna element into a single array structure, and separation of the resulting data stream into slots for subsequent processing by the Slot Processors 920.

The Post Processor 940 receives user symbol data (for each channel) on a slot-by-slot basis, combines slots to form symbol streams, and performs decoding and de-interleaving on these symbol streams. The remainder of this discussion is concentrated on the Reverse Link Processor 910 and Slot Processor 920 components.

The structure of the Reverse Link Processor 910 is shown in FIG. 24. The Reverse Link Controller 911 maintains the table of user equipment (UE) properties (including UE identity, scrambling code information, channel configuration, transmit power, target $E_b/N_0$, and estimated $E_b/N_0$) and provides that information to lower control layers for signal processor slot- and stage-specific configuration. It also determines the value of the power control command (transmit power control bit, or TCP) to be sent to each UE via the forward link. The Slot Processor Controller 912 manages slot availability, directs the Slot Processor Switch 913 to allocate incoming data slots to specific (idle) Slot Processors 920, delivers slot setup information to Slot Processors 920, and receives processing results from the Slot Processor 920s. Each Slot Processor 920, as illustrated in FIG. 25, processes a slot of data at a time for all users. In this way, each Slot Processor 920 works concurrently on a different slot of data. The symbol data output by the Slot Processors 920 is combined by the Symbol Data Concentrator 914 and relayed to the Post Processor 940.

Each Slot Processor 920 comprises three Stage Processors 921. The Slot Processor 920 provides specific configuration information to each Stage Processor 921, including the list of UE to process (and possibly cancel) in each stage. The Slot Processor 921 also consolidates effectiveness measures from each stage and delivers them to the Slot Processor Controller 912 above. The Acquisition Processor 922 looks for new users in the current slot. Each Stage Processor 921 assumes a different role based on its context (as defined by its stage) and connections. The Stage Processor 921 internal structure is depicted in FIG. 26. Within a stage, a separate User Processor 923 processes the slot data to extract the symbols for each UE. In the first two stages of processing only those users that are to be cancelled with MUD are processed; the MUD cancellation is performed within these stages as well. All remaining (un-cancelled) UE are processed in the third stage. Within the Stage Processor 921, the Covariance Computer 924 is used to generate or update a global covariance matrix for use in STAP processing as well as invert it. The Estimate Subtractor 926 is an optional component that subtracts individual UE data estimates (computed by the MUD Processor 301, 302) from the slot data, in the first two processing stages only, to support MUD cancellation. The remaining Stage Processor 921 components are used to replicate or merge data, symbols, or channel estimates; the purposes, characteristics, and implementation of these components is known to those skilled in the art.

Each User Processor 923 performs up to three phases of processing on its corresponding UE data: STAP, demodulation, and, optionally, MUD cancellation (in stages 1 and 2). The relationship between these phases is depicted in FIG. 27. The MUD Processor 301, 302 component is optional and is only created for User Processor 923s within Stage Processors 920 that are plugged into stage 1 or stage 2 roles. The Long Code Generator 927 component generates the segment of the long code appropriate for the UE and time of interest.

It should be noted that the design described herein does not have an obvious one-to-one correspondence with all of the functions described in the claims. In particular, the functionality of the MUD Controller 301, 302 and Link Manager 500 are not allocated to separable components in the design. The functions of these logical components are distributed across several design layers as part of the Reverse Link Controller 911 and the Slot Processor Controller 912.

We claim:

1. In a communications network comprising a base station and a plurality of user equipment (UE), the network having at least one radio frequency communications path between each UE and the base station, the base station comprising a plurality of antennas and at least one base station reciever, a method of reducing multiple access interference in at least one radio frequency communications path between the base station and at least one UE, the method comprising:
   interleaving space-time adaptive processing (STAP) and multi-user detection (MUD) in a first plurality of stages in a base station receiver, by:
      selecting at least one UE connection for MUD processing by stage, and in a second plurality of stages:
         demodulating the UE connections selected for MUD processing in a current stage, the demodulation employing STAP, and
         performing MUD cancellation on UE connections selected for MUD processing in the current stage; and commanding transmit power for each UE connection, by:
            determining a base target $E_b/N_0$ as a function of at least one data quality metric (DQM);
            estimating a received $E_b/N_0$ for each UE connection, for each UE connection designated for MUD processing, adjusting the base target $E_b/N_0$ upward;
            for each UB connection not designated for MUD processing, where the estimated $E_b/N_0$ is less than the base target $E_b/N_0$, commanding increased UE connection transmit power; and
            for each UE connection designated for MUD processing, where the estimated $E_b/N_0$ is less than the adjusted base target $E_b/N_0$, commanding increased UE connection transmit power.

2. In a communications network comprising a base station and a plurality of user equipment (UE), the network having at least one radio frequency communications path between each UE and the base station, the base station comprising a plurality of antennas and at least one base station receiver, a method of reducing multiple access interference in at least one radio frequency communications path between the base station and at least one UE, the method comprising:
   interleaving space-time adaptive processing (STAP) and multi-user detection (MUD) in a first plurality of stages in a base station receiver, by:
      selecting at least one UE connection for MUD processing by stage, and in a second plurality of stages:
         demodulating the UE connections selected for MUD processing in a current stage, the demodulation employing STAP, and
         performing MUD cancellation on UE connections selected for MUD processing in the current stage; and
         commanding transmit power for each UE connection, by:
            determining a base target $E_b/N_0$ as a function of at least one data quality metric (DQM);
            estimating a received $E_b/N_0$ for each UE connection,
            estimating a STAP gain for each UE connection, and
            adjusting the base target $E_b/N_0$ down by the amount of estimated STAP gain for each UE connection where the estimated $E_b/N_0$ is less than the adjusted base target $E_b/N_0$, commanding increased UE connection transmit power.

3. In a communications network comprising a base station and a plurality of user equipment (UE), the network having at least one radio frequency communications path between each UE and the base station, the base station comprising a plurality of antennas and at least one base station receiver, a method of reducing multiple access interference in at least one radio frequency communications path between the base station and at least one UE, the method comprising:
   interleaving space-time adaptive processing (STAP) and multi-user detection (MUD) in a first plurality of stages in a base station receiver, by:
      selecting at least one UE connection for MUD processing by stage, and in a second plurality of stages:
         demodulating the UE connections selected for MUD processing in a current stage, the demodulation employing STAP, by:
            calculating a global block-adaptive STAP covariance inverse for each stage, wherein a single covariance matrix inverse is used in calculating the filter weight vector for each UE connection; and
         performing MUD cancellation on UE connections selected for MUD processing in the current stage.

4. In a communication network comprising a base station and a plurality of user equipment (UE), the network having at least one radio frequency communications path between each UE and the base station, the base station comprising a plurality of antennas and at least one base station receiver, a method of reducing multiple access interference in at least one radio frequency communications path between the base station and at least one UE, the method comprising:

interleaving space-time adaptive processing (STAP) and multi-user detection (MUD) in a first plurality of stages in a base station receiver, by:
selecting at least one UE connection for MUD processing by stage, and in a second, plurality of stages:
demodulating the UE connections selected for MUD processing in a current stage, the demodulation employing STAP, and
performing MUD cancellation on UE connections selected for MUD processing in the current stage; and
acquiring new UE connections after at least one stage of MUD cancellation.

5. The method recited in claim 4:
wherein the at least one stage is the final stage.

6. In a communications network comprising a base station and a plurality of user equipment (UE), the network having at least one radio frequency communications path between each UE and the base station, the base station comprising a plurality of antennas and at least one base station receiver, a method of reducing multiple access interference in at least one radio frequency communication is path between the base station and at least one UE, the method comprising:

Interleaving space-time adaptive processing (STAP) and multi-user detection (MUD) in a first plurality of stages in a base station receiver, by:
selecting at least one UE connection for MUD processing by stage, and in a second plurality of stages:
demodulating the UE connections selected for MUD processing in a current stage, the demodulation employing STAP, and
performing MUD cancellation on UE connections selected for MUD processing in the current stage;
wherein performing MUD cancellation further comprises group-wise subtractive interference cancellation.

7. The method recited in claim 6 wherein the group-wise subtractive interference cancellation is group-wise serial subtractive interference cancellation.

8. In a communications network comprising a base station and a plurality of user equipment (UE), the network having at least one radio frequency communications path between each UE and the base station, the base station comprising a plurality of antennas and at least one base station receiver, a method of reducing multiple access interference in at least one radio frequency communications path between the base station and at least one UE, the method comprising:

interleaving space-time adaptive processing (STAP) and multi-user detection (MUD) in a first plurality of stages in a base station receiver, by:
selecting at least one UE connection for MUD processing by stage, and in a second plurality of stages:
demodulating the UE connections selected for MUD processing in a current stage, the demodulation employing STAP, and
performing MUD cancellation on UE connections selected for MUD processing in the current stage;
wherein performing MUD cancellation further comprises canceling each UE connection selected for canceling down to the ambient multiple access interference level of voice UE connections in the network.

9. In a communications network comprising a base station and a plurality of user equipment (UE), the network having at least one radio frequency communications path between each UE and the base station, the base station comprising a plurality of antennas and at least one base station receiver, a method of reducing multiple access interference in at least one radio frequency communications path between the base station and at least one UE, the method comprising:

interleaving space-time adaptive processing (STAP) and multi-user detection (MUD) in a first plurality of stages in a base station receiver, by:
selecting at least one UE connection for MUD processing by selected, and in a second plurality of stages:
demodulating the UE connections selected for MUD processing in a current stage, the demodulation employing STAP, and
performing MUD cancellation on UE connections selected for MUD processing in the current stage;
wherein at least one UE connection is characterized by a target $E_b/N_0$ at least equal to a corresponding threshold target $E_b/N_0$, and
wherein selecting UE connections for MUD processing by stage comprises estimating the multiple access interference contribution of each UE connection having a target $E_b/N_0$ at least equal to the corresponding threshold target $E_b/N_0$; and
whereby UE connections characterized by a target $E_b/N_0$ at least equal to a corresponding threshold target $E_b/N_0$ are selected for MUD processing in order of descending multiple access interference contribution.

10. The method recited in claim 9:
wherein UE connections selected for MUD processing in a first stage are limited to connections having an $E_b/N_0$ range not greater than 3 dB.

11. The method recited in claim 9:
wherein the threshold target $E_b/N_0$ for each UE connection is a function of the spreading factor of the UE connection.

12. The method recited in claim 9:
wherein the threshold target $E_b/N_0$ for each UE connection is 4.7 dB for UE connections with spreading factor equal to 4, 5.4. dB for UE connections with spreading factor equal to 8, 5.8 dB for UE connections with spreading factor equal to 16, 6.2 dB for UE connections with spreading factor equal to 32, 7.1 for UE connections with spreading factor equal to 64, 8.9 dB for UE connections with spreading factor equal to 128, and 11.8 dB for UE connections with spreading factor equal to 256.

13. The method recited in claim 9:
wherein the estimated multiple access interference contribution ($MAI_{est}$) of each UE connection having a threshold target $E_b/N_0$ a spreading factor (SF), and difference between the threshold target $E_b/N_0$ and the measured Eb/No for the immediately prior slot $\Delta$ comprises:

$$MAI_{est} = 10\left(Log_{10}\left(\frac{E_b}{N_0}\right)\right)_{Target} - 10Log_{10}(SF) + \Delta.$$

14. In a communications network comprising a base station and a plurality of user equipment (UE), the network having at least one radio frequency communications path between each UE and the base station, the base station comprising a plurality of antennas and at least one base station receiver, a method of reducing multiple access interference in at least one radio frequency communications path between the base station and at least one UE, the method comprising:
- interleaving space-time adaptive processing (STAP) and multi-user detection (MUD) in a first plurality of stages in a base station receiver, by:
  - selecting at least one UE connection for MUD processing by stage, and in a second plurality of stages:
    - demodulating the UE connections selected for MUD processing in a current stage, the demodulation employing STAP, and
    - performing MUD cancellation on UE connections selected for MUD processing in the current stage,
  - wherein at least one UE connection is characterized by a target $E_b/N_0$ less than a corresponding threshold target $E_b/N_0$, and
  - wherein selecting UE connections for MUD processing by stage comprises:
    - increasing the target EWNo of at least one UE connection characterized by the lowest spreading factor from among the UE characterized by a target $E_b/N_0$ less than a corresponding threshold target $E_b/N_0$, by an amount sufficient to characterize the UE having an increased target $E_b/N_0$ at least equal to a corresponding threshold target $E_b/N_0$.

15. The method recited in claim 14 wherein the at least one UE connection is characterized by a target $E_b/N_0$ less than a corresponding threshold target $E_b/N_0$, is further characterized by a spreading factor at least equal to 16, and the UE characterized by a target $E_b/N_0$ less than a corresponding threshold target $E_b/N_0$ is further characterized by a spreading factor at least equal to 16.

16. In a communications network comprising a base station and a plurality of user equipment (UE), the network at least one radio frequency communications path between each UE and the base station, the best station comprising a plurality of antennas and at least one base station receiver, a method of reducing multiple access interference in at least one radio frequency communications path between the base station and at least one UE, the method comprising:
- interleaving space-time adaptive processing (STAP) and multi-user detection (MUD) in a first plurality of stages in a base station receiver, by:
  - selecting at least one UE connection for MUD processing by stage, and in a second plurality of stages:
    - demodulating the UE connections selected for MUD processing in a current stage, the demodulation employing STAP, and
    - performing MUD cancellation on UE connections selected for MUD processing in the current stage;
  - wherein the set of UE connections selected for MUD processing in a first stage of MUD processing are characterized by a range of target $E_b/N_0$ not greater than 3 dB.

17. In a communications network comprising a base station and a plurality of user equipment (UE), the network having at least one radio frequency communications path between each UE and the base station, the base station comprising a plurality of antennas and at least one base station receiver, a method of reducing multiple access interference in at least one radio frequency communication path between the base station and at least one UE, the method comprising:
- interleaving space-time adaptive processing (STAP) and multi-user detection (MUD) in a first plurality of stages in a base station receiver, by:
  - selecting at least one UE connection for MUD processing by stage, by:
    - multiplexing a plurality of UE connections into an aggregate UE connection, and
    - performing MUD cancellation on the aggregate UE connection as on a non-aggregate user system connection;
  - and in a second plurality of stages:
    - demodulating the UE connections selected for MUD processing in a current stage, the demodulation employing STAP, and
    - performing MUD cancellation on UE connections selected for MUD processing in the current stage.

18. In a communications network comprising a base station and a plurality of user equipment (UE), the network having at least one radio frequency communications path between each UE and the base station, the base station comprising a plurality of antennas and at least one base station receiver, a method of reducing multiple access interference in at least one radio frequency communications path between the base station and at east one UE, the method comprising:
- interleaving space-time adaptive processing (STAP) and multi-user detection (MUD) in a first plurality of stages in a base station receiver, by:
  - selecting at least one UE connection for MUD processing by stage, and in a second plurality of stages:
    - demodulating the UE connections selected for MUD processing in a current stage, the demodulation employing STAP, and
    - performing MUD cancellation on UE connections selected for MUD processing in the current stage; and
  - after a last said stage, demodulating remaining UE connections.

19. In a communications network comprising a base station and a plurality of user equipment (UE), the network having at least one radio frequency communications path between each UE and the base station, the base station comprising a plurality of antennas and at least one base station receiver, a method of reducing multiple access interference in at least one radio frequency communications path between the base station and at least one UE, the method comprising:
- interleaving space-time adaptive processing (STAP) and multi-user detection (MUD) in a first plurality of stages in a base station receiver, by:
  - selecting at least one UE connection for MUD processing by stage, and in a second plurality of stages:
    - demodulating the UE connections selected for MUD processing in a current stage, the demodulating STAP, and
    - performing MUD cancellation on UE connections selected for MUD processing in the current stage; and
  - if no high data rate UE connections then command one or more low rate burst-enabled UE to sequentially burst at higher data rates.

20. In a communications network comprising a base station and a plurality of user equipment (UE), the network having at least one radio frequency communications path between each UE and the base station, the base station comprising a plurality of antennas and at least one base station receiver, a method of reducing multiple access interference in at least one radio frequency communications path between the base station and at least one UE, the method comprising:
  interleaving space-time adaptive processing (STAP) and multi-user detection (MUD) in a plurality of stages in a base station receiver, by:
    selecting at least one UE connection for MUD processing by stage, and in a second plurality of stages:
    demodulating the UE connections selected for MUD processing in a current stage, the demodulation employing STAP, and
    performing MUD cancellation on UE connections selected for MUD processing in the current stage; and
  estimating the amount of cancellation on each MUD candidate by computing the difference between: symbol estimates used at the MUD processor and symbol estimates estimated post-FEC decoding.

* * * * *

UNITED STATES PATENT AND TRADEMARK OFFICE
CERTIFICATE OF CORRECTION

PATENT NO. : 7,209,515 B2  Page 1 of 2
APPLICATION NO. : 10/108569
DATED : April 24, 2007
INVENTOR(S) : Daniel B. Kilfoyle et al.

It is certified that error appears in the above-identified patent and that said Letters Patent is hereby corrected as shown below:

IN THE CLAIMS -

Column 37, Line 50, please change "plurality of antennas and at least one base station reciever," to -- plurality of antennas and at least one base station receiver, --

Column 38, Line 5, please change "for each UB connection not designated for MUD" to -- for each UE connection not designated for MUD --

Column 38, Line 66, please change "4. In a communication network comprising a base station" to -- 4. In a communications network comprising a base station --

Column 39, Line 11, please change "ing by stage, and in a second, plurality of stages:" to -- ing by stage, and in a second plurality of stages: --

Column 39, Line 28, please change "one radio frequency communication is path between the" to -- one radio frequency communications path between the --

Column 39, Line 30, please change "Interleaving space-time adaptive processing (STAP) and" to -- interleaving space-time adaptive processing (STAP) and --

Column 40, Line 16, please change "ing by selected, and in a second plurality of stages:" to -- ing by stage, and in a second plurality of stages: --

Column 40, Line 57, please change "threshold target $E_b/N_0$ a spreading factor (SF), and" to -- threshold target $E_b/N_0$, a spreading factor (SF), and --

Column 40, Line 59, please change "measured Eb/No for the immediately prior slot $\Delta$" to -- measured $E_b/N_0$ for the immediately prior slot $\Delta$ --

Column 40, line 64, please replace existing formula with the following formula:

$$-- MAI_{est} = 10 Log_{10}\left(\frac{E_b}{N_0}\right)_{Target} - 10 Log_{10}(SF) + \Delta \quad --$$

Column 41, line 25, please change "increasing the target EWNo of at least one UE" to -- increasing the target $E_b/N_0$ of at least one UE --

Column 41, line 34, please change "one UE connection is characterized by a target $E_b/N_0$ less" to -- one UE connection characterized by a target $E_b/N_0$ less --

UNITED STATES PATENT AND TRADEMARK OFFICE
CERTIFICATE OF CORRECTION

PATENT NO. : 7,209,515 B2
APPLICATION NO. : 10/108569
DATED : April 24, 2007
INVENTOR(S) : Daniel B. Kilfoyle et al.

It is certified that error appears in the above-identified patent and that said Letters Patent is hereby corrected as shown below:

IN THE CLAIMS CONT'D.

Column 41, line 42, please change "at least one radio frequency communications path between" to -- having at least one radio frequency communications path between --

Column 41, line 43, please change "each UE and the base station, the best station comprising a" to -- each UE and the base station, the base station comprising a --

Column 42, line 1, please change "ference in at least one radio frequency communication path" to -- ference in at least one radio frequency communications path --

Column 42, line 27, please change "between the base station and at east one UE, the method" to -- between the base station and at least one UE, the method --

Column 42, line 57, please change "processing in a current stage, the demodulating" to -- processing in a current stage, the demodulation --

Column 42, line 58, please change "STAP, and" to -- employing STAP and --

Column 43, line 8, please change "multi-user detection (MUD) in a plurality of stages in" to -- multi-user detection (MUD) in a first plurality of stages in --

Signed and Sealed this

Nineteenth Day of June, 2007

JON W. DUDAS
*Director of the United States Patent and Trademark Office*